United States Patent
Bremer et al.

(10) Patent No.: US 7,074,462 B1
(45) Date of Patent: Jul. 11, 2006

(54) ESTER COMPOUNDS AND THEIR USE IN LIQUID CRYSTALLINE MEDIA

(75) Inventors: Matthias Bremer, Darmstadt (DE); Michael Heckmeier, Bensheim (DE); Joachim Krause, Dieburg (DE); Detlef Pauluth, Ober-Ramstadt (DE); Achim Götz, Alsbach-Hähnlein (DE); Brigitte Schuler, Haibach (DE)

(73) Assignee: Merck Patent GmbH, Darmstadt (DE)

( * ) Notice: Subject to any disclaimer, the term of this patent is extended or adjusted under 35 U.S.C. 154(b) by 298 days.

(21) Appl. No.: 10/110,720

(22) PCT Filed: Sep. 22, 2000

(86) PCT No.: PCT/EP00/09287

§ 371 (c)(1),
(2), (4) Date: Apr. 15, 2002

(87) PCT Pub. No.: WO01/27221

PCT Pub. Date: Apr. 19, 2001

(30) Foreign Application Priority Data

Oct. 13, 1999 (DE) ................................ 199 49 333

(51) Int. Cl.
| | |
|---|---|
| C09K 19/20 | (2006.01) |
| C09K 19/12 | (2006.01) |
| C09K 19/34 | (2006.01) |
| C09K 19/30 | (2006.01) |
| C07C 25/13 | (2006.01) |
| C07C 69/76 | (2006.01) |
| C07D 319/06 | (2006.01) |

(52) U.S. Cl. ............. 428/1.1; 252/299.61; 252/299.63; 252/299.64; 252/299.65; 252/299.66; 549/369; 549/372; 560/65; 560/83; 570/129; 570/131

(58) Field of Classification Search ................ 428/1.1; 252/299.63, 299.61, 299.64, 299.66, 299.67, 252/299.65; 570/127, 129, 131; 549/369, 549/372; 560/65, 83
See application file for complete search history.

(56) References Cited

U.S. PATENT DOCUMENTS 6,159,393 A * 12/2000 Tarumi et al. ......... 252/299.63

FOREIGN PATENT DOCUMENTS

| DE | 19859421 A | | 6/2000 |
|---|---|---|---|
| EP | 0786508 A | | 7/1997 |
| EP | 0786509 A | | 7/1997 |
| EP | 0820976 A | | 1/1998 |
| EP | 0844229 A | | 5/1998 |
| EP | 0846670 A | | 6/1998 |
| EP | 1010687 A | | 6/2000 |
| WO | WO 92/05230 | * | 4/1992 |
| WO | WO 96/05159 | * | 2/1996 |

* cited by examiner

*Primary Examiner*—Shean C. Wu
(74) *Attorney, Agent, or Firm*—Millen, White, Zelano & Branigan, P.C.

(57) ABSTRACT

The invention relates to compounds of the formula I and to a liquid-crystalline medium based on a mixture of polar compounds of positive dielectric anisotropy, characterized in that it comprises one or more compounds of the general formula I

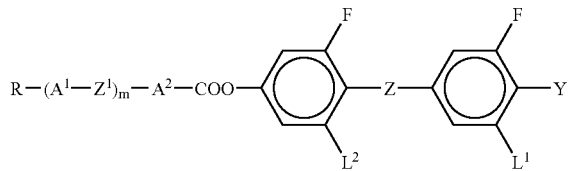

in which
R, $A^1$, $A^2$, $Z^1$, Y, Z, $L^1$, $L^2$ and m are as defined herein.

22 Claims, No Drawings

ESTER COMPOUNDS AND THEIR USE IN LIQUID CRYSTALLINE MEDIA

The present invention relates to esters and to the use thereof in a liquid-crystalline medium, and to the use of this medium for electro-optical purposes and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.

2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is generally arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

Besides liquid-crystal displays which use back lighting, i.e. are operated transmissively and optionally transflectively, there is also particular interest in reflective liquid-crystal displays. These reflective liquid-crystal displays use the ambient light for information display. They thus consume significantly less energy than back-lit liquid-crystal displays of corresponding size and resolution. Since the TN effect is characterised by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence ($\Delta n$) is necessary in order to achieve low optical retardation ($d \cdot \Delta n$). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness through which the light passes is approximately twice as great as in transmissive displays of the same layer thickness.

Advantages of reflective displays over transmissive displays, besides the lower power consumption (no back-lighting necessary), are the space saving, which results in a very low construction depth, and the reduction in problems caused by temperature gradients through different heating-up due to the back-lighting.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

broadened nematic phase range (in particular down to low temperatures)

switchability at extremely low temperatures (outdoor use, automobiles, avionics)

increased stability to UV radiation (longer life)

lower threshold (addressing) voltage, and low birefringence for an improved viewing angle range.

The media available from the prior art do not enable these advantages to be achieved while simultaneously retaining the other parameters.

In supertwisted cells (STN), media are desired which enable greater multi-plexability and/or lower threshold voltages and/or broader nematic phase ranges (in particular at low temperatures). To this end, a further extension of the available parameter latitude (clearing point, smectic-nematic transition or melting point, viscosity, dielectric parameters, elastic parameters) is urgently desired.

The invention is based on the object of providing media for MLC, TN or STN displays of this type, in particular for reflective MLC displays, which do not have the above-mentioned disadvantages, or only do so to a lesser extent, and preferably at the same time have very high specific resistances and low threshold voltages.

It has now been found that this object can be achieved if media according to the invention are used in displays. The mixtures according to the invention are distinguished, in particular, by their excellent low-temperature behaviour and their response times.

The invention thus relates to a liquid-crystalline medium based on a mixture of polar compounds of positive dielectric anisotropy, characterised in that it comprises one or more compound(s) of the general formula I

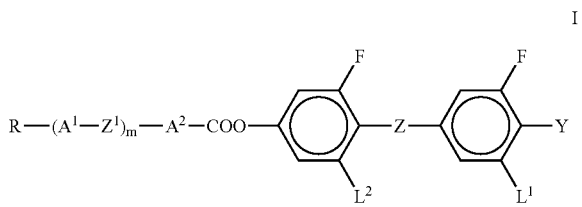

I in which

R is H, an alkyl radical having from 1 to 15 carbon atoms which is unsubstituted, monosubstituted by CN or CF$_3$ or at least monosubstituted by halogen, where, in addition, one or more CH$_2$ groups in these radicals may be replaced, in each case independently of one another, by —O—, —S—,

—CH=CH—, —C≡C—, —CO—, —CO—O—, —O—CO— or —O—CO—O— in such a way that O atoms are not linked directly to one another, A$^1$ and A$^2$ are each, independently of one another, (a) a trans-1,4-cyclohexylene radical, in which, in addition, one or more non-adjacent CH$_2$ groups may be replaced by —O— and/or —S—, (b) a 1,4-phenylene radical, in which, in addition, one or two CH groups may be replaced by N, (c) a 1,4-cyclohexenylene radical, (d) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a) to (d) may be monosubstituted or polysubstituted by CN or fluorine, Z and Z$^1$ are each, independently of one another, —COO—, —O—CO—, —CH$_2$O—, —OCH$_2$—, —C$_2$H$_4$—, —CH=CH—, —CF$_2$O—, —OCF$_2$—, —C≡C—, —(CH$_2$)$_4$—, —CH=CH—C$_2$H$_4$—, —C$_2$F$_4$— or a single bond, L$^1$ and L$^2$ are each, independently of one another, H or F, Y is F, Cl, CN, or an alkyl or alkoxy radical having from 1 to 6 carbon atoms which is substituted by one or more halogen atoms and in which, in addition, one or more CH$_2$ groups may be replaced by —O— or —CH=CH— in such a way that O atoms are not linked directly to one another, m is 0 or 1.

The compounds of the formula I, which are likewise a subject-matter of the invention, have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

Particular preference is given to compounds of the formula I in which Z is a single bond.

Y is preferably F, Cl, CN, CF$_3$, CF$_2$H, OCF$_3$, OCF$_2$H, OCFHCF$_3$, OCFHCH$_2$F, OCFHC$_2$HF, OCF$_2$CH$_3$, OCF$_2$CH$_2$F, OCF$_2$CHF$_2$, OCF$_2$CF$_2$CF$_2$H, OCF$_2$CF$_2$CH$_2$F, OCFHCF$_2$CF$_3$, OCFHCF$_2$CHF$_2$, OCFHCFHCF$_3$, OCH$_2$CF$_2$CF$_3$, OCF$_2$CF$_2$CF$_3$, OCF$_2$CFHCHF$_2$, OCF$_2$CH$_2$CHF$_2$, OCFHCF$_2$CHF$_2$, OCFHCFHCHF$_2$, OCFHCH$_2$CF$_3$, OCH$_2$CFHCF$_3$, OCH$_2$CF$_2$CHF$_2$, OCF$_2$CFHCH$_3$, OCF$_2$CH$_2$CHF$_2$, OCFHCF$_2$CH$_3$, OCFHCFHCHF$_2$, OCFHCH$_2$CF$_3$, OCH$_2$CFHCF$_3$, OCH$_2$CF$_2$CHF$_2$, OCH$_2$CFHCHF$_2$, OCF$_2$CH$_2$CH$_3$, OCFHCFHCH$_3$, OCFHCH$_2$CHF$_2$, OCH$_2$CF$_2$CH$_3$, OCH$_2$CFHCHF$_2$, OCH$_2$CH$_2$CHF$_2$, OCHCH$_2$CH$_3$, OCH$_2$CFHCH$_3$, OCH$_2$CH$_2$CHF$_2$, OCClFCF$_3$, OCClFCClF$_2$, OCClFCHF$_2$, OCFHCCl$_2$F, OCClFCHF$_2$, OCClFCClF$_2$, OCF$_2$CHCl$_2$, $OCF_2CHCl_2$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CHF_2$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCHF_2$, $OCF_2CF_2CCl_2F$, $OCF_2CCl_2CHF_2$, $OCF_2CH_2CClF_2$, $OCClFCF_2CFH_2$, $OCFHCF_2CCl_2F$, $OCClFCFHCHF_2$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCHF_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, $CH=CF_2$, $OCH=CF_2$, $CF=CF_2$, $OCF=CF_2$, $CF=CHF$, $OCF=CHF$, $CH=CHF$, $OCH=CHF$ in particular F, Cl, CN, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CHF_2$.

m is preferably 0. $A^1$ and $A^2$ are preferably a 1,4-cyclohexylene radical, furthermore a phenyl radical, which may be mono- or difluorinated.

If R is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkyl radical in which one $CH_2$ group has been replaced by —CH=CH—, this may be straight-chain or branched. It is preferably straight-chain and has from 2 to 10 carbon atoms. Accordingly, it is in particular vinyl, prop-1- or -2-enyl, but-1-, -2- or -3-enyl, pent-1-, -2-, -3- or 4-enyl, hex-1-, -2-, -3-, 4- or -5-enyl, hept-1-, -2-, -3-, 4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R is an alkyl radical in which one $CH_2$ group has been replaced by —O— and one has been replaced by —CO—, these are preferably adjacent. These thus contain an acyloxy group —CO—O— or an oxycarbonyl group —O—CO. These are preferably straight-chain and have from 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If R is an alkyl or alkenyl radical which is monosubstituted by CN or $CF_3$, this radical is preferably straight-chain. The substitution by CN or $CF_3$ is in any desired position.

If R is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds of the formula I which have wing groups R which are suitable for polymerisation reactions are suitable for the preparation of liquid-crystalline polymers.

Compounds containing branched wing groups R may occasionally be of importance owing to better solubility in the conventional liquid-crystalline base materials, but in particular as chiral dopants if they are optically active. Smectic compounds of this type are suitable as components of ferroelectric materials.

Compounds of the formula I having $S_A$ phases are suitable for thermally addressed displays.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If R is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis-(methoxycarbonyl)heptyl, 8,8-bis(methoxycarbonyl)octyl, bis(ethoxy-carbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.
Furthermore, the compounds of the formula I can be prepared as described in EP 0334911 B1.
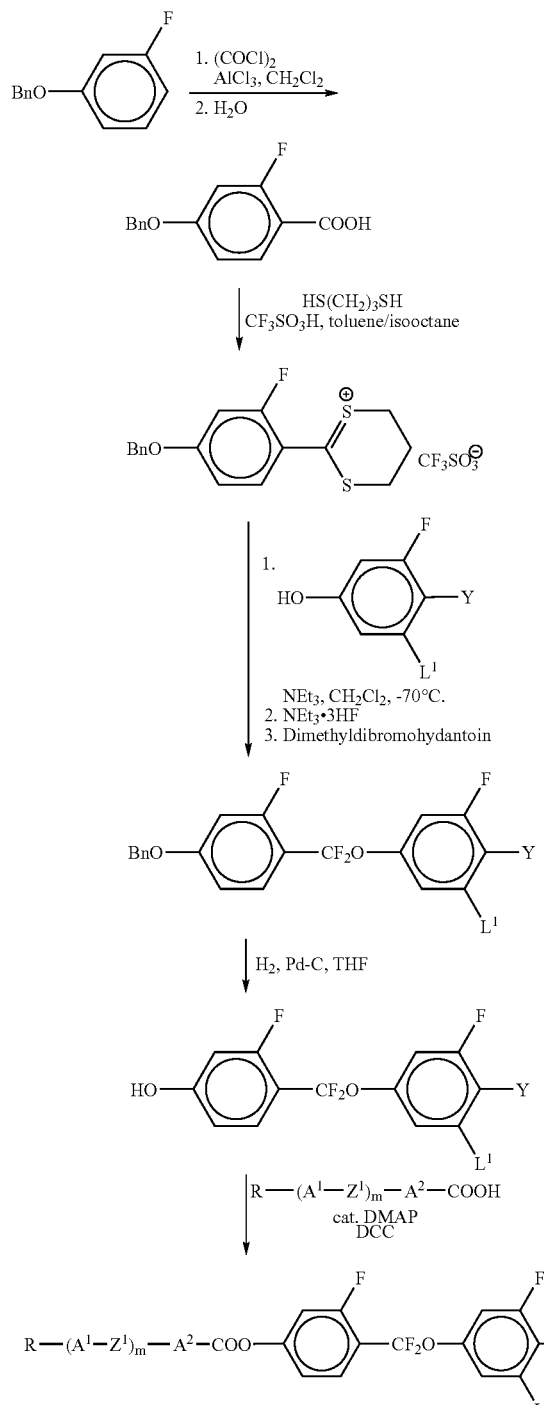
(Bn = benzyl)
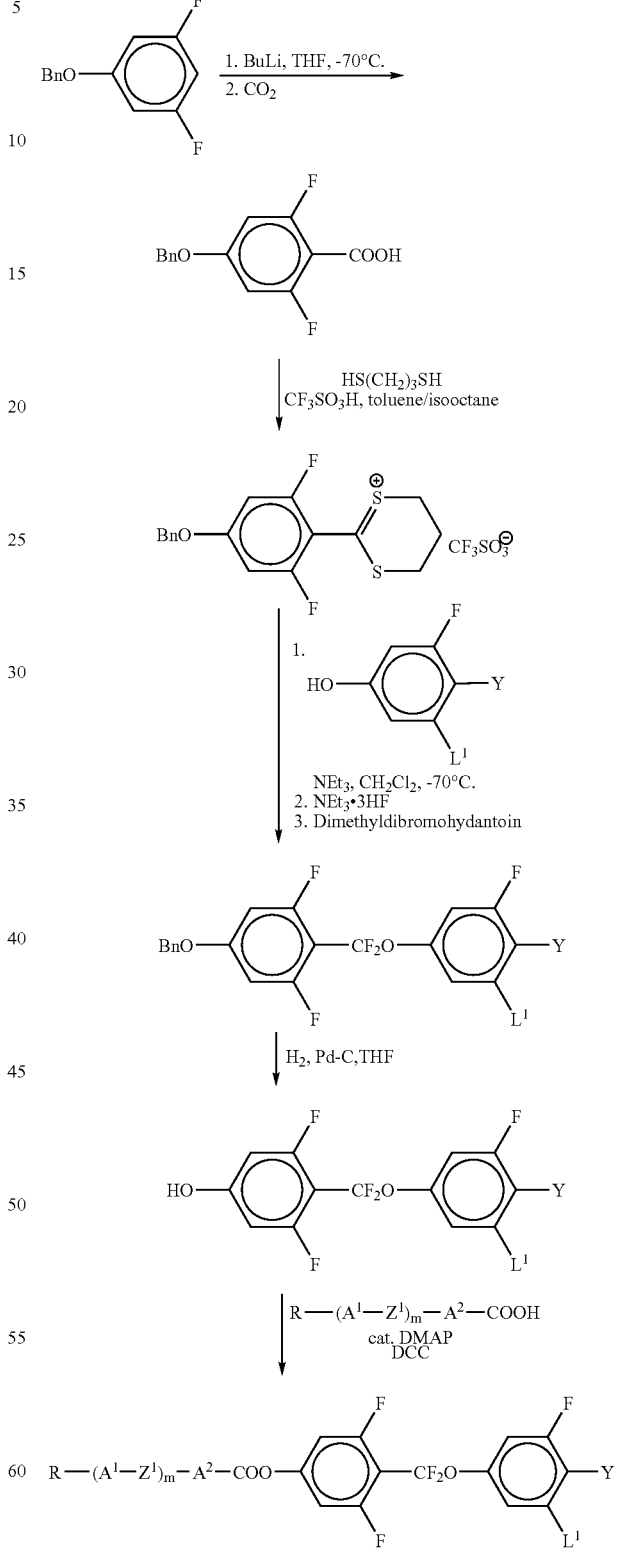
(Bn = benzyl)

The invention also relates to the intermediates of the formula

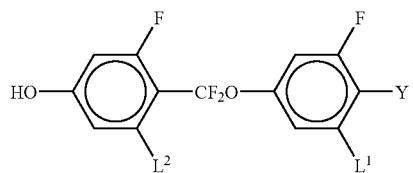

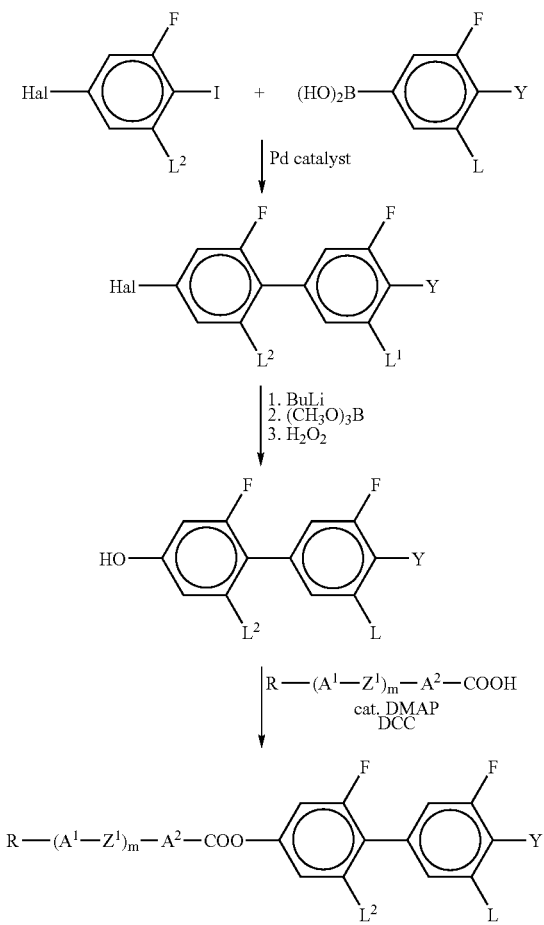

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy and threshold voltage are far superior to previous materials from the prior art.

The requirement for a high clearing point, a nematic phase at low temperature and at the same time a low threshold voltage has hitherto only been achieved to an inadequate extent. Although liquid-crystal mixtures such as, for example, MLC-6848-000 (Merck KgaA, Darmstadt, FRG), have comparable clearing points and low-temperature stabilities, they have, however, both much higher Δn values of about 0.075 and much higher threshold voltages of about $\geq 1.7$ V.

The liquid-crystal mixtures according to the invention, while retaining the nematic phase down to −20° C. and preferably down to −30° C., particularly preferably down to −40° C., enable clearing points above 70° C., preferably above 80° C., particularly preferably above 90° C., simultaneously birefringence values of $\leq 0.100$, preferably $\leq 0.095$, in particular $\leq 0.090$, and a low threshold voltage to be achieved, enabling excellent STN and MLC displays, in particular reflective MLC displays, to be obtained. In particular, the mixtures are characterised by low operating voltages. The TN thresholds are at 1.9 V, preferably below 1.7 V, particularly preferably $\leq 1.5$ V.

In particular, reflective MLC mixtures are distinguished by TN thresholds of <1.5 V.

It goes without saying that, through a suitable choice of the components of the mixtures according to the invention, it is also possible for higher clearing points (for example above 110°) to be achieved at lower dielectric anisotropy values and thus higher threshold voltages or lower clearing points to be achieved at higher dielectric anisotropy values (for example >12) and thus lower threshold voltages (for example <1.5 V) with retention of the other advantageous properties. At viscosities correspondingly increased only slightly, it is likewise possible to obtain mixtures having a greater Δε and thus lower thresholds. The MLC displays according to the invention preferably operate at the first transmission minimum according to Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy at the second minimum is sufficient at the same threshold voltage as in an analogous display. This enables significantly higher specific resistances to be achieved at the first minimum using the mixtures according to the invention than in the case of mixtures comprising cyano compounds. Through a suitable choice of the individual components and their proportions by weight, the person skilled in the art is able to set the birefringence necessary for a pre-specified layer thickness of the MLC display using simple routine methods. The requirements of reflective MLC displays have been indicated, for example, in Digest of Technical Papers, SID Symposium 1998.

The rotational viscosity $\gamma_1$ at 20° C. is preferably <150 mPa·s, particularly preferably <120 mPa·s. The nematic phase range is preferably at least 90°, in particular at least 100°. This range preferably extends at least from −20° to +80°.

Measurements of the capacity holding ratio, also known as the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an adequate HR for MFMLC displays.

The media according to the invention preferably comprise a plurality of (preferably two or more) compounds of the formula I, i.e. the proportion of these compounds is 5–50%, preferably 5–40% and particularly preferably in the range 5–35%.

The individual compounds of the formulae I to XVIII and their sub-formulae which can be used in the media according to the invention are either known or can be prepared analogously to the known compounds.

Preferred embodiments are indicated below:

Mixtures comprising one or more compounds of the formulae Ia to Ih:

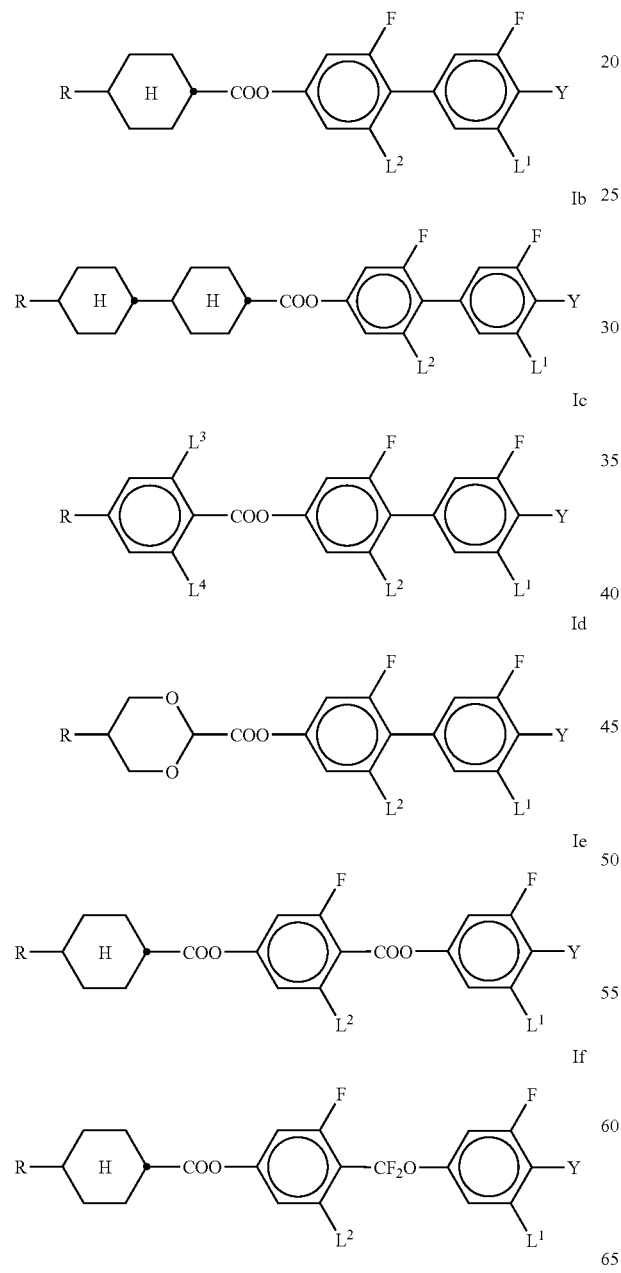

-continued

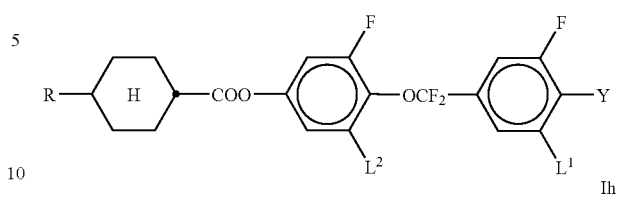

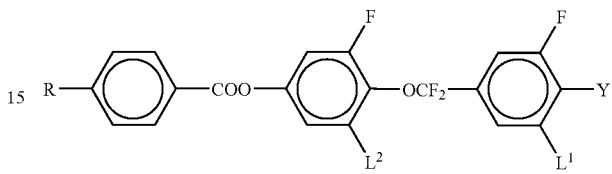

in which
$L^1$ and $L^4$ are each, independently of one another, H or F;
In the compounds of the formula I and the sub-formulae Ia to Ih, R is preferably a straight-chain alkyl radical having 1–8 carbon atoms or a 1 E- or 3E-alkenyl radical having 2–8 carbon atoms;
The medium according to the invention preferably comprises one or more compounds of the formulae Ia, Ib and/or Ic;
Besides one or more compounds of the formula 1, the medium comprises one or more compounds selected from the group consisting of the general formulae II to XI:

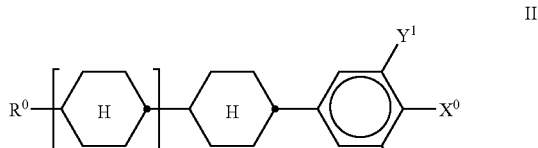

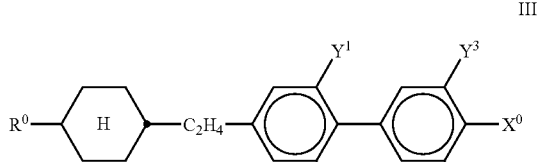

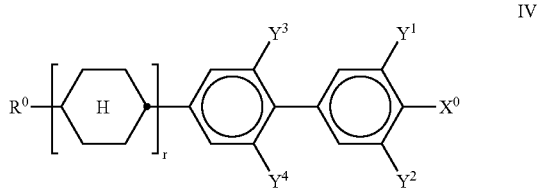

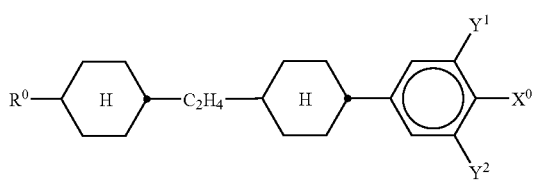

-continued

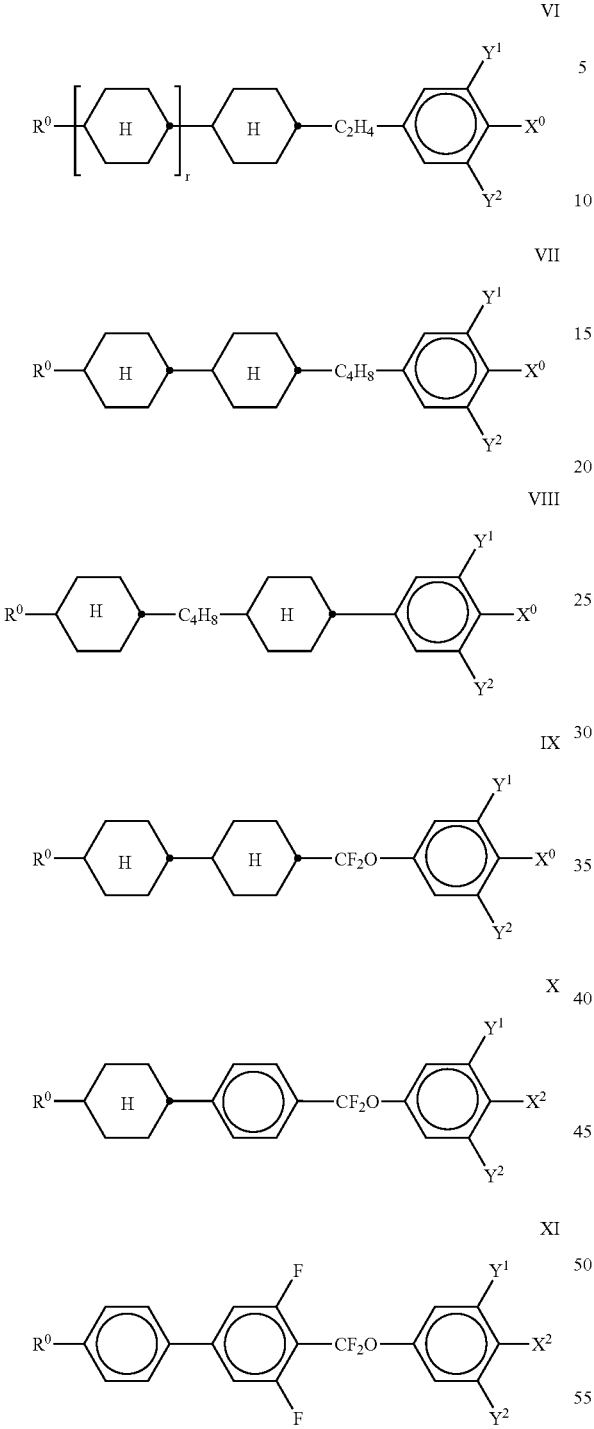

in which the individual radicals have the following meanings:
R⁰ n-alkyl, oxaalkyl, fluoroalkyl or alkenyl, each having up to 9 carbon atoms;
X⁰ F, Cl, halogenated alkyl or alkoxy having from 1 to 6 carbon atoms, or halogenated alkenyl having from 2 to 6 carbon atoms;
Y¹ and Y⁴ each, independently of one another, H or F;
r 0 or 1;

The medium preferably comprises two, three, four or five compounds of the formula II;

The medium preferably comprises one or more compounds of the formulae IIa to IIh:

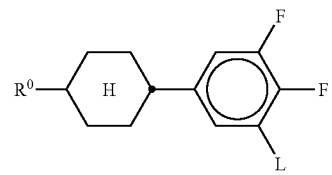

IIa

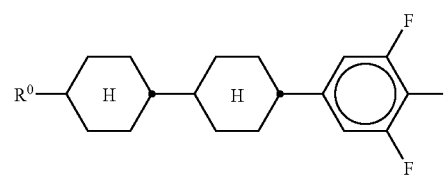

IIb

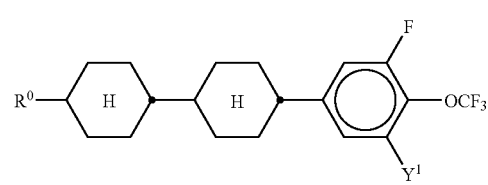

IIc

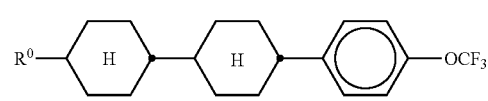

IId

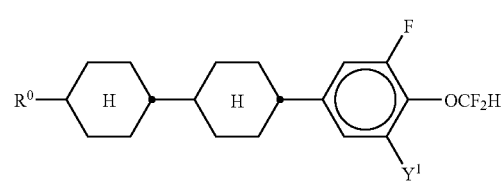

IIe

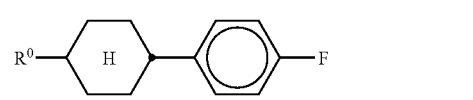

IIf

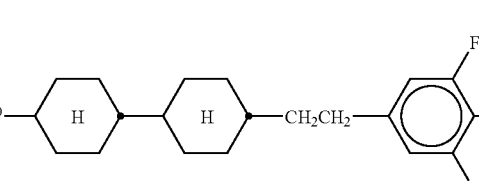

IIg

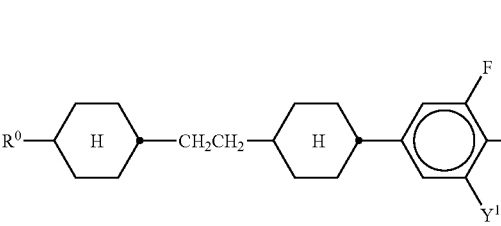

IIh in which
R⁰ and Y¹ are as defined above;

The compound of the formula IV is preferably
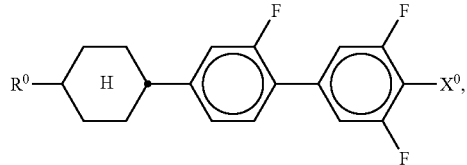
IVa
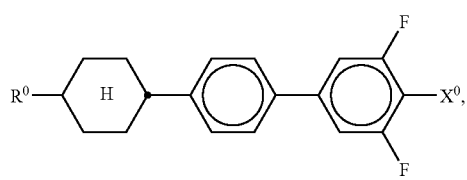
IVb
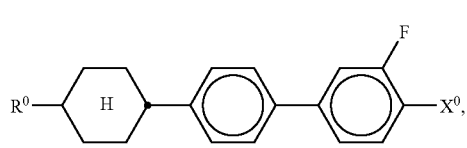
IVc
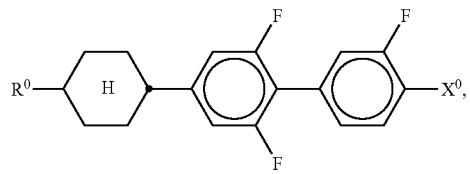
IVd
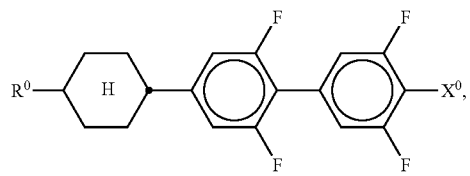
IVe
oder 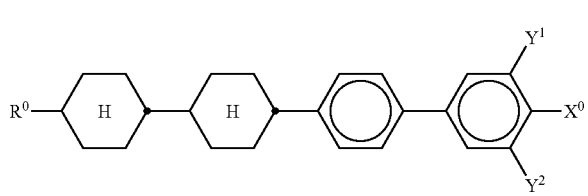
The medium additionally comprises one or more compounds selected from the group consisting of the general formulae XII to XVIII:
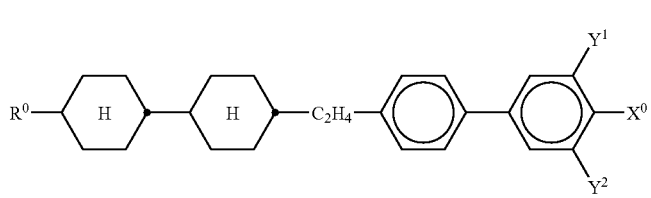
XII
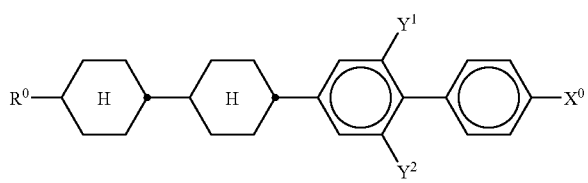
XIII
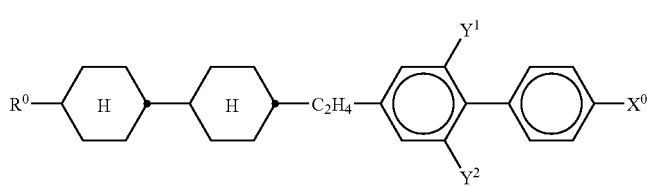
XIV
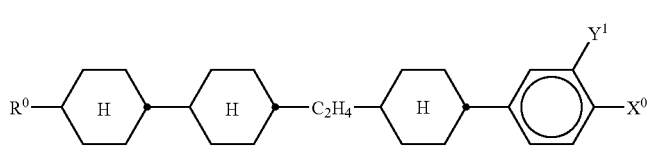
XV
XVI

XVII

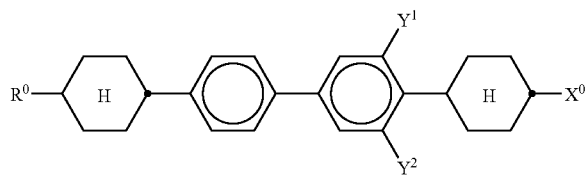

XVIII

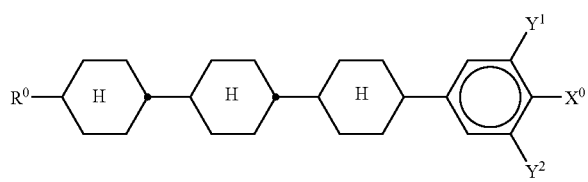

in which $R^0$, $X^0$, $Y^1$ and $Y^2$ each, independently of one another, have one of the meanings indicated in claim 2. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms;

The medium additionally comprises one or more compounds of the formula

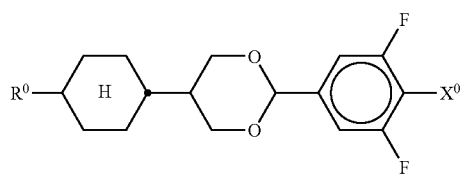

in which $R^0$ and $X^0$ are as defined above;

The medium additionally comprises one or more ester compounds of the formulae E1 to E5:

E1

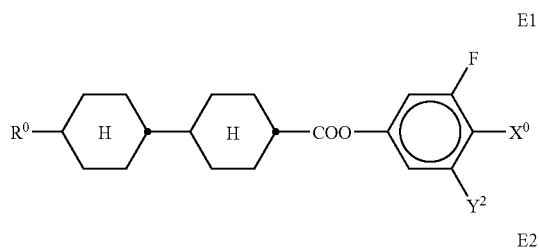

E2

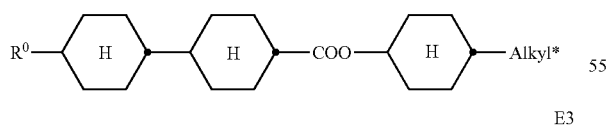

E3

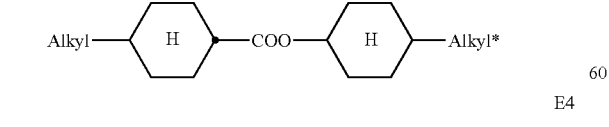

E4

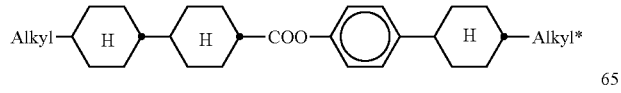

E5

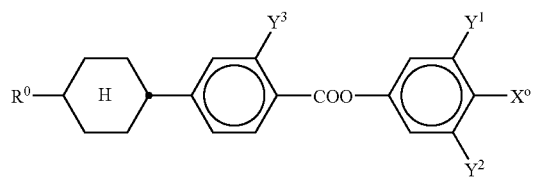

in which $R^0$, $X^0$, $Y^1$, $Y^2$ and $Y^3$ are as defined above;

The medium additionally comprises one or more compounds of the formulae Xa to Xd:

Xa

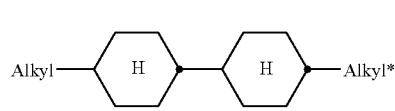

Xb

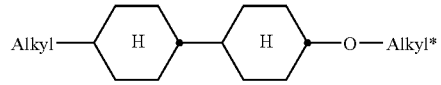

Xc

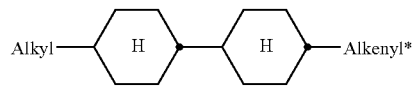

Xd

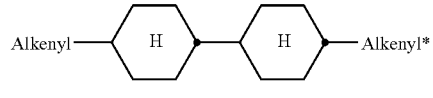

The medium additionally comprises one or more compounds of the formulae

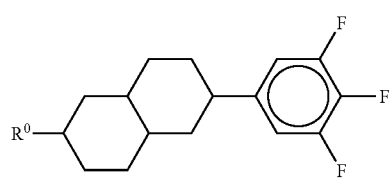

-continued

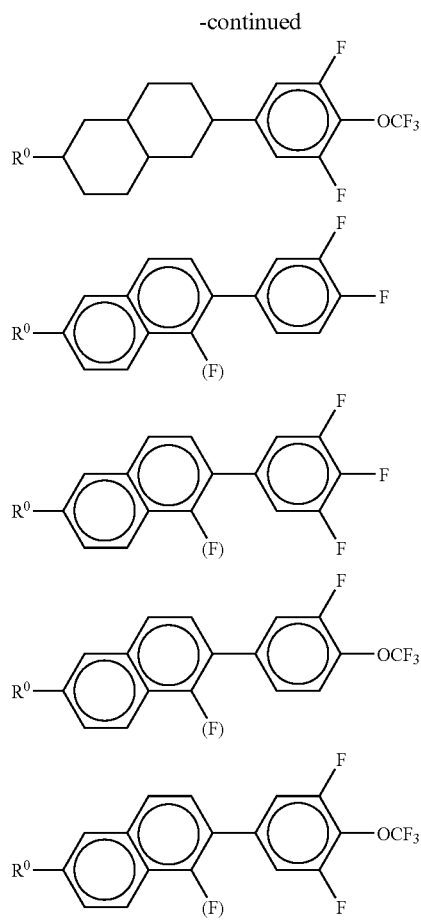

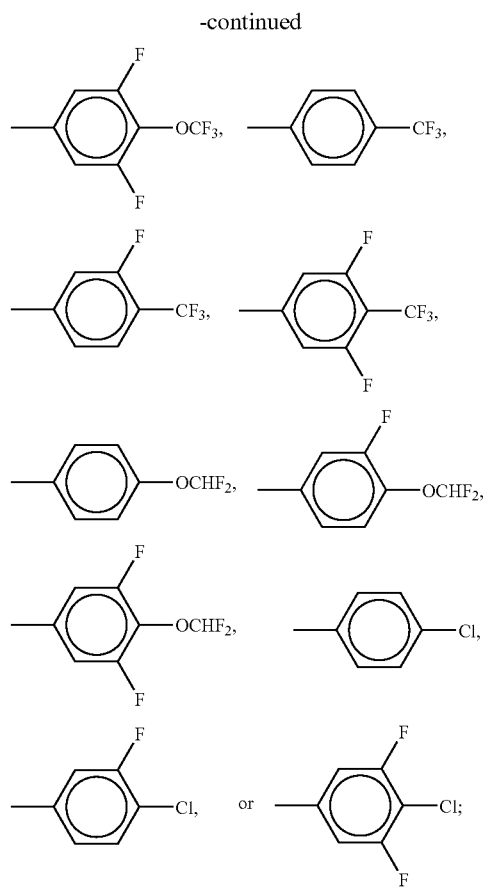

in which R⁰ is as defined above;

The proportion of compounds of the formulae I to XI together in the mixture as a whole is at least 50% by weight;

The proportion of compounds of the formula I in the mixture as a whole is from 5 to 50% by weight;

The proportion of compounds of the formulae II to XI in the mixture as a whole is from 20 to 80% by weight;

The medium comprises compounds of the formulae II, III, IV, V, VI, VII, VIII, IX, X or XI;

$R^0$ is straight-chain alkyl or alkenyl having from 2 to 7 carbon atoms;

The medium essentially consists of compounds of the formulae I to XI;

The medium comprises further compounds, preferably selected from the following group consisting of the general formulae XIX to XXII:

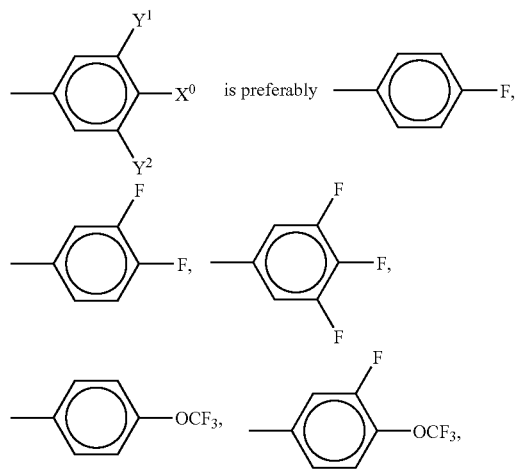

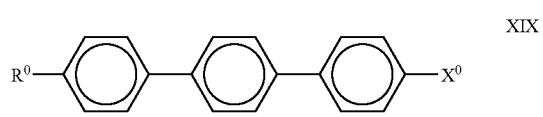

XIX

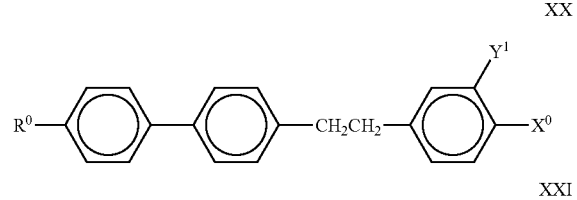

XX

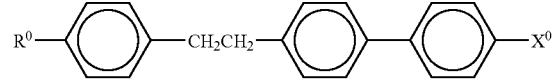

XXI

-continued

XXII

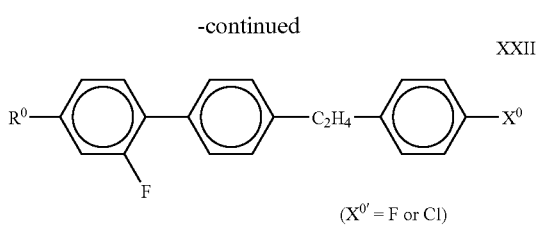

($X^{0'}$ = F or Cl)

in which $R^0$ and $X^0$ are as defined above, and the 1,4-phenylene rings may be substituted by CN, chlorine or fluorine. The 1,4-phenylene rings are preferably monosubstituted or polysubstituted by fluorine atoms;

The I: (II+III+IV+V+VI+VII+VIII+IX+X+XI) weight ratio is preferably from 1:10 to 10:1;

The medium essentially consists of compounds selected from the group consisting of the general formulae I to XVIII;

The proportion of compounds of the formulae Xa to Xd in the mixture as a whole is 3–45% by weight, preferably 5–40% by weight, in particular 5–30% by weight;

The proportion of the compounds of the formula E1 in the mixture as a whole is 10–60% by weight, preferably 10–45% by weight, in particular 15–40% by weight;

The proportion of the compounds of the formulae E2 and/or E3 in the mixture as a whole is 1–30% by weight, preferably 3–20% by weight and in particular 3–15% by weight;

The proportion of the compounds of the formula E4 is preferably ≦20% by weight, in particular ≦10% by weight.

It has been found that even a relatively small proportion of compounds of the formula I mixed with conventional liquid-crystal materials, but in particular with in which $R^0$ is as defined above;

The medium comprises one or more compounds of the formula E1a

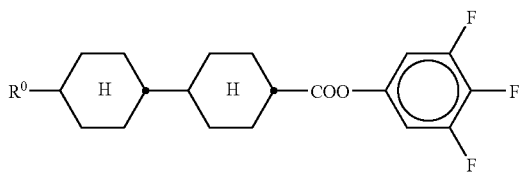

one or more compounds of the formulae II, III, IV, V, VI, VII, VIII, IX, X and/or XI, results in a lowering of the threshold voltage and in low birefringence values, with broad nematic phases with low smectic-nematic transition temperatures being observed at the same time, drastically improving the shelf life. Preference is given, in particular, to mixtures which, besides one, two three, four or more compounds of the formula I, comprise one, two three or four compounds of the formula IV, in particular compounds of the formula IVa in which $X^0$ is F or $OCF_3$.

The compounds of the formulae I to XI are colourless, stable and readily miscible with one another and with other liquid-crystalline materials.

The term "alkyl" or "alkyl*" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" or "alkenyl*" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hex-enyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of $R^0$ and $X^0$, the response times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

The optimum mixing ratio of the compounds of the formulae I and II+III+IV+V+VI+VII+VIII+IX+X+XI depends substantially on the desired properties, on the choice of the components of the formulae I, II, III, IV, V, VI, VII, VIII, IX, X and/or XI, and on the choice of any other components that may be present. Suitable mixing ratios within the range given above can easily be determined from case to case.

The total amount of compounds of the formulae I to XVIII in the mixtures according to the invention is not crucial. The mixtures can therefore comprise one or more further components for the purposes of optimisation of various properties. However, the observed effect on the response times and the threshold voltage is generally greater, the higher the total concentration of compounds of the formulae I to XVIII.

In a particularly preferred embodiment, the media according to the invention comprise compounds of the formulae II to XI (preferably II, III and/or IV, in particular IVa) in which $X^0$ is F, $OCF_3$, $OCHF_2$, F, $OCH=CF_2$, $OCF=CF_2$ or $OCF_2$—$CF_2H$. A favourable synergistic effect with the compounds of the formula I results in particularly advantageous properties. In particular, mixtures comprising compounds of the formula I and of the formula IVa are distinguished by their low threshold voltages.

The construction of the STN or MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM and very particularly reflective displays.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multibottle" systems.

The dielectrics may also comprise further additives known to the person skilled in the art and described in the literature. For example, 0–15%, preferably 0–10%, of pleochroic dyes and/or chiral dopants can be added. The individual compounds added are employed in concentrations of from 0.01 to 6%, preferably from 0.1 to 3%. However, the concentration figures for the other constituents of the liquid-crystal mixtures, i.e. of the liquid-crystalline or mesogenic compounds, are indicated without taking into account the concentration of these additives.

C denotes a crystalline phase, S a smectic phase, $S_C$ a smectic C phase, N a nematic phase and I the isotropic phase.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| V-T | CH$_2$=CH | CF$_3$ | H | H |
| V2-T | CH$_2$—CH—C$_2$H$_4$ | CF$_3$ | H | H |
| 1V-OT | CH$_3$—CH=CH | OCF$_3$ | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are given in Tables A and B.

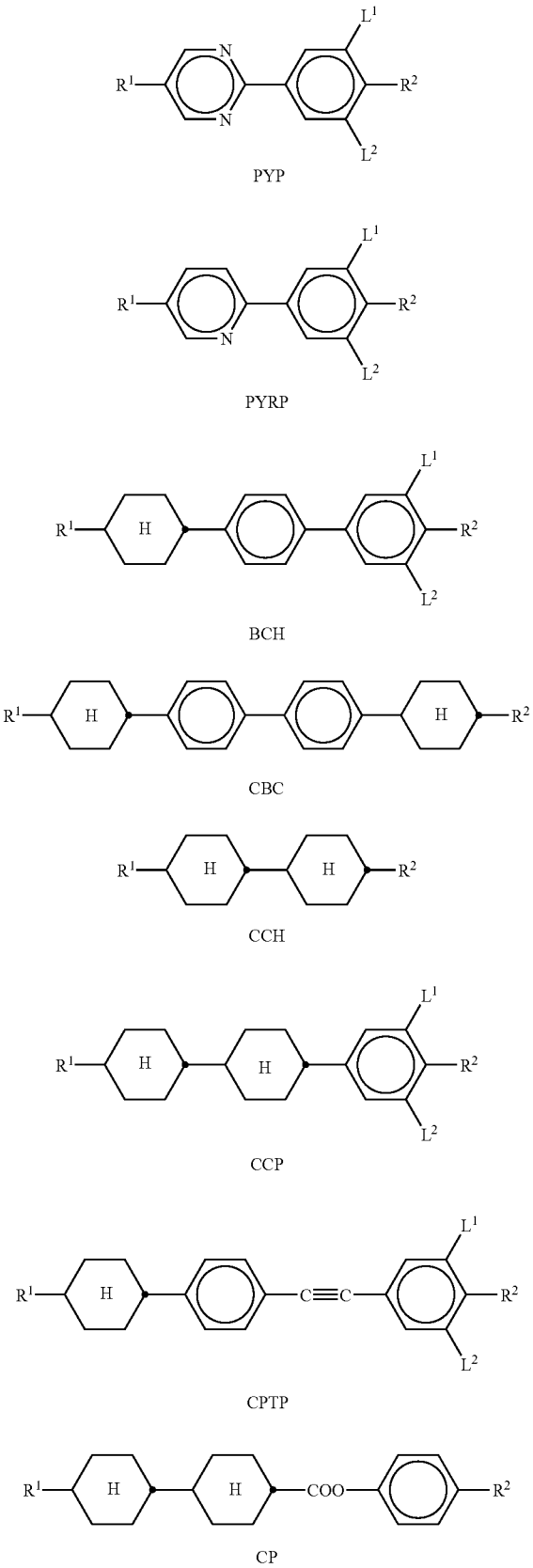

TABLE A

PYP

PYRP

BCH

CBC

CCH

CCP

CPTP

CP

TABLE A-continued
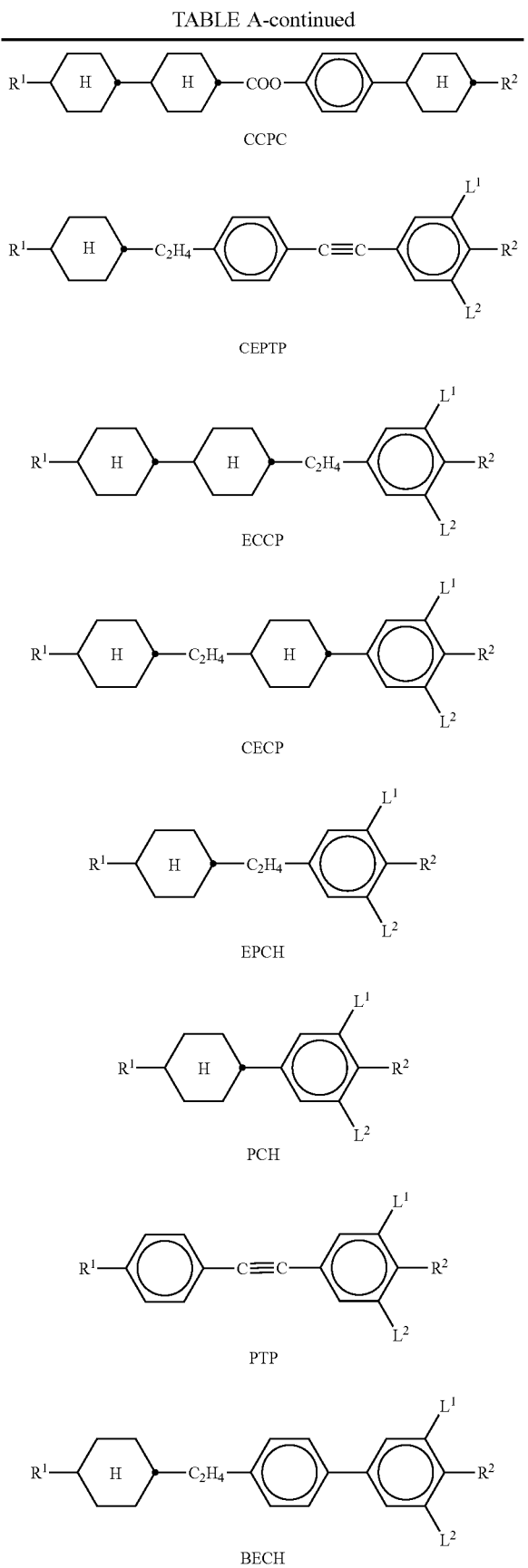
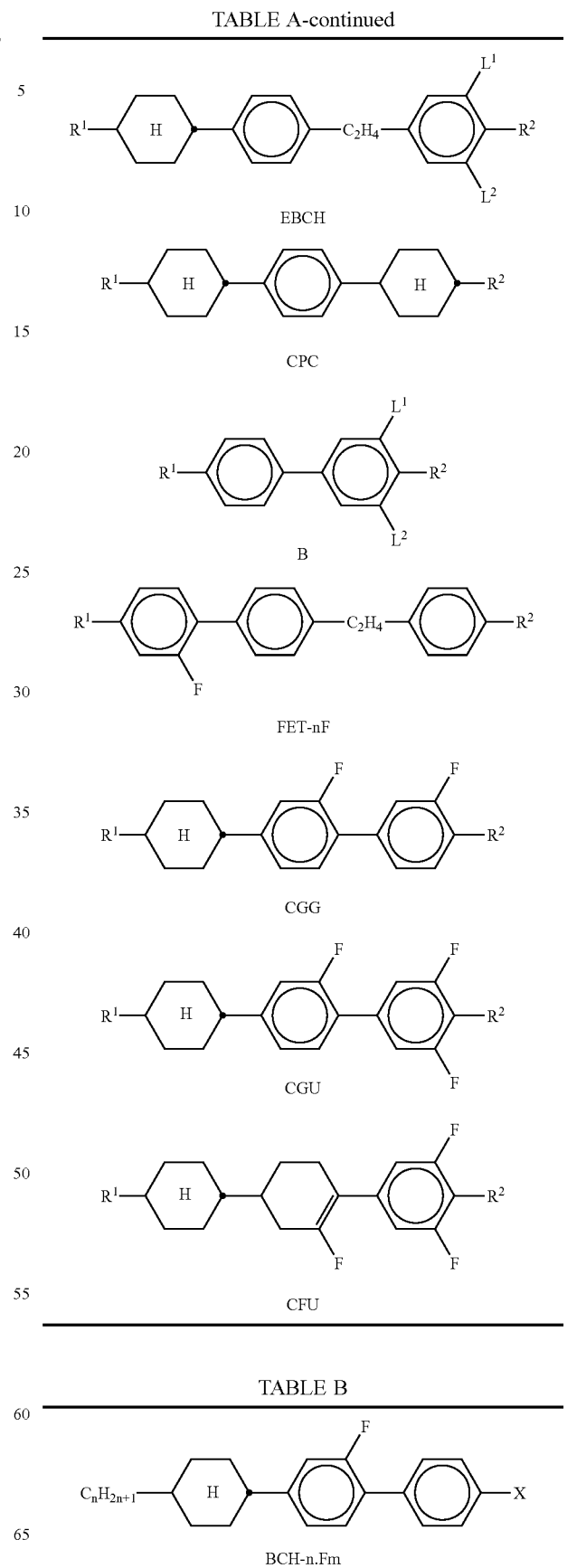
TABLE B

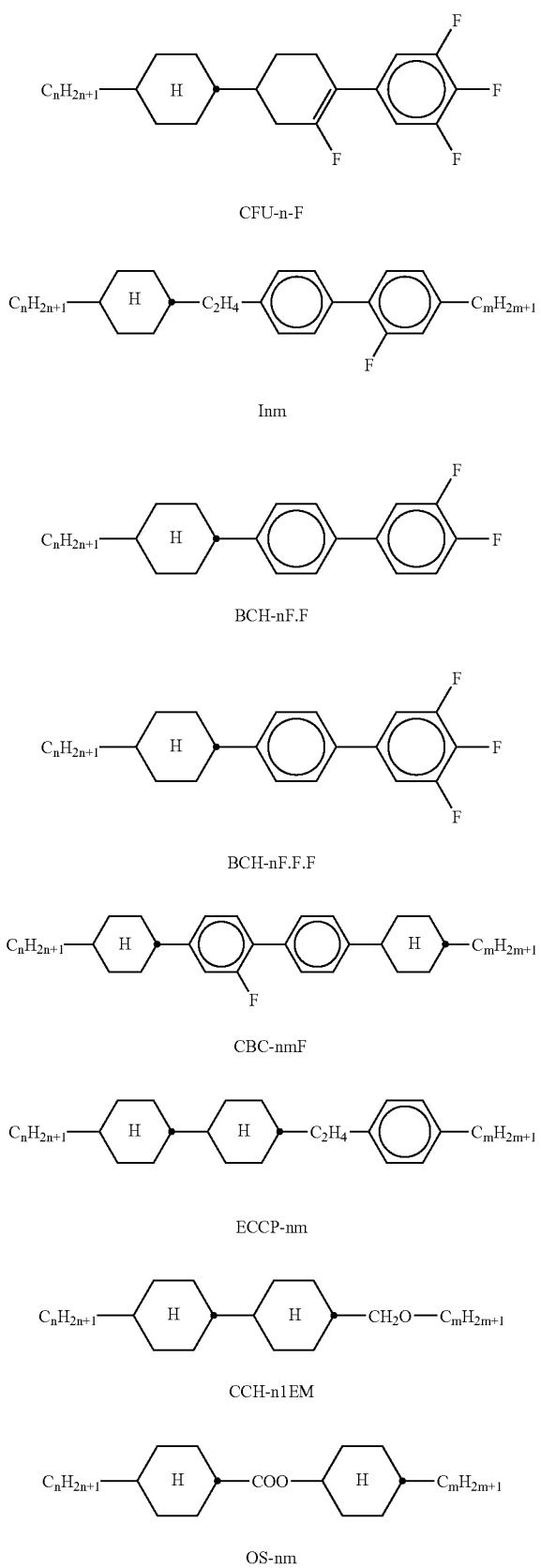
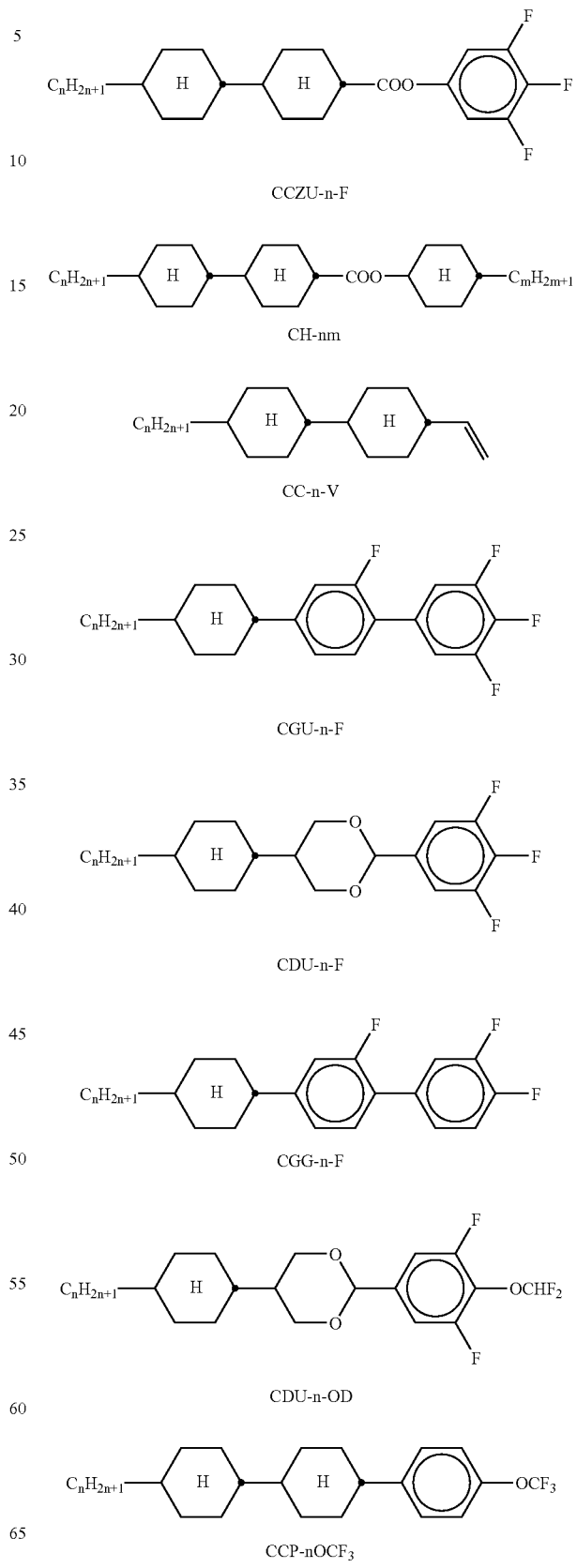

TABLE B-continued
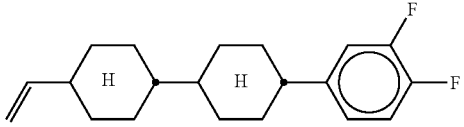
CCG-V-F
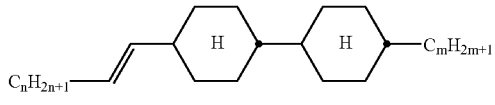
CC-nV-m
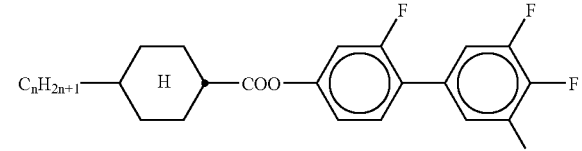
CZGU-n-F
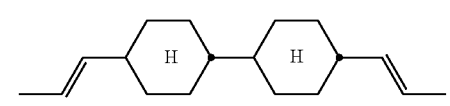
CC-1V-V1
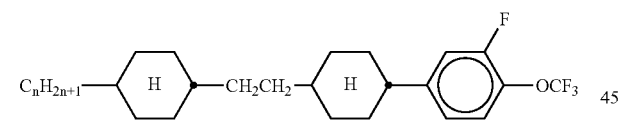
CC-n-V1
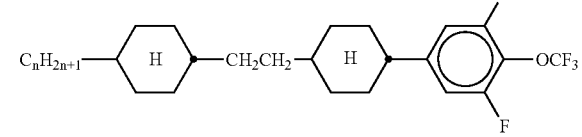
CECG-n-OT
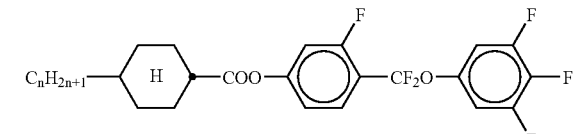
CECU-n-OT
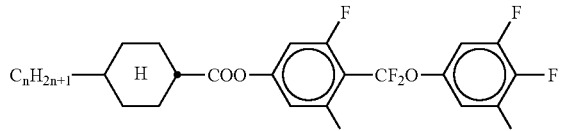
CZGQU-n-F
TABLE B-continued
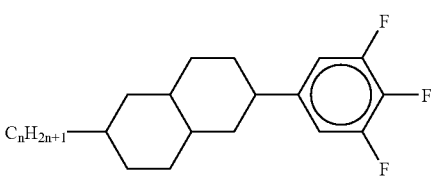
CZUQU-n-F
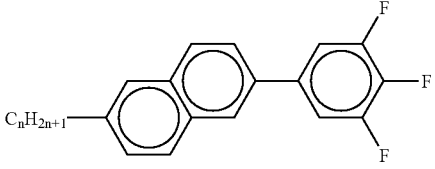
Dec-U-n-F
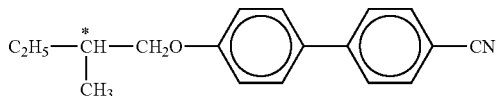
Nap-U-n-F
TABLE C
Table C indicates possible dopants which are generally added to the mixtures according to the invention.
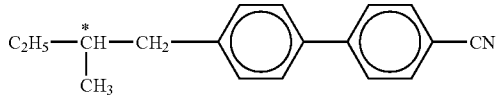
C 15
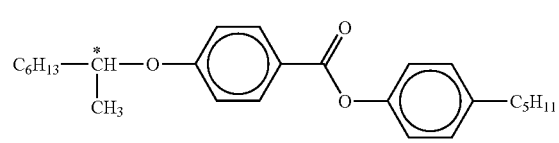
CB 15
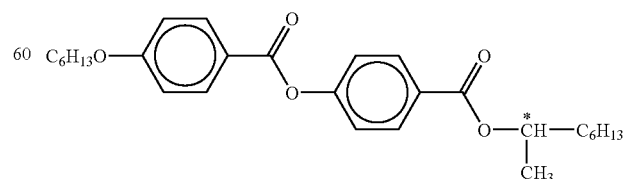
CM 21
R/S 811

TABLE C-continued

Table C indicates possible dopants which are generally added to the mixtures according to the invention.

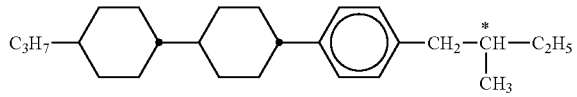

CM 44

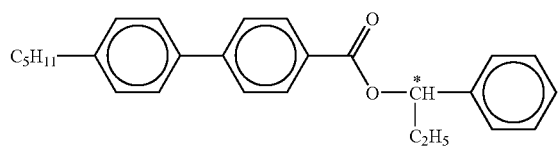

CM 45

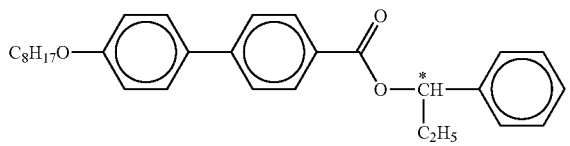

CM 47

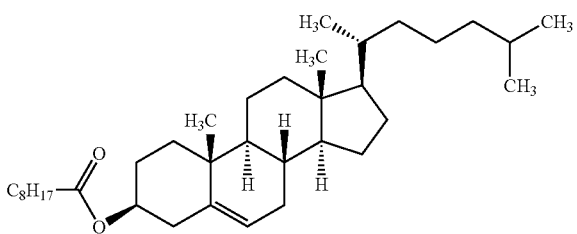

CN

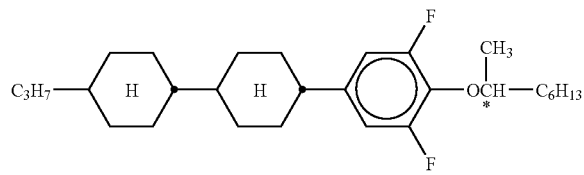

R/S 2011

The following examples are intended to explain the invention without restricting it. Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. The optical anisotropy (589 nm, 20° C.), and the flow viscosity $v_{20}$ (mm$^2$/sec) and the rotational viscosity $\gamma_1$ (mPa·s) were each determined at 20° C.

$V_{10}$ denotes the voltage for 10% transmission (viewing angle perpendicular to the plate surface). $t_{on}$ denotes the switch-on time and $t_{off}$ the switch-off time at an operating voltage corresponding to twice the value of $V_{10}$. $\Delta n$ denotes the optical anisotropy and $n_o$ the refractive index. $\Delta \epsilon$ denotes the dielectric anisotropy ($\Delta \epsilon = \epsilon_\parallel - \epsilon_\perp$, where $\epsilon_\parallel$ denotes the dielectric constant parallel to the longitudinal molecular axes and $\epsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

"Conventional work-up" means that water is added if necessary, the mixture is extracted with dichloromethane, diethyl ether, methyl tert-butyl ether or toluene, the phases are separated, the organic phase is dried and evaporated, and the product is purified by distillation under reduced pressure or crystallisation and/or chromatography. The following abbreviations are used:

n-BuLi 1.6 molar solution of n-butyllithium in n-hexane
DMAP 4-(dimethylamino)pyridine
THF tetrahydrofuran
DCC N,N'-dicyclohexylcarbodiimide

EXAMPLE 1

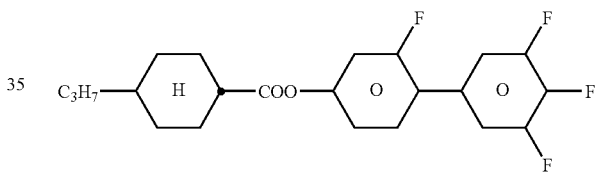

Step 1.1

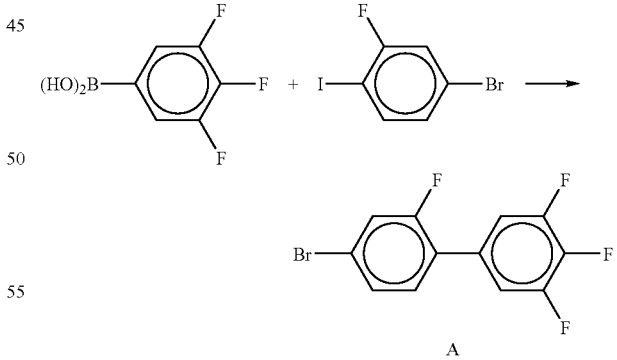

1.350 mol of 3,4,5-trifluorophenylboronic acid, 1.400 mol of 1-bromo-3-fluoro-4-iodobenzene, 0.08 mol of palladium (II) acetate and 0.012 mol of triphenylphosphine in 2 l of 2-propanol are refluxed overnight under $N_2$. The reaction solution is allowed to cool to room temperature, water is added, and the mixture is filtered through Celite with suction. The filtrate is subjected to conventional work-up.

Step 1.2

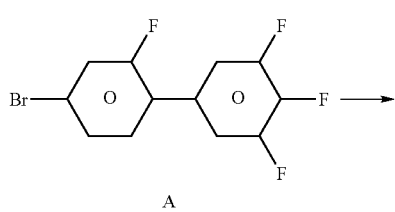

0.538 mol of A is dissolved in 1 l of diethyl ether, and 340 ml of BuLi (15% solution in n-hexane) are added dropwise to this solution at −70° C. The mixture is stirred for 0.5 hour, before 0.541 mol of trimethyl borate is added. The reaction mixture is allowed to warm from −70° C. to −15° C., and 70 ml of glacial acetic acid and 100 ml of water are added. The reaction mixture is subsequently allowed to warm to 30° C., and 140 ml of $H_2O_2$ are added dropwise, during which the temperature is held at 30–40° C. In order to complete the oxidation, the reaction mixture is refluxed for a further 2 hours. After cooling to room temperature, the reaction mixture is extracted a number of times with a saturated ammonium iron(II) sulfate solution. The combined organic phases are washed with methyl tert-butyl ether. Finally, the combined aqueous phases are washed again with ammonium iron(II) sulfate solution before being subjected to conventional work-up. m.p.: 82° C.

NMR ($CDCl_3$): δ=5.65 (s, 1H), δ=6.7 (m, 2H), δ=7.10 (m, 2H), δ=7.25 (m, 1H)

Step 1.3

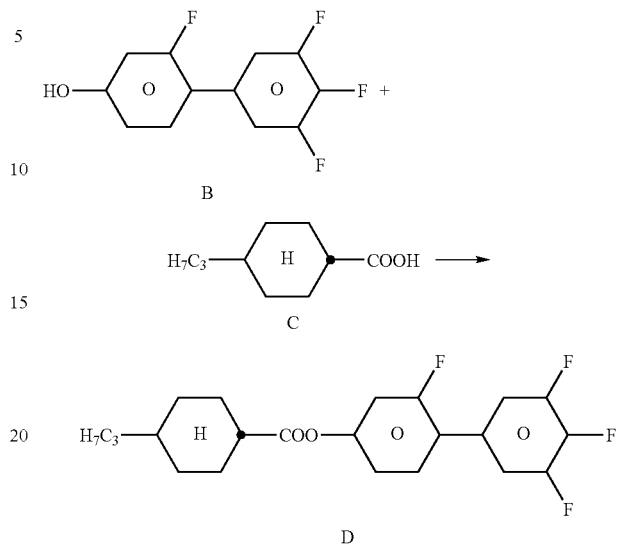

A solution consisting of 0.140 mol of DCC in 100 ml of toluene is added dropwise at room temperature to 0.124 mol of B, 0.124 mol of C and 0.005 mol of DMAP in 200 ml of toluene with stirring under an $N_2$ atmosphere. When the addition of DCC is complete, the bottom sediment is filtered off with suction and washed with toluene. The crystal batch is recrystallised from n-hexane. C 50 N 73.6 I; Δn=0.1140; Δε=16.46.

The following compounds of the formula

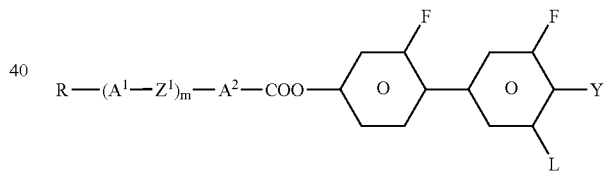

are prepared analogously:

| R | —(A¹—Z¹)ₘ—A²— | Y | L | |
|---|---|---|---|---|
| CH₃ | cyclohexyl(H) | F | H | |
| CH₃ | cyclohexyl(H) | F | F | |
| C₂H₅ | cyclohexyl(H) | F | H | |
| C₂H₅ | cyclohexyl(H) | F | F | C 57 N (40.4) I; Δε = 16.4; Δn = 0.1090 |

-continued
| R | —(A¹—Z¹)ₘ—A²— | Y | L | |
|---|---|---|---|---|
| n-C₃H₇ | 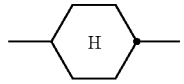 | F | H | |
| n-C₄H₉ | 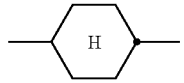 | F | H | |
| n-C₄H₉ | 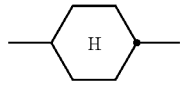 | F | F | |
| n-C₅H₁₁ | 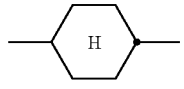 | F | H | |
| n-C₅H₁₁ | 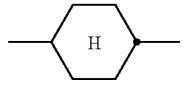 | F | F | C 39 N 82.1 $\Delta\epsilon = 15.1$; $\Delta n = 0.1110$ |
| n-C₆H₁₃ | 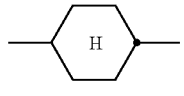 | F | H | |
| n-C₆H₁₃ | 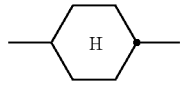 | F | F | |
| CH₂=CH | 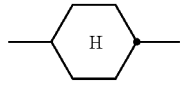 | F | H | |
| CH₂=CH | 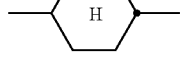 | F | F | |
| CH₃CH=CH | 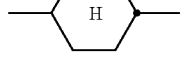 | F | H | |
| CH₃CH=CH | 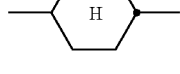 | F | F | |
| CH₃O | 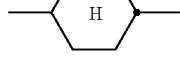 | F | H | |
| CH₃O | 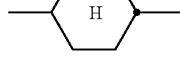 | F | F | |
| CH₃CH₂OCH₂ | 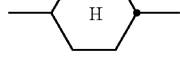 | F | H | |
| CH₃CH₂OCH₂ | 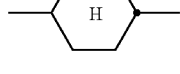 | F | F | |

-continued

| R | —(A¹—Z¹)ₘ—A²— | Y | L |
|---|---|---|---|
| CH₃ | cyclohexyl(H) | OCF₃ | H |
| CH₃ | cyclohexyl(H) | OCF₃ | F |
| C₂H₅ | cyclohexyl(H) | OCF₃ | H |
| C₂H₅ | cyclohexyl(H) | OCF₃ | F |
| n-C₃H₇ | cyclohexyl(H) | OCF₃ | H |
| n-C₃H₇ | cyclohexyl(H) | OCF₃ | F |
| n-C₄H₉ | cyclohexyl(H) | OCF₃ | H |
| n-C₄H₉ | cyclohexyl(H) | OCF₃ | F |
| n-C₅H₁₁ | cyclohexyl(H) | OCF₃ | H |
| n-C₅H₁₁ | cyclohexyl(H) | OCF₃ | F |
| n-C₆H₁₃ | cyclohexyl(H) | OCF₃ | H |
| n-C₆H₁₃ | cyclohexyl(H) | OCF₃ | F |
| CH₂=CH | cyclohexyl(H) | OCF₃ | H |
| CH₂=CH | cyclohexyl(H) | OCF₃ | F |
| CH₃CH=CH | cyclohexyl(H) | OCF₃ | H |

-continued
| R | —(A¹—Z¹)ₘ—A²— | Y | L |
|---|---|---|---|
| CH₃CH=CH |  | OCF₃ | F |
| CH₃O | 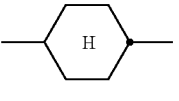 | OCF₃ | H |
| CH₃O | 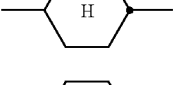 | OCF₃ | F |
| CH₃CH₂OCH₂ | 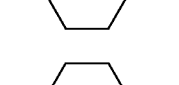 | OCF₃ | H |
| CH₃CH₂OCH₂ | 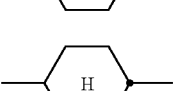 | OCF₃ | F |
| CH₃ | 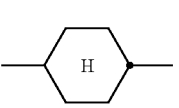 | OCHF₂ | H |
| CH₃ | 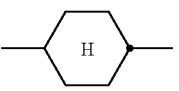 | OCHF₂ | F |
| C₂H₅ | 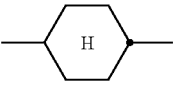 | OCHF₂ | H |
| C₂H₅ | 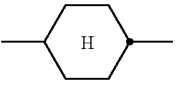 | OCHF₂ | F |
| n-C₃H₇ | 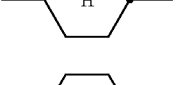 | OCHF₂ | H |
| n-C₃H₇ | 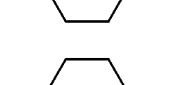 | OCHF₂ | F |
| n-C₄H₉ | 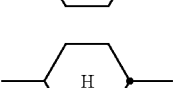 | OCHF₂ | H |
| n-C₄H₉ | 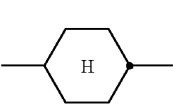 | OCHF₂ | F |
| n-C₅H₁₁ |  | OCHF₂ | H |
| n-C₅H₁₁ |  | OCHF₂ | F |

-continued
| R | —(A¹—Z¹)ₘ—A²— | Y | L |
|---|---|---|---|
| n-C₆H₁₁ | 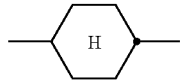 | OCHF₂ | H |
| n-C₆H₁₁ | 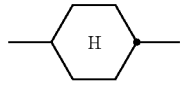 | OCHF₂ | F |
| CH₂=CH |  | OCHF₂ | H |
| CH₂=CH | 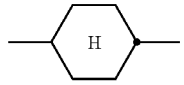 | OCHF₂ | F |
| CH₃CH=CH | 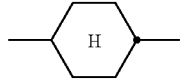 | OCHF₂ | H |
| CH₃CH=CH |  | OCHF₂ | F |
| CH₃O | 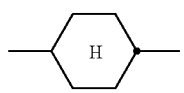 | OCHF₂ | H |
| CH₃O | 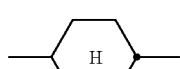 | OCHF₂ | F |
| CH₃CH₂OCH₂ | 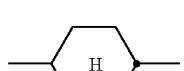 | OCHF₂ | H |
| CH₃CH₂OCH₂ | 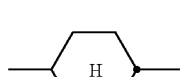 | OCHF₂ | F |
| CH₃ | 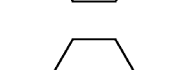 | CN | H |
| CH₃ |  | CN | F |
| C₂H₅ | 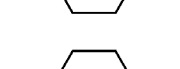 | CN | H |
| C₂H₅ | 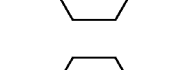 | CN | F |
| n-C₃H₇ | 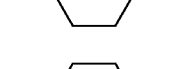 | CN | H |

-continued
| R | —(A¹—Z¹)ₘ—A²— | Y | L |
|---|---|---|---|
| n-C₃H₇ | 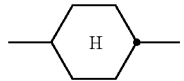 | CN | F |
| n-C₄H₉ |  | CN | H |
| n-C₄H₉ | 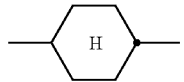 | CN | F |
| n-C₅H₁₁ | 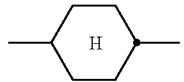 | CN | H |
| n-C₅H₁₁ | 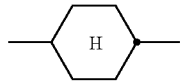 | CN | F |
| n-C₆H₁₁ | 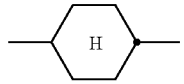 | CN | H |
| n-C₆H₁₁ | 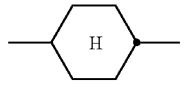 | CN | F |
| CH₂=CH | 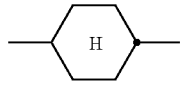 | CN | H |
| CH₂=CH | 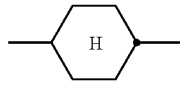 | CN | F |
| CH₃CH=CH | 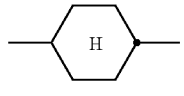 | CN | H |
| CH₃CH=CH | 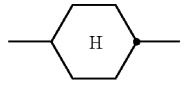 | CN | F |
| CH₃O | 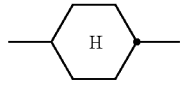 | CN | H |
| CH₃O | 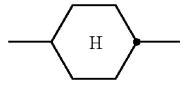 | CN | F |
| CH₃CH₂OCH₂ | 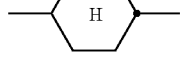 | CN | H |
| CH₃CH₂OCH₂ | 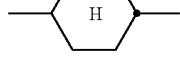 | CN | F |

-continued
| R | —(A¹—Z¹)ₘ—A²— | Y | L |
|---|---|---|---|
| CH₃ | 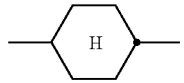 | OCF₂CHFCH₃ | H |
| CH₃ | 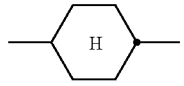 | OCF₂CHFCH₃ | F |
| C₂H₅ | 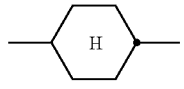 | OCF₂CHFCH₃ | H |
| C₂H₅ | 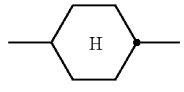 | OCF₂CHFCH₃ | F |
| n-C₃H₇ | 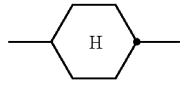 | OCF₂CHFCH₃ | H |
| n-C₃H₇ | 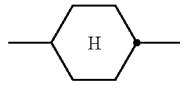 | OCF₂CHFCH₃ | F |
| n-C₄H₉ | 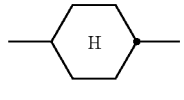 | OCF₂CHFCH₃ | H |
| n-C₄H₉ | 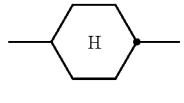 | OCF₂CHFCH₃ | F |
| n-C₅H₁₁ | 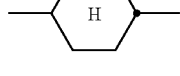 | OCF₂CHFCH₃ | H |
| n-C₅H₁₁ | 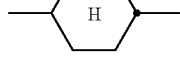 | OCF₂CHFCH₃ | F |
| n-C₆H₁₁ | 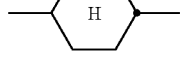 | OCF₂CHFCH₃ | H |
| n-C₆H₁₁ | 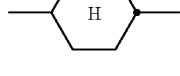 | OCF₂CHFCH₃ | F |
| CH₂=CH | 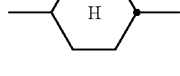 | OCF₂CHFCH₃ | H |
| CH₂=CH | 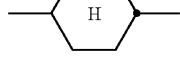 | OCF₂CHFCH₃ | F |
| CH₃CH=CH | 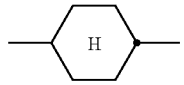 | OCF₂CHFCH₃ | H |

-continued

| R | —(A¹—Z¹)ₘ—A²— | Y | L | |
|---|---|---|---|---|
| $CH_3CH=CH$ | —[H]— | $OCF_2CHFCH_3$ | F | |
| $CH_3O$ | —[H]— | $OCF_2CHFCH_3$ | H | |
| $CH_3O$ | —[H]— | $OCF_2CHFCH_3$ | F | |
| $CH_3CH_2OCH_2$ | —[H]— | $OCF_2CHFCH_3$ | H | |
| $CH_3CH_2OCH_2$ | —[H]— | $OCF_2CHFCH_3$ | F | |
| $CH_3$ | —[H]—[H]— | F | H | |
| $CH_3$ | —[H]—[H]— | F | F | |
| $C_2H_5$ | —[H]—[H]— | F | H | |
| $C_2H_5$ | —[H]—[H]— | F | F | C 90 N 222.8 I; $\Delta\epsilon = 14.5$; $\Delta n = 0.1050$ |
| $n-C_3H_7$ | —[H]—[H]— | F | H | |
| $n-C_3H_7$ | —[H]—[H]— | F | F | C 79 N 247.1 I; $\Delta\epsilon = 14.5$; $\Delta n = 0.1090$ |
| $n-C_4H_9$ | —[H]—[H]— | F | H | |
| $n-C_4H_9$ | —[H]—[H]— | F | F | C 76 N 241.4 I; $\Delta\epsilon = 14.3$; $\Delta n = 0.1060$ |
| $n-C_5H_{11}$ | —[H]—[H]— | F | H | |
| $n-C_5H_{11}$ | —[H]—[H]— | F | F | C 79 N 238.3 I; $\Delta\epsilon = 14.0$; $\Delta n = 0.1060$ |

-continued
| R | —(A¹—Z¹)ₘ—A²— | Y | L |
|---|---|---|---|
| n-C₆H₁₃ | 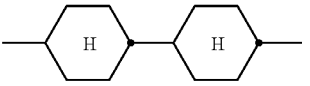 | F | H |
| n-C₆H₁₃ | 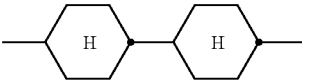 | F | F |
| CH₂=CH | 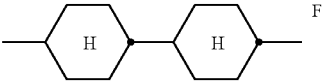 | F | H |
| CH₂=CH | 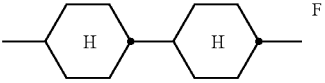 | F | F |
| CH₃CH=CH | 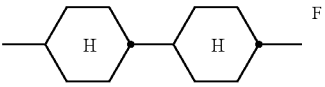 | F | H |
| CH₃CH=CH | 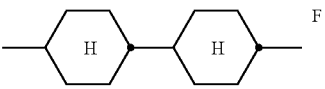 | F | F |
| CH₃O | 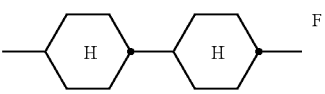 | F | H |
| CH₃O | 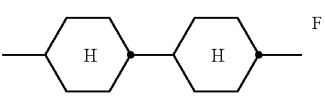 | F | F |
| CH₃CH₂OCH₂ | 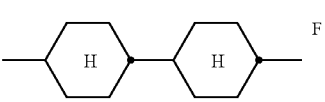 | F | H |
| CH₃CH₂OCH₂ | 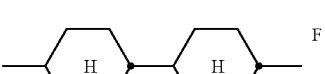 | F | F |
| CH₃ | 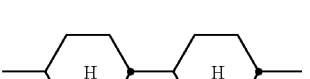 | OCF₃ | H |
| CH₃ |  | OCF₃ | F |
| C₂H₅ |  | OCF₃ | H |
| C₂H₅ |  | OCF₃ | F |
| n-C₃H₇ |  | OCF₃ | H |

-continued

| R | —(A¹—Z¹)ₘ—A²— | Y | L |
|---|---|---|---|
| n-C$_3$H$_7$ | Cy-Cy | OCF$_3$ | F |
| n-C$_4$H$_9$ | Cy-Cy | OCF$_3$ | H |
| n-C$_4$H$_9$ | Cy-Cy | OCF$_3$ | F |
| n-C$_5$H$_{11}$ | Cy-Cy | OCF$_3$ | H |
| n-C$_5$H$_{11}$ | Cy-Cy | OCF$_3$ | F |
| n-C$_6$H$_{13}$ | Cy-Cy | OCF$_3$ | H |
| n-C$_6$H$_{13}$ | Cy-Cy | OCF$_3$ | F |
| CH$_2$=CH | Cy-Cy | OCF$_3$ | H |
| CH$_2$=CH | Cy-Cy | OCF$_3$ | F |
| CH$_3$CH=CH | Cy-Cy | OCF$_3$ | H |
| CH$_3$CH=CH | Cy-Cy | OCF$_3$ | F |
| CH$_3$O | Cy-Cy | OCF$_3$ | H |
| CH$_3$O | Cy-Cy | OCF$_3$ | F |
| CH$_3$CH$_2$OCH$_2$ | Cy-Cy | OCF$_3$ | H |
| CH$_3$CH$_2$OCH$_2$ | Cy-Cy | OCF$_3$ | F |

-continued

| R | —(A¹—Z¹)ₘ—A²— | Y | L |
|---|---|---|---|
| CH₃ | Cy-Cy | OCHF₂ | H |
| CH₃ | Cy-Cy | OCHF₂ | F |
| C₂H₅ | Cy-Cy | OCHF₂ | H |
| C₂H₅ | Cy-Cy | OCHF₂ | F |
| n-C₃H₇ | Cy-Cy | OCHF₂ | H |
| n-C₃H₇ | Cy-Cy | OCHF₂ | F |
| n-C₄H₉ | Cy-Cy | OCHF₂ | H |
| n-C₄H₉ | Cy-Cy | OCHF₂ | F |
| n-C₅H₁₁ | Cy-Cy | OCHF₂ | H |
| n-C₅H₁₁ | Cy-Cy | OCHF₂ | F |
| n-C₆H₁₁ | Cy-Cy | OCHF₂ | H |
| n-C₆H₁₁ | Cy-Cy | OCHF₂ | F |
| CH₂=CH | Cy-Cy | OCHF₂ | H |
| CH₂=CH | Cy-Cy | OCHF₂ | F |
| CH₃CH=CH | Cy-Cy | OCHF₂ | H |

-continued

| R | —(A¹—Z¹)ₘ—A²— | Y | L |
|---|---|---|---|
| CH₃CH=CH | H–H (both H cyclohexane) | OCHF₂ | F |
| CH₃O | H–H | OCHF₂ | H |
| CH₃O | H–H | OCHF₂ | F |
| CH₃CH₂OCH₂ | H–H | OCHF₂ | H |
| CH₃CH₂OCH₂ | H–H | OCHF₂ | F |
| CH₃ | H–H | CN | H |
| CH₃ | H–H | CN | F |
| C₂H₅ | H–H | CN | H |
| C₂H₅ | H–H | CN | F |
| n-C₃H₇ | H–H | CN | H |
| n-C₃H₇ | H–H | CN | F |
| n-C₄H₉ | H–H | CN | H |
| n-C₄H₉ | H–H | CN | F |
| n-C₅H₁₁ | H–H | CN | H |
| n-C₅H₁₁ | H–H | CN | F |

-continued

| R | —(A¹—Z¹)ₘ—A²— | Y | L |
|---|---|---|---|
| n-C$_6$H$_{11}$ | Cy-Cy | CN | H |
| n-C$_6$H$_{11}$ | Cy-Cy | CN | F |
| CH$_2$=CH | Cy-Cy | CN | H |
| CH$_2$=CH | Cy-Cy | CN | F |
| CH$_3$CH=CH | Cy-Cy | CN | H |
| CH$_3$CH=CH | Cy-Cy | CN | F |
| CH$_3$O | Cy-Cy | CN | H |
| CH$_3$O | Cy-Cy | CN | F |
| CH$_3$CH$_2$OCH$_2$ | Cy-Cy | CN | H |
| CH$_3$CH$_2$OCH$_2$ | Cy-Cy | CN | F |
| CH$_3$ | Cy-Cy | OCF$_2$CHFCH$_3$ | H |
| CH$_3$ | Cy-Cy | OCF$_2$CHFCH$_3$ | F |
| C$_2$H$_5$ | Cy-Cy | OCF$_2$CHFCH$_3$ | H |
| C$_2$H$_5$ | Cy-Cy | OCF$_2$CHFCH$_3$ | F |
| n-C$_3$H$_7$ | Cy-Cy | OCF$_2$CHFCH$_3$ | H |

-continued

| R | —(A¹—Z¹)ₘ—A²— | Y | L |
|---|---|---|---|
| n-C₃H₇ | Cy-Cy | OCF₂CHFCH₃ | F |
| n-C₄H₉ | Cy-Cy | OCF₂CHFCH₃ | H |
| n-C₄H₉ | Cy-Cy | OCF₂CHFCH₃ | F |
| n-C₅H₁₁ | Cy-Cy | OCF₂CHFCH₃ | H |
| n-C₅H₁₁ | Cy-Cy | OCF₂CHFCH₃ | F |
| n-C₆H₁₁ | Cy-Cy | OCF₂CHFCH₃ | H |
| n-C₆H₁₁ | Cy-Cy | OCF₂CHFCH₃ | F |
| CH₂=CH | Cy-Cy | OCF₂CHFCH₃ | H |
| CH₂=CH | Cy-Cy | OCF₂CHFCH₃ | F |
| CH₃CH=CH | Cy-Cy | OCF₂CHFCH₃ | H |
| CH₃CH=CH | Cy-Cy | OCF₂CHFCH₃ | F |
| CH₃O | Cy-Cy | OCF₂CHFCH₃ | H |
| CH₃O | Cy-Cy | OCF₂CHFCH₃ | F |
| CH₃CH₂OCH₂ | Cy-Cy | OCF₂CHFCH₃ | H |
| CH₃CH₂OCH₂ | Cy-Cy | OCF₂CHFCH₃ | F |

| R | —(A¹—Z¹)ₘ—A²— | Y | L |
|---|---|---|---|
| CH₃ | 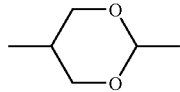 | F | H |
| CH₃ | 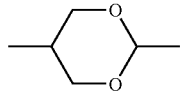 | F | F |
| C₂H₅ | 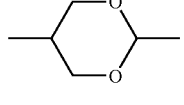 | F | H |
| C₂H₅ | 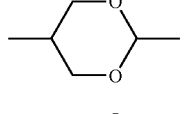 | F | F |
| n-C₃H₇ | 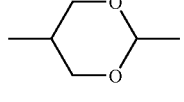 | F | H |
| n-C₃H₇ | 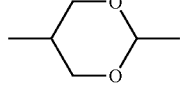 | F | F |
| n-C₄H₉ | 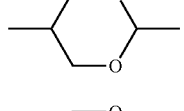 | F | H |
| n-C₄H₉ | 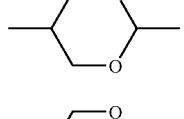 | F | F |
| n-C₅H₁₁ | 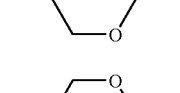 | F | H |
| n-C₅H₁₁ | 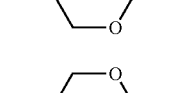 | F | F |
| n-C₆H₁₃ | 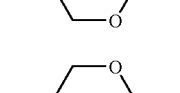 | F | H |
| n-C₆H₁₃ | 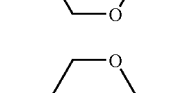 | F | F |
| CH₂=CH | 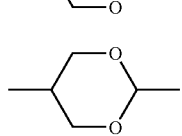 | F | H |
| CH₂=CH |  | F | F |

-continued

| R | —(A¹—Z¹)ₘ—A²— | Y | L |
|---|---|---|---|
| CH₃CH=CH | dioxane (5,2) | F | H |
| CH₃CH=CH | dioxane (2,5) | F | F |
| CH₃O | dioxane (5,2) | F | H |
| CH₃O | dioxane (2,5) | F | F |
| CH₃CH₂OCH₂ | dioxane (5,2) | F | H |
| CH₃CH₂OCH₂ | dioxane (2,5) | F | F |
| CH₃ | dioxane (5,2) | OCF₃ | H |
| CH₃ | dioxane (2,5) | OCF₃ | F |
| C₂H₅ | dioxane (5,2) | OCF₃ | H |
| C₂H₅ | dioxane (2,5) | OCF₃ | F |
| n-C₃H₇ | dioxane (5,2) | OCF₃ | H |
| n-C₃H₇ | dioxane (2,5) | OCF₃ | F |
| n-C₄H₉ | dioxane (5,2) | OCF₃ | H |

-continued

| R | —(A¹—Z¹)ₘ—A²— | Y | L |
|---|---|---|---|
| n-C₄H₉ | dioxane | OCF₃ | F |
| n-C₅H₁₁ | dioxane | OCF₃ | H |
| n-C₅H₁₁ | dioxane | OCF₃ | F |
| n-C₆H₁₃ | dioxane | OCF₃ | H |
| n-C₆H₁₃ | dioxane | OCF₃ | F |
| CH₂=CH | dioxane | OCF₃ | H |
| CH₂=CH | dioxane | OCF₃ | F |
| CH₃CH=CH | dioxane | OCF₃ | H |
| CH₃CH=CH | dioxane | OCF₃ | F |
| CH₃O | dioxane | OCF₃ | H |
| CH₃O | dioxane | OCF₃ | F |
| CH₃CH₂OCH₂ | dioxane | OCF₃ | H |
| CH₃CH₂OCH₂ | dioxane | OCF₃ | F |
| CH₃ | dioxane | OCHF₂ | H |

-continued

| R | —(A¹—Z¹)ₘ—A²— | Y | L |
|---|---|---|---|
| CH₃ | dioxane | OCHF₂ | F |
| C₂H₅ | dioxane | OCHF₂ | H |
| C₂H₅ | dioxane | OCHF₂ | F |
| n-C₃H₇ | dioxane | OCHF₂ | H |
| n-C₃H₇ | dioxane | OCHF₂ | F |
| n-C₄H₉ | dioxane | OCHF₂ | H |
| n-C₄H₉ | dioxane | OCHF₂ | F |
| n-C₅H₁₁ | dioxane | OCHF₂ | H |
| n-C₅H₁₁ | dioxane | OCHF₂ | F |
| n-C₆H₁₁ | dioxane | OCHF₂ | H |
| n-C₆H₁₁ | dioxane | OCHF₂ | F |
| CH₂=CH | dioxane | OCHF₂ | H |
| CH₂=CH | dioxane | OCHF₂ | F |

-continued
| R | —(A¹—Z¹)ₘ—A²— | Y | L |
|---|---|---|---|
| CH₃CH=CH | 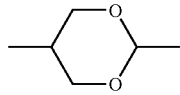 | OCHF₂ | H |
| CH₃CH=CH | 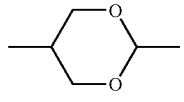 | OCHF₂ | F |
| CH₃O | 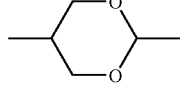 | OCHF₂ | H |
| CH₃O | 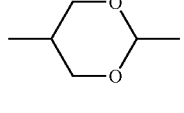 | OCHF₂ | F |
| CH₃CH₂OCH₂ | 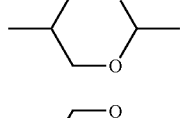 | OCHF₂ | H |
| CH₃CH₂OCH₂ | 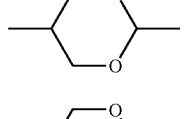 | OCHF₂ | F |
| CH₃ | 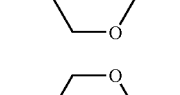 | CN | H |
| CH₃ | 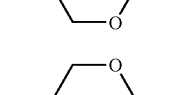 | CN | F |
| C₂H₅ | 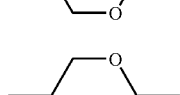 | CN | H |
| C₂H₅ | 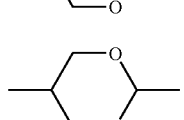 | CN | F |
| n-C₃H₇ | 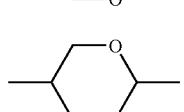 | CN | H |
| n-C₃H₇ | 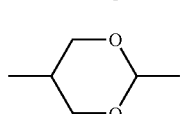 | CN | F |
| n-C₄H₉ | 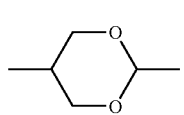 | CN | H |
| n-C₄H₉ |  | CN | F |

-continued

| R | —(A¹—Z¹)ₘ—A²— | Y | L |
|---|---|---|---|
| n-C₅H₁₁ | dioxane (O at 1,3; attach 2,5) | CN | H |
| n-C₅H₁₁ | dioxane | CN | F |
| n-C₆H₁₁ | dioxane | CN | H |
| n-C₆H₁₁ | dioxane | CN | F |
| CH₂=CH | dioxane | CN | H |
| CH₂=CH | dioxane | CN | F |
| CH₃CH=CH | dioxane | CN | H |
| CH₃CH=CH | dioxane | CN | F |
| CH₃O | dioxane | CN | H |
| CH₃O | dioxane | CN | F |
| CH₃CH₂OCH₂ | dioxane | CN | H |
| CH₃CH₂OCH₂ | dioxane | CN | F |
| CH₃ | dioxane | OCF₂CHFCH₃ | H |

-continued

| R | —(A¹—Z¹)ₘ—A²— | Y | L |
|---|---|---|---|
| CH₃ | dioxane | OCF₂CHFCH₃ | F |
| C₂H₅ | dioxane | OCF₂CHFCH₃ | H |
| C₂H₅ | dioxane | OCF₂CHFCH₃ | F |
| n-C₃H₇ | dioxane | OCF₂CHFCH₃ | H |
| n-C₃H₇ | dioxane | OCF₂CHFCH₃ | F |
| n-C₄H₉ | dioxane | OCF₂CHFCH₃ | H |
| n-C₄H₉ | dioxane | OCF₂CHFCH₃ | F |
| n-C₅H₁₁ | dioxane | OCF₂CHFCH₃ | H |
| n-C₅H₁₁ | dioxane | OCF₂CHFCH₃ | F |
| n-C₆H₁₁ | dioxane | OCF₂CHFCH₃ | H |
| n-C₆H₁₁ | dioxane | OCF₂CHFCH₃ | F |
| CH₂=CH | dioxane | OCF₂CHFCH₃ | H |
| CH₂=CH | dioxane | OCF₂CHFCH₃ | F |
| CH₃CH=CH | dioxane | OCF₂CHFCH₃ | H |

-continued

| R | —(A¹—Z¹)ₘ—A²— | Y | L | |
|---|---|---|---|---|
| CH₃CH=CH | dioxane | OCF₂CHFCH₃ | F | |
| CH₃O | dioxane | OCF₂CHFCH₃ | H | |
| CH₃O | dioxane | OCF₂CHFCH₃ | F | |
| CH₃CH₂OCH₂ | dioxane | OCF₂CHFCH₃ | H | |
| CH₃CH₂OCH₂ | dioxane | OCF₂CHFCH₃ | F | |
| CH₃ | phenyl | F | H | |
| CH₃ | phenyl | F | F | |
| C₂H₅ | phenyl | F | H | |
| C₂H₅ | phenyl | F | F | C 127 I |
| n-C₃H₇ | phenyl | F | H | |
| n-C₃H₇ | phenyl | F | F | C 109 I |
| n-C₄H₉ | phenyl | F | H | |
| n-C₄H₉ | phenyl | F | F | |
| n-C₅H₁₁ | phenyl | F | H | |

| R | —(A¹—Z¹)ₘ—A²— | Y | L |
|---|---|---|---|
| n-C₅H₁₁ | phenyl | F | F |
| n-C₆H₁₃ | phenyl | F | H |
| n-C₆H₁₃ | phenyl | F | F |
| CH₂=CH | phenyl | F | H |
| CH₂=CH | phenyl | F | F |
| CH₃CH=CH | phenyl | F | H |
| CH₃CH=CH | phenyl | F | F |
| CH₃O | phenyl | F | H |
| CH₃O | phenyl | F | F |
| CH₃CH₂OCH₂ | phenyl | F | H |
| CH₃CH₂OCH₂ | phenyl | F | F |
| CH₃ | phenyl | OCF₃ | H |
| CH₃ | phenyl | OCF₃ | F |
| C₂H₅ | phenyl | OCF₃ | H |
| C₂H₅ | phenyl | OCF₃ | F |

-continued
| R | —(A¹—Z¹)ₘ—A²— | Y | L |
|---|---|---|---|
| n-C₃H₇ |  | OCF₃ | H |
| n-C₃H₇ | 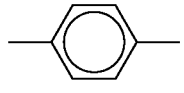 | OCF₃ | F |
| n-C₄H₉ |  | OCF₃ | H |
| n-C₄H₉ |  | OCF₃ | F |
| n-C₅H₁₁ |  | OCF₃ | H |
| n-C₅H₁₁ |  | OCF₃ | F |
| n-C₆H₁₃ |  | OCF₃ | H |
| n-C₆H₁₃ |  | OCF₃ | F |
| CH₂=CH |  | OCF₃ | H |
| CH₂=CH |  | OCF₃ | F |
| CH₃CH=CH | 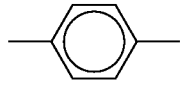 | OCF₃ | H |
| CH₃CH=CH |  | OCF₃ | F |
| CH₃O | 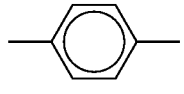 | OCF₃ | H |
| CH₃O |  | OCF₃ | F |
| CH₃CH₂OCH₂ |  | OCF₃ | H |

-continued

| R | —(A¹—Z¹)ₘ—A²— | Y | L |
|---|---|---|---|
| CH₃CH₂OCH₂ | ⌬ | OCF₃ | F |
| CH₃ | ⌬ | OCHF₂ | H |
| CH₃ | ⌬ | OCHF₂ | F |
| C₂H₅ | ⌬ | OCHF₂ | H |
| C₂H₅ | ⌬ | OCHF₂ | F |
| n-C₃H₇ | ⌬ | OCHF₂ | H |
| n-C₃H₇ | ⌬ | OCHF₂ | F |
| n-C₄H₉ | ⌬ | OCHF₂ | H |
| n-C₄H₉ | ⌬ | OCHF₂ | F |
| n-C₅H₁₁ | ⌬ | OCHF₂ | H |
| n-C₅H₁₁ | ⌬ | OCHF₂ | F |
| n-C₆H₁₁ | ⌬ | OCHF₂ | H |
| n-C₆H₁₁ | ⌬ | OCHF₂ | F |
| CH₂=CH | ⌬ | OCHF₂ | H |
| CH₂=CH | ⌬ | OCHF₂ | F |

-continued
| R | —(A¹—Z¹)ₘ—A²— | Y | L |
|---|---|---|---|
| CH₃CH=CH | 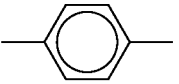 | OCHF₂ | H |
| CH₃CH=CH |  | OCHF₂ | F |
| CH₃O |  | OCHF₂ | H |
| CH₃O |  | OCHF₂ | F |
| CH₃CH₂OCH₂ |  | OCHF₂ | H |
| CH₃CH₂OCH₂ |  | OCHF₂ | F |
| CH₃ |  | CN | H |
| CH₃ |  | CN | F |
| C₂H₅ |  | CN | H |
| C₂H₅ |  | CN | F |
| n-C₃H₇ |  | CN | H |
| n-C₃H₇ | 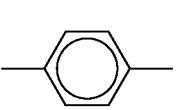 | CN | F |
| n-C₄H₉ |  | CN | H |
| n-C₄H₉ | 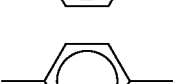 | CN | F |
| n-C₅H₁₁ | 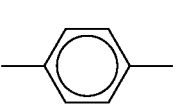 | CN | H |

-continued

| R | —(A¹—Z¹)ₘ—A²— | Y | L |
|---|---|---|---|
| n-C₅H₁₁ | phenyl | CN | F |
| n-C₆H₁₁ | phenyl | CN | H |
| n-C₆H₁₁ | phenyl | CN | F |
| CH₂=CH | phenyl | CN | H |
| CH₂=CH | phenyl | CN | F |
| CH₃CH=CH | phenyl | CN | H |
| CH₃CH=CH | phenyl | CN | F |
| CH₃O | phenyl | CN | H |
| CH₃O | phenyl | CN | F |
| CH₃CH₂OCH₂ | phenyl | CN | H |
| CH₃CH₂OCH₂ | phenyl | CN | F |
| CH₃ | phenyl | OCF₂CHFCH₃ | H |
| CH₃ | phenyl | OCF₂CHFCH₃ | F |
| C₂H₅ | phenyl | OCF₂CHFCH₃ | H |
| C₂H₅ | phenyl | OCF₂CHFCH₃ | F |

-continued

| R | —(A¹—Z¹)ₘ—A²— | Y | L |
|---|---|---|---|
| n-C₃H₇ | phenyl | OCF₂CHFCH₃ | H |
| n-C₃H₇ | phenyl | OCF₂CHFCH₃ | F |
| n-C₄H₉ | phenyl | OCF₂CHFCH₃ | H |
| n-C₄H₉ | phenyl | OCF₂CHFCH₃ | F |
| n-C₅H₁₁ | phenyl | OCF₂CHFCH₃ | H |
| n-C₅H₁₁ | phenyl | OCF₂CHFCH₃ | F |
| n-C₆H₁₁ | phenyl | OCF₂CHFCH₃ | H |
| n-C₆H₁₁ | phenyl | OCF₂CHFCH₃ | F |
| CH₂=CH | phenyl | OCF₂CHFCH₃ | H |
| CH₂=CH | phenyl | OCF₂CHFCH₃ | F |
| CH₃CH=CH | phenyl | OCF₂CHFCH₃ | H |
| CH₃CH=CH | phenyl | OCF₂CHFCH₃ | F |
| CH₃O | phenyl | OCF₂CHFCH₃ | H |
| CH₃O | phenyl | OCF₂CHFCH₃ | F |
| CH₃CH₂OCH₂ | phenyl | OCF₂CHFCH₃ | H |

-continued

| R | —(A$^1$—Z$^1$)$_m$—A$^2$— | Y | L |
|---|---|---|---|
| CH$_3$CH$_2$OCH$_2$ | phenyl | OCF$_2$CHFCH$_3$ | F |
| CH$_3$ | 3-fluorophenyl | F | H |
| CH$_3$ | 3-fluorophenyl | F | F |
| C$_2$H$_5$ | 3-fluorophenyl | F | H |
| C$_2$H$_5$ | 3-fluorophenyl | F | F |
| n-C$_3$H$_7$ | 3-fluorophenyl | F | H |
| n-C$_4$H$_9$ | 3-fluorophenyl | F | H |
| n-C$_4$H$_9$ | 3-fluorophenyl | F | F |
| n-C$_5$H$_{11}$ | 3-fluorophenyl | F | H |
| n-C$_5$H$_{11}$ | 3-fluorophenyl | F | F |
| n-C$_6$H$_{13}$ | 3-fluorophenyl | F | H |

-continued

| R | —(A¹—Z¹)ₘ—A²— | Y | L |
|---|---|---|---|
| n-C₆H₁₃ | fluorophenylene | F | F |
| CH₂=CH | fluorophenylene | F | H |
| CH₂=CH | fluorophenylene | F | F |
| CH₃CH=CH | fluorophenylene | F | H |
| CH₃CH=CH | fluorophenylene | F | F |
| CH₃O | fluorophenylene | F | H |
| CH₃O | fluorophenylene | F | F |
| CH₃CH₂OCH₂ | fluorophenylene | F | H |
| CH₃CH₂OCH₂ | fluorophenylene | F | F |
| CH₃ | fluorophenylene | OCF₃ | H |
| CH₃ | fluorophenylene | OCF₃ | F |

-continued
| R | —(A¹—Z¹)ₘ—A²— | Y | L |
|---|---|---|---|
| $C_2H_5$ | 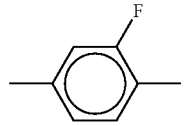 | $OCF_3$ | H |
| $C_2H_5$ | 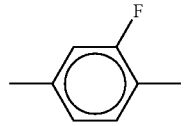 | $OCF_3$ | F |
| n-$C_3H_7$ | 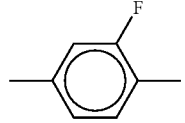 | $OCF_3$ | H |
| n-$C_3H_7$ | 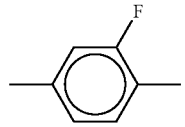 | $OCF_3$ | F |
| n-$C_4H_9$ | 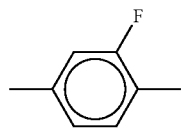 | $OCF_3$ | H |
| n-$C_4H_9$ | 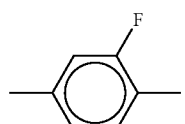 | $OCF_3$ | F |
| n-$C_5H_{11}$ | 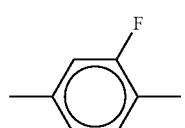 | $OCF_3$ | H |
| n-$C_5H_{11}$ | 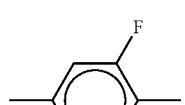 | $OCF_3$ | F |
| n-$C_6H_{13}$ | 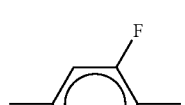 | $OCF_3$ | H |
| n-$C_6H_{13}$ | 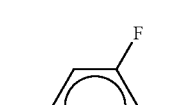 | $OCF_3$ | F |
| $CH_2$=CH | 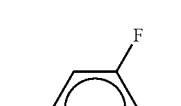 | $OCF_3$ | H |

-continued
| R | —(A¹—Z¹)ₘ—A²— | Y | L |
|---|---|---|---|
| CH₂=CH | 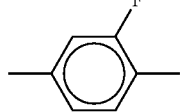 | OCF₃ | F |
| CH₃CH=CH | 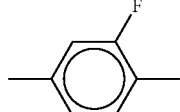 | OCF₃ | H |
| CH₃CH=CH | 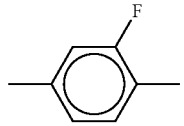 | OCF₃ | F |
| CH₃O | 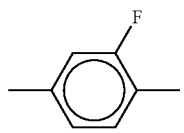 | OCF₃ | H |
| CH₃O | 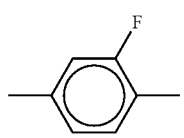 | OCF₃ | F |
| CH₃CH₂OCH₂ | 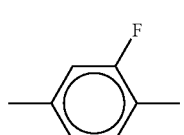 | OCF₃ | H |
| CH₃CH₂OCH₂ | 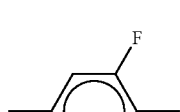 | OCF₃ | F |
| CH₃ | 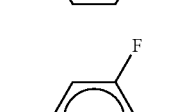 | OCHF₂ | H |
| CH₃ | 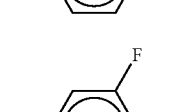 | OCHF₂ | F |
| C₂H₅ | 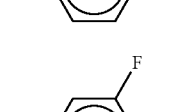 | OCHF₂ | H |
| C₂H₅ | 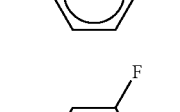 | OCHF₂ | F |

-continued
| R | —(A¹—Z¹)ₘ—A²— | Y | L |
|---|---|---|---|
| n-C₃H₇ | 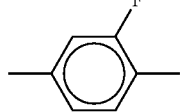 | OCHF₂ | H |
| n-C₃H₇ | 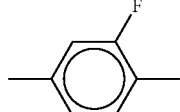 | OCHF₂ | F |
| n-C₄H₉ | 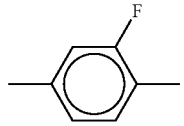 | OCHF₂ | H |
| n-C₄H₉ | 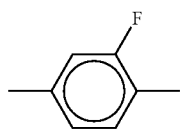 | OCHF₂ | F |
| n-C₅H₁₁ | 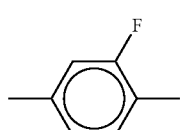 | OCHF₂ | H |
| n-C₅H₁₁ | 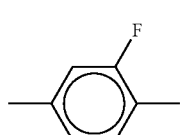 | OCHF₂ | F |
| n-C₆H₁₁ | 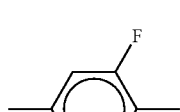 | OCHF₂ | H |
| n-C₆H₁₁ | 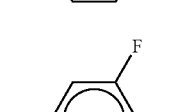 | OCHF₂ | F |
| CH₂=CH | 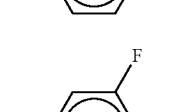 | OCHF₂ | H |
| CH₂=CH | 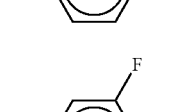 | OCHF₂ | F |
| CH₃CH=CH | 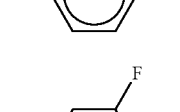 | OCHF₂ | H |

-continued
| R | —(A¹—Z¹)ₘ—A²— | Y | L |
|---|---|---|---|
| CH₃CH=CH | 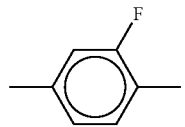 | OCHF₂ | F |
| CH₃O | 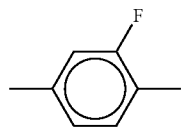 | OCHF₂ | H |
| CH₃O | 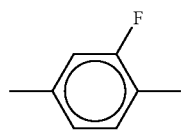 | OCHF₂ | F |
| CH₃CH₂OCH₂ | 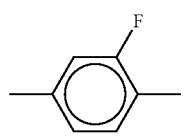 | OCHF₂ | H |
| CH₃CH₂OCH₂ | 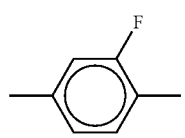 | OCHF₂ | F |
| CH₃ | 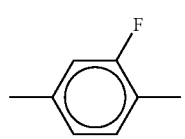 | CN | H |
| CH₃ | 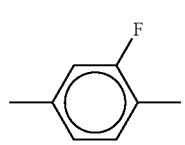 | CN | F |
| C₂H₅ | 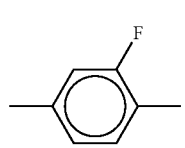 | CN | H |
| C₂H₅ | 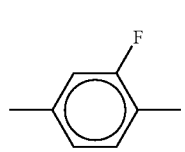 | CN | F |
| n-C₃H₇ | 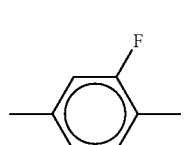 | CN | H |
| n-C₃H₇ | 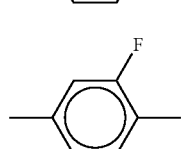 | CN | F |

-continued

| R | —(A¹—Z¹)ₘ—A²— | Y | L |
|---|---|---|---|
| n-C₄H₉ | 2-fluoro-1,4-phenylene | CN | H |
| n-C₄H₉ | 2-fluoro-1,4-phenylene | CN | F |
| n-C₅H₁₁ | 2-fluoro-1,4-phenylene | CN | H |
| n-C₅H₁₁ | 2-fluoro-1,4-phenylene | CN | F |
| n-C₆H₁₁ | 2-fluoro-1,4-phenylene | CN | H |
| n-C₆H₁₁ | 2-fluoro-1,4-phenylene | CN | F |
| CH₂=CH | 2-fluoro-1,4-phenylene | CN | H |
| CH₂=CH | 2-fluoro-1,4-phenylene | CN | F |
| CH₃CH=CH | 2-fluoro-1,4-phenylene | CN | H |
| CH₃CH=CH | 2-fluoro-1,4-phenylene | CN | F |
| CH₃O | 2-fluoro-1,4-phenylene | CN | H |

-continued

| R | —(A¹—Z¹)ₘ—A²— | Y | L |
|---|---|---|---|
| CH₃O | 3-F phenyl | CN | F |
| CH₃CH₂OCH₂ | 3-F phenyl | CN | H |
| CH₃CH₂OCH₂ | 3-F phenyl | CN | F |
| CH₃ | 3-F phenyl | OCF₂CHFCH₃ | H |
| CH₃ | 3-F phenyl | OCF₂CHFCH₃ | F |
| C₂H₅ | 3-F phenyl | OCF₂CHFCH₃ | H |
| C₂H₅ | 3-F phenyl | OCF₂CHFCH₃ | F |
| n-C₃H₇ | 3-F phenyl | OCF₂CHFCH₃ | H |
| n-C₃H₇ | 3-F phenyl | OCF₂CHFCH₃ | F |
| n-C₄H₉ | 3-F phenyl | OCF₂CHFCH₃ | H |
| n-C₄H₉ | 3-F phenyl | OCF₂CHFCH₃ | F |

-continued

| R | —(A¹—Z¹)ₘ—A²— | Y | L |
|---|---|---|---|
| n-C₅H₁₁ | 3-F phenylene | OCF₂CHFCH₃ | H |
| n-C₅H₁₁ | 3-F phenylene | OCF₂CHFCH₃ | F |
| n-C₆H₁₁ | 3-F phenylene | OCF₂CHFCH₃ | H |
| n-C₆H₁₁ | 3-F phenylene | OCF₂CHFCH₃ | F |
| CH₂=CH | 3-F phenylene | OCF₂CHFCH₃ | H |
| CH₂=CH | 3-F phenylene | OCF₂CHFCH₃ | F |
| CH₃CH=CH | 3-F phenylene | OCF₂CHFCH₃ | H |
| CH₃CH=CH | 3-F phenylene | OCF₂CHFCH₃ | F |
| CH₃O | 3-F phenylene | OCF₂CHFCH₃ | H |
| CH₃O | 3-F phenylene | OCF₂CHFCH₃ | F |
| CH₃CH₂OCH₂ | 3-F phenylene | OCF₂CHFCH₃ | H |

-continued

| R | —(A¹—Z¹)ₘ—A²— | Y | L |
|---|---|---|---|
| CH₃CH₂OCH₂ | 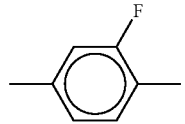 | OCF₂CHFCH₃ | F |

EXAMPLE 2

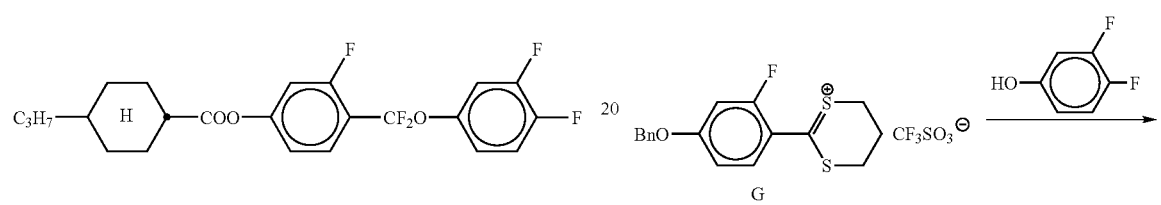

Step 2.1

(Bn=benzyl)

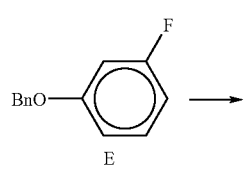

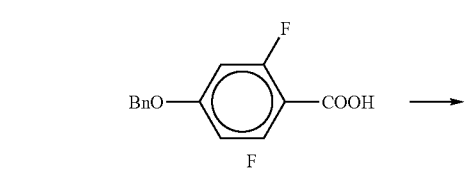

0.105 mol of AlCl₃ and 0.14 mol of oxalyl chloride are added successively at −20° C. to a solution of 0.1 mol of E in 300 ml of CH₂Cl₂. The mixture is stirred at 20° C. for 1 hour and allowed to warm to room temperature, and water is slowly added with ice cooling. Finally, the mixture is subjected to conventional work-up.

A mixture of 100 mmol of E, 110 mmol of 1,3-propanedithiol, 110 mmol of trifluoromethanesulfonic acid, 150 ml of toluene and 150 ml of isooctane is refluxed on a water separator until the reaction is complete. After cooling, the mixture is diluted with diethyl ether, and the precipitated product is filtered off with suction.

Step 2.2

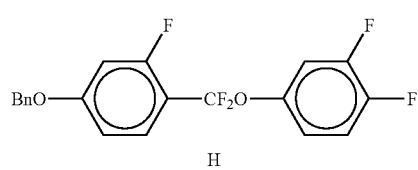

A suspension of 100 mmol of dithianylium triflate G is cooled to −70° C. in 300 ml of CH₂Cl₂. A mixture of 150 mmol of 1,2-difluorophenol, 160 mmol of NEt₃ and 100 ml of CH₂Cl₂ is subsequently added dropwise. After 0.5 hour, firstly 1 mol of NEt₃. 3 HF and subsequently 500 mmol of dimethyldibromohydantoin are added. The mixture is allowed to warm to 0° C., 1 N NaOH is added, and the mixture is subjected to conventional work-up.

Step 2.3

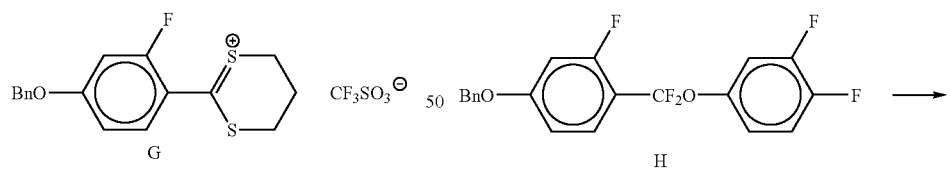

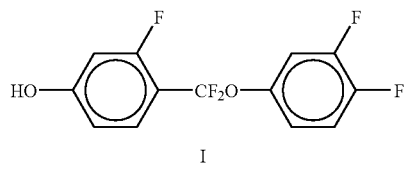

A solution of 100 mmol of H in 500 ml of THF is hydrogenated at atmospheric pressure and room temperature in the presence of 5 g of 5% palladium/active carbon. The catalyst is filtered off, and the filtrate is evaporated to dryness.

Step 2.4

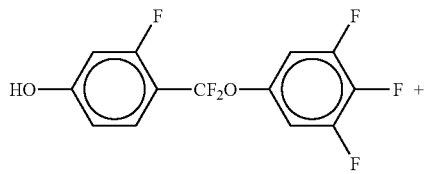
I

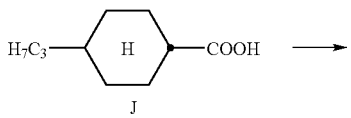
J

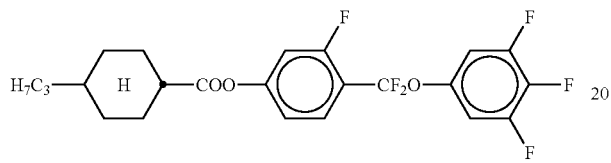
K

A solution consisting of 0.140 mol of DCC in 100 ml of toluene is added dropwise at room temperature to 0.124 mol of I, 0.124 mol of J and 0.005 mol of DMAP in 200 ml of toluene with stirring under an $N_2$ atmosphere. When the addition of DCC is complete, the bottom sediment is filtered off with suction and washed with toluene. The crystal batch is recrystallised from n-hexane.

The following compounds of the formula

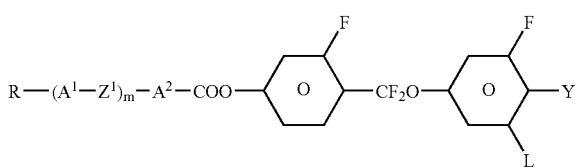

are prepared analogously:

| R | $-(A^1-Z^1)_m-A^2-$ | Y | L |
|---|---|---|---|
| $CH_3$ | cyclohexyl | F | H |
| $CH_3$ | cyclohexyl | F | F |
| $C_2H_5$ | cyclohexyl | F | H |
| $C_2H_5$ | cyclohexyl | F | F |
| $n-C_3H_7$ | cyclohexyl | F | H |
| $n-C_4H_9$ | cyclohexyl | F | H |
| $n-C_4H_9$ | cyclohexyl | F | F |
| $n-C_5H_{11}$ | cyclohexyl | F | H |
| $n-C_5H_{11}$ | cyclohexyl | F | F |

-continued

| R | —(A¹—Z¹)ₘ—A²— | Y | L |
|---|---|---|---|
| n-C₆H₁₃ | cyclohexyl(H) | F | H |
| n-C₆H₁₃ | cyclohexyl(H) | F | F |
| CH₂=CH | cyclohexyl(H) | F | H |
| CH₂=CH | cyclohexyl(H) | F | F |
| CH₃CH=CH | cyclohexyl(H) | F | H |
| CH₃CH=CH | cyclohexyl(H) | F | F |
| CH₃O | cyclohexyl(H) | F | H |
| CH₃O | cyclohexyl(H) | F | F |
| CH₃CH₂OCH₂ | cyclohexyl(H) | F | H |
| CH₃CH₂OCH₂ | cyclohexyl(H) | F | F |
| CH₃ | cyclohexyl(H) | OCF₃ | H |
| CH₃ | cyclohexyl(H) | OCF₃ | F |
| C₂H₅ | cyclohexyl(H) | OCF₃ | H |
| C₂H₅ | cyclohexyl(H) | OCF₃ | F |
| n-C₃H₇ | cyclohexyl(H) | OCF₃ | H |

-continued

| R | —(A¹—Z¹)ₘ—A²— | Y | L |
|---|---|---|---|
| n-C₃H₇ | cyclohexane(H) | OCF₃ | F |
| n-C₄H₉ | cyclohexane(H) | OCF₃ | H |
| n-C₄H₉ | cyclohexane(H) | OCF₃ | F |
| n-C₅H₁₁ | cyclohexane(H) | OCF₃ | H |
| n-C₅H₁₁ | cyclohexane(H) | OCF₃ | F |
| n-C₆H₁₃ | cyclohexane(H) | OCF₃ | H |
| n-C₆H₁₃ | cyclohexane(H) | OCF₃ | F |
| CH₂=CH | cyclohexane(H) | OCF₃ | H |
| CH₂=CH | cyclohexane(H) | OCF₃ | F |
| CH₃CH=CH | cyclohexane(H) | OCF₃ | H |
| CH₃CH=CH | cyclohexane(H) | OCF₃ | F |
| CH₃O | cyclohexane(H) | OCF₃ | H |
| CH₃O | cyclohexane(H) | OCF₃ | F |
| CH₃CH₂OCH₂ | cyclohexane(H) | OCF₃ | H |
| CH₃CH₂OCH₂ | cyclohexane(H) | OCF₃ | F |

-continued

| R | —(A¹—Z¹)ₘ—A²— | Y | L |
|---|---|---|---|
| CH₃ | cyclohexane(H) | OCHF₂ | H |
| CH₃ | cyclohexane(H) | OCHF₂ | F |
| C₂H₅ | cyclohexane(H) | OCHF₂ | H |
| C₂H₅ | cyclohexane(H) | OCHF₂ | F |
| n-C₃H₇ | cyclohexane(H) | OCHF₂ | H |
| n-C₃H₇ | cyclohexane(H) | OCHF₂ | F |
| n-C₄H₉ | cyclohexane(H) | OCHF₂ | H |
| n-C₄H₉ | cyclohexane(H) | OCHF₂ | F |
| n-C₅H₁₁ | cyclohexane(H) | OCHF₂ | H |
| n-C₅H₁₁ | cyclohexane(H) | OCHF₂ | F |
| n-C₆H₁₁ | cyclohexane(H) | OCHF₂ | H |
| n-C₆H₁₁ | cyclohexane(H) | OCHF₂ | F |
| CH₂=CH | cyclohexane(H) | OCHF₂ | H |
| CH₂=CH | cyclohexane(H) | OCHF₂ | F |
| CH₃CH=CH | cyclohexane(H) | OCHF₂ | H |

-continued
| R | —(A¹—Z¹)ₘ—A²— | Y | L |
|---|---|---|---|
| CH₃CH=CH | 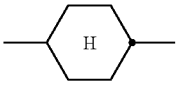 | OCHF₂ | F |
| CH₃O | 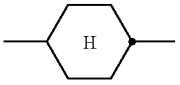 | OCHF₂ | H |
| CH₃O |  | OCHF₂ | F |
| CH₃CH₂OCH₂ |  | OCHF₂ | H |
| CH₃CH₂OCH₂ |  | OCHF₂ | F |
| CH₃ |  | CN | H |
| CH₃ |  | CN | F |
| C₂H₅ | 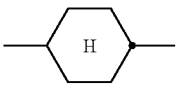 | CN | H |
| C₂H₅ | 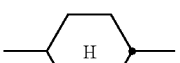 | CN | F |
| n-C₃H₇ | 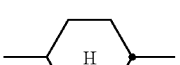 | CN | H |
| n-C₃H₇ | 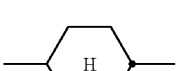 | CN | F |
| n-C₄H₉ | 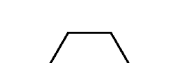 | CN | H |
| n-C₄H₉ | 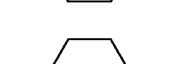 | CN | F |
| n-C₅H₁₁ | 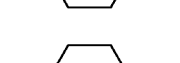 | CN | H |
| n-C₅H₁₁ | 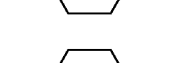 | CN | F |

-continued
| R | —(A¹—Z¹)ₘ—A²— | Y | L |
|---|---|---|---|
| n-C₆H₁₁ |  | CN | H |
| n-C₆H₁₁ | 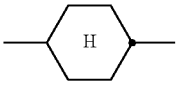 | CN | F |
| CH₂=CH | 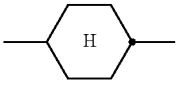 | CN | H |
| CH₂=CH | 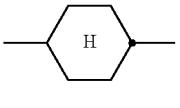 | CN | F |
| CH₃CH=CH | 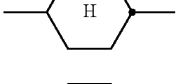 | CN | H |
| CH₃CH=CH | 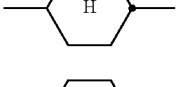 | CN | F |
| CH₃O | 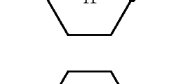 | CN | H |
| CH₃O | 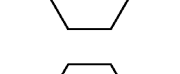 | CN | F |
| CH₃CH₂OCH₂ | 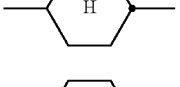 | CN | H |
| CH₃CH₂OCH₂ | 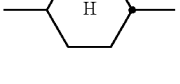 | CN | F |
| CH₃ | 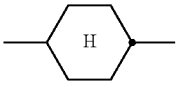 | OCF₂CHFCH₃ | H |
| CH₃ | 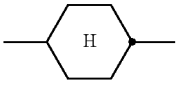 | OCF₂CHFCH₃ | F |
| C₂H₅ |  | OCF₂CHFCH₃ | H |
| C₂H₅ |  | OCF₂CHFCH₃ | F |
| n-C₃H₇ |  | OCF₂CHFCH₃ | H |

-continued

| R | —(A¹—Z¹)ₘ—A²— | Y | L |
|---|---|---|---|
| n-C₃H₇ | cyclohexane (H) | OCF₂CHFCH₃ | F |
| n-C₄H₉ | cyclohexane (H) | OCF₂CHFCH₃ | H |
| n-C₄H₉ | cyclohexane (H) | OCF₂CHFCH₃ | F |
| n-C₅H₁₁ | cyclohexane (H) | OCF₂CHFCH₃ | H |
| n-C₅H₁₁ | cyclohexane (H) | OCF₂CHFCH₃ | F |
| n-C₆H₁₁ | cyclohexane (H) | OCF₂CHFCH₃ | H |
| n-C₆H₁₁ | cyclohexane (H) | OCF₂CHFCH₃ | F |
| CH₂=CH | cyclohexane (H) | OCF₂CHFCH₃ | H |
| CH₂=CH | cyclohexane (H) | OCF₂CHFCH₃ | F |
| CH₃CH=CH | cyclohexane (H) | OCF₂CHFCH₃ | H |
| CH₃CH=CH | cyclohexane (H) | OCF₂CHFCH₃ | F |
| CH₃O | cyclohexane (H) | OCF₂CHFCH₃ | H |
| CH₃O | cyclohexane (H) | OCF₂CHFCH₃ | F |
| CH₃CH₂OCH₂ | cyclohexane (H) | OCF₂CHFCH₃ | H |
| CH₃CH₂OCH₂ | cyclohexane (H) | OCF₂CHFCH₃ | F |

-continued

| R | —(A¹—Z¹)ₘ—A²— | Y | L |
|---|---|---|---|
| CH₃ | H—H (cyclohexane-cyclohexane) | F | H |
| CH₃ | H—H | F | F |
| C₂H₅ | H—H | F | H |
| C₂H₅ | H—H | F | F |
| n-C₃H₇ | H—H | F | H |
| n-C₃H₇ | H—H | F | F |
| n-C₄H₉ | H—H | F | H |
| n-C₄H₉ | H—H | F | F |
| n-C₅H₁₁ | H—H | F | H |
| n-C₅H₁₁ | H—H | F | F |
| n-C₆H₁₃ | H—H | F | H |
| n-C₆H₁₃ | H—H | F | F |
| CH₂=CH | H—H | F | H |
| CH₂=CH | H—H | F | F |
| CH₃CH=CH | H—H | F | H |

-continued
| R | —(A¹—Z¹)ₘ—A²— | Y | L |
|---|---|---|---|
| CH₃CH=CH | 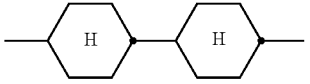 | F | F |
| CH₃O | 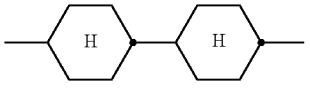 | F | H |
| CH₃O | 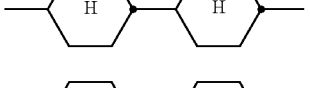 | F | F |
| CH₃CH₂OCH₂ | 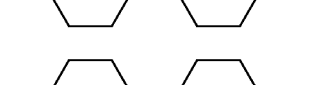 | F | H |
| CH₃CH₂OCH₂ | 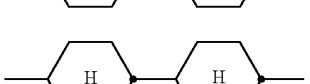 | F | F |
| CH₃ |  | OCF₃ | H |
| CH₃ |  | OCF₃ | F |
| C₂H₅ |  | OCF₃ | H |
| C₂H₅ | 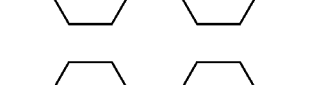 | OCF₃ | F |
| n-C₃H₇ |  | OCF₃ | H |
| n-C₃H₇ |  | OCF₃ | F |
| n-C₄H₉ |  | OCF₃ | H |
| n-C₄H₉ | 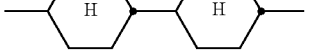 | OCF₃ | F |
| n-C₅H₁₁ | 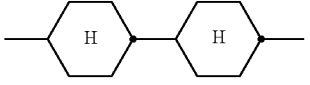 | OCF₃ | H |
| n-C₅H₁₁ | 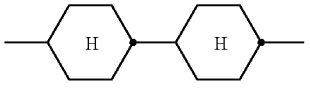 | OCF₃ | F |

-continued

| R | —(A¹—Z¹)ₘ—A²— | Y | L |
|---|---|---|---|
| n-C₆H₁₃ | [H]-[H] | OCF₃ | H |
| n-C₆H₁₃ | [H]-[H] | OCF₃ | F |
| CH₂=CH | [H]-[H] | OCF₃ | H |
| CH₂=CH | [H]-[H] | OCF₃ | F |
| CH₃CH=CH | [H]-[H] | OCF₃ | H |
| CH₃CH=CH | [H]-[H] | OCF₃ | F |
| CH₃O | [H]-[H] | OCF₃ | H |
| CH₃O | [H]-[H] | OCF₃ | F |
| CH₃CH₂OCH₂ | [H]-[H] | OCF₃ | H |
| CH₃CH₂OCH₂ | [H]-[H] | OCF₃ | F |
| CH₃ | [H]-[H] | OCHF₂ | H |
| CH₃ | [H]-[H] | OCHF₂ | F |
| C₂H₅ | [H]-[H] | OCHF₂ | H |
| C₂H₅ | [H]-[H] | OCHF₂ | F |
| n-C₃H₇ | [H]-[H] | OCHF₂ | H |

| R | —(A¹—Z¹)ₘ—A²— | Y | L |
|---|---|---|---|
| n-C$_3$H$_7$ | H—H | OCHF$_2$ | F |
| n-C$_4$H$_9$ | H—H | OCHF$_2$ | H |
| n-C$_4$H$_9$ | H—H | OCHF$_2$ | F |
| n-C$_5$H$_{11}$ | H—H | OCHF$_2$ | H |
| n-C$_5$H$_{11}$ | H—H | OCHF$_2$ | F |
| n-C$_6$H$_{11}$ | H—H | OCHF$_2$ | H |
| n-C$_6$H$_{11}$ | H—H | OCHF$_2$ | F |
| CH$_2$=CH | H—H | OCHF$_2$ | H |
| CH$_2$=CH | H—H | OCHF$_2$ | F |
| CH$_3$CH=CH | H—H | OCHF$_2$ | H |
| CH$_3$CH=CH | H—H | OCHF$_2$ | F |
| CH$_3$O | H—H | OCHF$_2$ | H |
| CH$_3$O | H—H | OCHF$_2$ | F |
| CH$_3$CH$_2$OCH$_2$ | H—H | OCHF$_2$ | H |
| CH$_3$CH$_2$OCH$_2$ | H—H | OCHF$_2$ | F |

-continued
| R | —(A¹—Z¹)ₘ—A²— | Y | L |
|---|---|---|---|
| CH₃ | 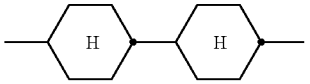 | CN | H |
| CH₃ | 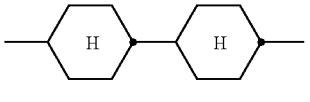 | CN | F |
| C₂H₅ | 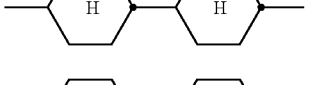 | CN | H |
| C₂H₅ | 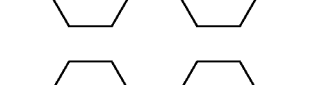 | CN | F |
| n-C₃H₇ | 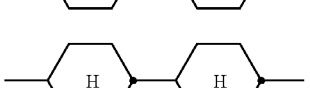 | CN | H |
| n-C₃H₇ | 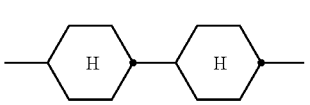 | CN | F |
| n-C₄H₉ | 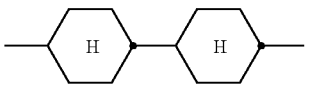 | CN | H |
| n-C₄H₉ | 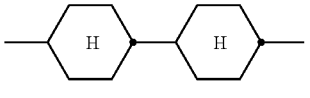 | CN | F |
| n-C₅H₁₁ | 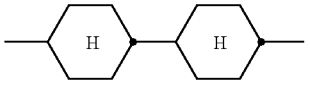 | CN | H |
| n-C₅H₁₁ |  | CN | F |
| n-C₆H₁₁ | 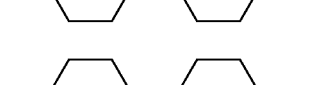 | CN | H |
| n-C₆H₁₁ | 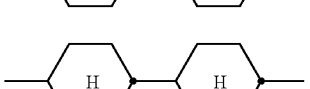 | CN | F |
| CH₂=CH | 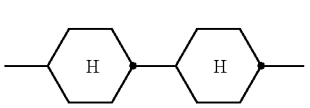 | CN | H |
| CH₂=CH |  | CN | F |
| CH₃CH=CH | | CN | H |

-continued
| R | —(A¹—Z¹)ₘ—A²— | Y | L |
|---|---|---|---|
| CH₃CH=CH | 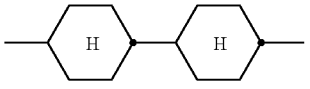 | CN | F |
| CH₃O | 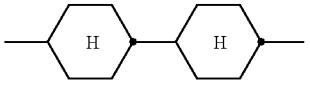 | CN | H |
| CH₃O | 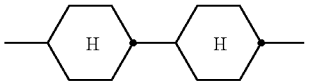 | CN | F |
| CH₃CH₂OCH₂ | 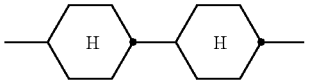 | CN | H |
| CH₃CH₂OCH₂ | 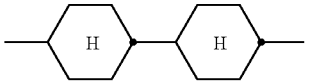 | CN | F |
| CH₃ | 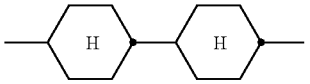 | OCF₂CHFCH₃ | H |
| CH₃ | 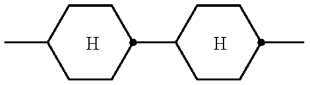 | OCF₂CHFCH₃ | F |
| C₂H₅ | 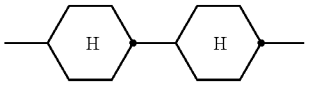 | OCF₂CHFCH₃ | H |
| C₂H₅ | 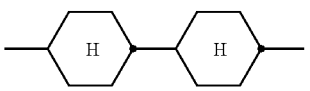 | OCF₂CHFCH₃ | F |
| n-C₃H₇ | 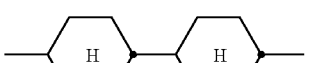 | OCF₂CHFCH₃ | H |
| n-C₃H₇ | 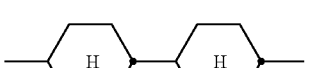 | OCF₂CHFCH₃ | F |
| n-C₄H₉ |  | OCF₂CHFCH₃ | H |
| n-C₄H₉ |  | OCF₂CHFCH₃ | F |
| n-C₅H₁₁ |  | OCF₂CHFCH₃ | H |
| n-C₅H₁₁ |  | OCF₂CHFCH₃ | F |

-continued

| R | —(A¹—Z¹)ₘ—A²— | Y | L |
|---|---|---|---|
| n-C₆H₁₁ | Cyclohexyl-Cyclohexyl | OCF₂CHFCH₃ | H |
| n-C₆H₁₁ | Cyclohexyl-Cyclohexyl | OCF₂CHFCH₃ | F |
| CH₂=CH | Cyclohexyl-Cyclohexyl | OCF₂CHFCH₃ | H |
| CH₂=CH | Cyclohexyl-Cyclohexyl | OCF₂CHFCH₃ | F |
| CH₃CH=CH | Cyclohexyl-Cyclohexyl | OCF₂CHFCH₃ | H |
| CH₃CH=CH | Cyclohexyl-Cyclohexyl | OCF₂CHFCH₃ | F |
| CH₃O | Cyclohexyl-Cyclohexyl | OCF₂CHFCH₃ | H |
| CH₃O | Cyclohexyl-Cyclohexyl | OCF₂CHFCH₃ | F |
| CH₃CH₂OCH₂ | Cyclohexyl-Cyclohexyl | OCF₂CHFCH₃ | H |
| CH₃CH₂OCH₂ | Cyclohexyl-Cyclohexyl | OCF₂CHFCH₃ | F |
| CH₃ | 1,3-Dioxane | F | H |
| CH₃ | 1,3-Dioxane | F | F |
| C₂H₅ | 1,3-Dioxane | F | H |
| C₂H₅ | 1,3-Dioxane | F | F |
| n-C₃H₇ | 1,3-Dioxane | F | H |

-continued
| R | —(A¹—Z¹)ₘ—A²— | Y | L |
|---|---|---|---|
| n-C₃H₇ | 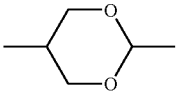 | F | F |
| n-C₄H₉ | 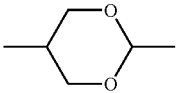 | F | H |
| n-C₄H₉ | 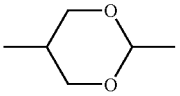 | F | F |
| n-C₅H₁₁ | 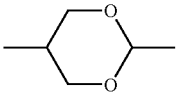 | F | H |
| n-C₅H₁₁ | 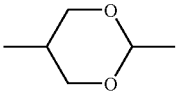 | F | F |
| n-C₆H₁₃ | 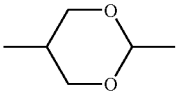 | F | H |
| n-C₆H₁₃ | 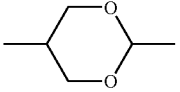 | F | F |
| CH₂=CH | 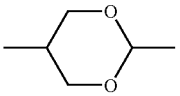 | F | H |
| CH₂=CH | 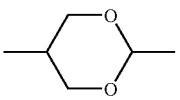 | F | F |
| CH₃CH=CH | 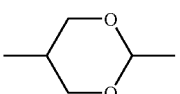 | F | H |
| CH₃CH=CH | 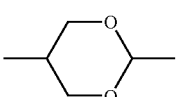 | F | F |
| CH₃O | 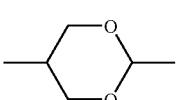 | F | H |
| CH₃O | 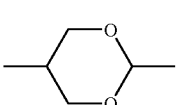 | F | F |
| CH₃CH₂OCH₂ | 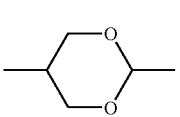 | F | H |

-continued

| R | —(A¹—Z¹)ₘ—A²— | Y | L |
|---|---|---|---|
| CH₃CH₂OCH₂ | 1,3-dioxane | F | F |
| CH₃ | 1,3-dioxane | OCF₃ | H |
| CH₃ | 1,3-dioxane | OCF₃ | F |
| C₂H₅ | 1,3-dioxane | OCF₃ | H |
| C₂H₅ | 1,3-dioxane | OCF₃ | F |
| n-C₃H₇ | 1,3-dioxane | OCF₃ | H |
| n-C₃H₇ | 1,3-dioxane | OCF₃ | F |
| n-C₄H₉ | 1,3-dioxane | OCF₃ | H |
| n-C₄H₉ | 1,3-dioxane | OCF₃ | F |
| n-C₅H₁₁ | 1,3-dioxane | OCF₃ | H |
| n-C₅H₁₁ | 1,3-dioxane | OCF₃ | F |
| n-C₆H₁₃ | 1,3-dioxane | OCF₃ | H |
| n-C₆H₁₃ | 1,3-dioxane | OCF₃ | F |

-continued

| R | —(A¹—Z¹)ₘ—A²— | Y | L |
| --- | --- | --- | --- |
| CH₂=CH | dioxane | OCF₃ | H |
| CH₂=CH | dioxane | OCF₃ | F |
| CH₃CH=CH | dioxane | OCF₃ | H |
| CH₃CH=CH | dioxane | OCF₃ | F |
| CH₃O | dioxane | OCF₃ | H |
| CH₃O | dioxane | OCF₃ | F |
| CH₃CH₂OCH₂ | dioxane | OCF₃ | H |
| CH₃CH₂OCH₂ | dioxane | OCF₃ | F |
| CH₃ | dioxane | OCHF₂ | H |
| CH₃ | dioxane | OCHF₂ | F |
| C₂H₅ | dioxane | OCHF₂ | H |
| C₂H₅ | dioxane | OCHF₂ | F |
| n-C₃H₇ | dioxane | OCHF₂ | H |
| n-C₃H₇ | dioxane | OCHF₂ | F |

-continued
| R | —(A¹—Z¹)ₘ—A²— | Y | L |
|---|---|---|---|
| n-C₄H₉ | 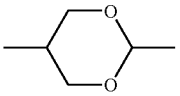 | OCHF₂ | H |
| n-C₄H₉ | 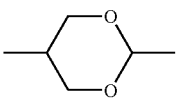 | OCHF₂ | F |
| n-C₅H₁₁ | 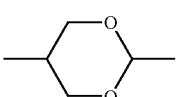 | OCHF₂ | H |
| n-C₅H₁₁ | 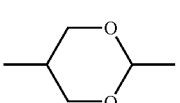 | OCHF₂ | F |
| n-C₆H₁₁ | 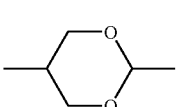 | OCHF₂ | H |
| n-C₆H₁₁ | 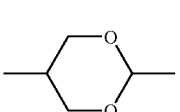 | OCHF₂ | F |
| CH₂=CH | 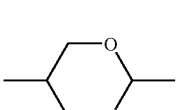 | OCHF₂ | H |
| CH₂=CH | 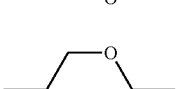 | OCHF₂ | F |
| CH₃CH=CH | 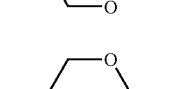 | OCHF₂ | H |
| CH₃CH=CH | 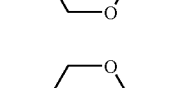 | OCHF₂ | F |
| CH₃O | 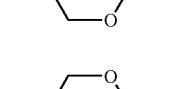 | OCHF₂ | H |
| CH₃O | 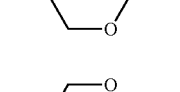 | OCHF₂ | F |
| CH₃CH₂OCH₂ | 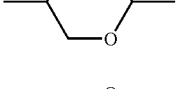 | OCHF₂ | H |

-continued
| R | —(A¹—Z¹)ₘ—A²— | Y | L |
|---|---|---|---|
| CH₃CH₂OCH₂ | 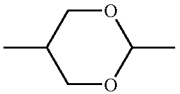 | OCHF₂ | F |
| CH₃ | 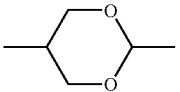 | CN | H |
| CH₃ | 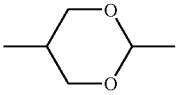 | CN | F |
| C₂H₅ | 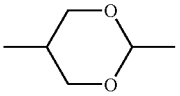 | CN | H |
| C₂H₅ | 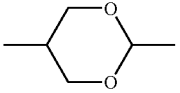 | CN | F |
| n-C₃H₇ | 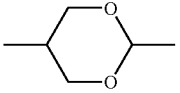 | CN | H |
| n-C₃H₇ | 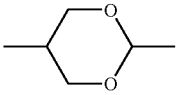 | CN | F |
| n-C₄H₉ | 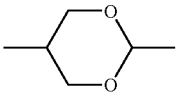 | CN | H |
| n-C₄H₉ | 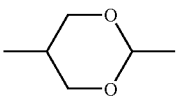 | CN | F |
| n-C₅H₁₁ | 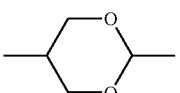 | CN | H |
| n-C₅H₁₁ | 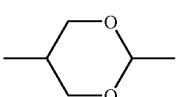 | CN | F |
| n-C₆H₁₁ | 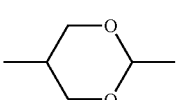 | CN | H |
| n-C₆H₁₁ | 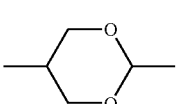 | CN | F |
| CH₂=CH | 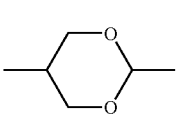 | CN | H |

-continued

| R | —(A$^1$—Z$^1$)$_m$—A$^2$— | Y | L |
|---|---|---|---|
| CH$_2$=CH | 2,5-dioxane | CN | F |
| CH$_3$CH=CH | 2,5-dioxane | CN | H |
| CH$_3$CH=CH | 2,5-dioxane | CN | F |
| CH$_3$O | 2,5-dioxane | CN | H |
| CH$_3$O | 2,5-dioxane | CN | F |
| CH$_3$CH$_2$OCH$_2$ | 2,5-dioxane | CN | H |
| CH$_3$CH$_2$OCH$_2$ | 2,5-dioxane | CN | F |
| CH$_3$ | 2,5-dioxane | OCF$_2$CHFCH$_3$ | H |
| CH$_3$ | 2,5-dioxane | OCF$_2$CHFCH$_3$ | F |
| C$_2$H$_5$ | 2,5-dioxane | OCF$_2$CHFCH$_3$ | H |
| C$_2$H$_5$ | 2,5-dioxane | OCF$_2$CHFCH$_3$ | F |
| n-C$_3$H$_7$ | 2,5-dioxane | OCF$_2$CHFCH$_3$ | H |
| n-C$_3$H$_7$ | 2,5-dioxane | OCF$_2$CHFCH$_3$ | F |

-continued

| R | —(A¹—Z¹)ₘ—A²— | Y | L |
|---|---|---|---|
| n-C₄H₉ | dioxane | OCF₂CHFCH₃ | H |
| n-C₄H₉ | dioxane | OCF₂CHFCH₃ | F |
| n-C₅H₁₁ | dioxane | OCF₂CHFCH₃ | H |
| n-C₅H₁₁ | dioxane | OCF₂CHFCH₃ | F |
| n-C₆H₁₁ | dioxane | OCF₂CHFCH₃ | H |
| n-C₆H₁₁ | dioxane | OCF₂CHFCH₃ | F |
| CH₂=CH | dioxane | OCF₂CHFCH₃ | H |
| CH₂=CH | dioxane | OCF₂CHFCH₃ | F |
| CH₃CH=CH | dioxane | OCF₂CHFCH₃ | H |
| CH₃CH=CH | dioxane | OCF₂CHFCH₃ | F |
| CH₃O | dioxane | OCF₂CHFCH₃ | H |
| CH₃O | dioxane | OCF₂CHFCH₃ | F |
| CH₃CH₂OCH₂ | dioxane | OCF₂CHFCH₃ | H |
| CH₃CH₂OCH₂ | dioxane | OCF₂CHFCH₃ | F |

-continued
| R | —(A¹—Z¹)ₘ—A²— | Y | L |
|---|---|---|---|
| CH₃ | 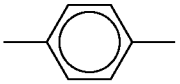 | F | H |
| CH₃ |  | F | F |
| C₂H₅ |  | F | H |
| C₂H₅ |  | F | F |
| n-C₃H₇ |  | F | H |
| n-C₃H₇ |  | F | F |
| n-C₄H₉ |  | F | H |
| n-C₄H₉ |  | F | F |
| n-C₅H₁₁ | 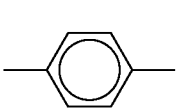 | F | H |
| n-C₅H₁₁ |  | F | F |
| n-C₆H₁₃ | 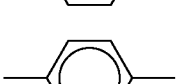 | F | H |
| n-C₆H₁₃ | 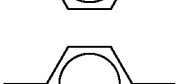 | F | F |
| CH₂=CH |  | F | H |
| CH₂=CH |  | F | F |
| CH₃CH=CH |  | F | H |

-continued
| R | —(A¹—Z¹)ₘ—A²— | Y | L |
|---|---|---|---|
| CH₃CH=CH | 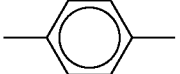 | F | F |
| CH₃O |  | F | H |
| CH₃O |  | F | F |
| CH₃CH₂OCH₂ |  | F | H |
| CH₃CH₂OCH₂ |  | F | F |
| CH₃ |  | OCF₃ | H |
| CH₃ |  | OCF₃ | F |
| C₂H₅ | 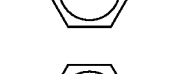 | OCF₃ | H |
| C₂H₅ |  | OCF₃ | F |
| n-C₃H₇ |  | OCF₃ | H |
| n-C₃H₇ | 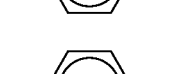 | OCF₃ | F |
| n-C₄H₉ | 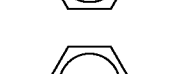 | OCF₃ | H |
| n-C₄H₉ | 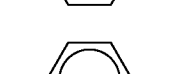 | OCF₃ | F |
| n-C₅H₁₁ |  | OCF₃ | H |
| n-C₅H₁₁ |  | OCF₃ | F |

-continued
| R | —(A¹—Z¹)ₘ—A²— | Y | L |
|---|---|---|---|
| n-C₆H₁₃ |  | OCF₃ | H |
| n-C₆H₁₃ |  | OCF₃ | F |
| CH₂=CH |  | OCF₃ | H |
| CH₂=CH |  | OCF₃ | F |
| CH₃CH=CH |  | OCF₃ | H |
| CH₃CH=CH |  | OCF₃ | F |
| CH₃O |  | OCF₃ | H |
| CH₃O |  | OCF₃ | F |
| CH₃CH₂OCH₂ |  | OCF₃ | H |
| CH₃CH₂OCH₂ |  | OCF₃ | F |
| CH₃ | 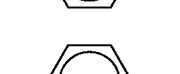 | OCHF₂ | H |
| CH₃ |  | OCHF₂ | F |
| C₂H₅ |  | OCHF₂ | H |
| C₂H₅ |  | OCHF₂ | F |
| n-C₃H₇ |  | OCHF₂ | H |

-continued
| R | —(A¹—Z¹)ₘ—A²— | Y | L |
|---|---|---|---|
| n-C₃H₇ |  | OCHF₂ | F |
| n-C₄H₉ |  | OCHF₂ | H |
| n-C₄H₉ |  | OCHF₂ | F |
| n-C₅H₁₁ |  | OCHF₂ | H |
| n-C₅H₁₁ |  | OCHF₂ | F |
| n-C₆H₁₁ |  | OCHF₂ | H |
| n-C₆H₁₁ |  | OCHF₂ | F |
| CH₂=CH |  | OCHF₂ | H |
| CH₂=CH |  | OCHF₂ | F |
| CH₃CH=CH | 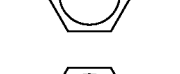 | OCHF₂ | H |
| CH₃CH=CH |  | OCHF₂ | F |
| CH₃O |  | OCHF₂ | H |
| CH₃O |  | OCHF₂ | F |
| CH₃CH₂OCH₂ |  | OCHF₂ | H |
| CH₃CH₂OCH₂ |  | OCHF₂ | F |

-continued
| R | —(A¹—Z¹)ₘ—A²— | Y | L |
|---|---|---|---|
| CH₃ |  | CN | H |
| CH₃ |  | CN | F |
| C₂H₅ |  | CN | H |
| C₂H₅ |  | CN | F |
| n-C₃H₇ |  | CN | H |
| n-C₃H₇ |  | CN | F |
| n-C₄H₉ |  | CN | H |
| n-C₄H₉ |  | CN | F |
| n-C₅H₁₁ |  | CN | H |
| n-C₅H₁₁ |  | CN | F |
| n-C₆H₁₁ | 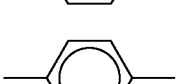 | CN | H |
| n-C₆H₁₁ | 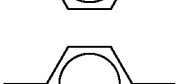 | CN | F |
| CH₂=CH |  | CN | H |
| CH₂=CH |  | CN | F |
| CH₃CH=CH |  | CN | H |

-continued
| R | —(A¹—Z¹)ₘ—A²— | Y | L |
|---|---|---|---|
| CH₃CH=CH | 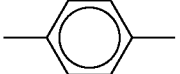 | CN | F |
| CH₃O |  | CN | H |
| CH₃O |  | CN | F |
| CH₃CH₂OCH₂ |  | CN | H |
| CH₃CH₂OCH₂ |  | CN | F |
| CH₃ |  | OCF₂CHFCH₃ | H |
| CH₃ |  | OCF₂CHFCH₃ | F |
| C₂H₅ |  | OCF₂CHFCH₃ | H |
| C₂H₅ |  | OCF₂CHFCH₃ | F |
| n-C₃H₇ |  | OCF₂CHFCH₃ | H |
| n-C₃H₇ | 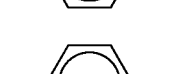 | OCF₂CHFCH₃ | F |
| n-C₄H₉ | 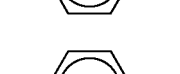 | OCF₂CHFCH₃ | H |
| n-C₄H₉ |  | OCF₂CHFCH₃ | F |
| n-C₅H₁₁ |  | OCF₂CHFCH₃ | H |
| n-C₅H₁₁ |  | OCF₂CHFCH₃ | F |

-continued
| R | —(A¹—Z¹)ₘ—A²— | Y | L |
|---|---|---|---|
| n-C₆H₁₁ |  | OCF₂CHFCH₃ | H |
| n-C₆H₁₁ |  | OCF₂CHFCH₃ | F |
| CH₂=CH |  | OCF₂CHFCH₃ | H |
| CH₂=CH |  | OCF₂CHFCH₃ | F |
| CH₃CH=CH |  | OCF₂CHFCH₃ | H |
| CH₃CH=CH |  | OCF₂CHFCH₃ | F |
| CH₃O |  | OCF₂CHFCH₃ | H |
| CH₃O |  | OCF₂CHFCH₃ | F |
| CH₃CH₂OCH₂ |  | OCF₂CHFCH₃ | H |
| CH₃CH₂OCH₂ |  | OCF₂CHFCH₃ | F |
| CH₃ | 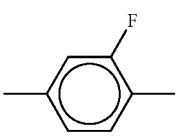 | F | H |
| CH₃ | 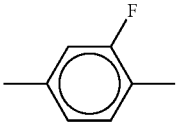 | F | F |
| C₂H₅ | 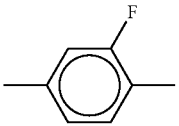 | F | H |

-continued

| R | —(A¹—Z¹)ₘ—A²— | Y | L |
|---|---|---|---|
| $C_2H_5$ | 2-fluoro-1,4-phenylene | F | F |
| n-$C_3H_7$ | 2-fluoro-1,4-phenylene | F | H |
| n-$C_4H_9$ | 2-fluoro-1,4-phenylene | F | H |
| n-$C_4H_9$ | 2-fluoro-1,4-phenylene | F | F |
| n-$C_5H_{11}$ | 2-fluoro-1,4-phenylene | F | H |
| n-$C_5H_{11}$ | 2-fluoro-1,4-phenylene | F | F |
| n-$C_6H_{13}$ | 2-fluoro-1,4-phenylene | F | H |
| n-$C_6H_{13}$ | 2-fluoro-1,4-phenylene | F | F |
| $CH_2{=}CH$ | 2-fluoro-1,4-phenylene | F | H |
| $CH_2{=}CH$ | 2-fluoro-1,4-phenylene | F | F |
| $CH_3CH{=}CH$ | 2-fluoro-1,4-phenylene | F | H |

-continued

| R | —(A¹—Z¹)ₘ—A²— | Y | L |
|---|---|---|---|
| CH₃CH=CH | 2,3-difluorophenylene | F | F |
| CH₃O | 2,3-difluorophenylene | F | H |
| CH₃O | 2,3-difluorophenylene | F | F |
| CH₃CH₂OCH₂ | 2,3-difluorophenylene | F | H |
| CH₃CH₂OCH₂ | 2,3-difluorophenylene | F | F |
| CH₃ | 2,3-difluorophenylene | OCF₃ | H |
| CH₃ | 2,3-difluorophenylene | OCF₃ | F |
| C₂H₅ | 2,3-difluorophenylene | OCF₃ | H |
| C₂H₅ | 2,3-difluorophenylene | OCF₃ | F |
| n-C₃H₇ | 2,3-difluorophenylene | OCF₃ | H |
| n-C₃H₇ | 2,3-difluorophenylene | OCF₃ | F |

-continued

| R | —(A¹—Z¹)ₘ—A²— | Y | L |
|---|---|---|---|
| n-C₄H₉ | 2-fluoro-1,4-phenylene | OCF₃ | H |
| n-C₄H₉ | 2-fluoro-1,4-phenylene | OCF₃ | F |
| n-C₅H₁₁ | 2-fluoro-1,4-phenylene | OCF₃ | H |
| n-C₅H₁₁ | 2-fluoro-1,4-phenylene | OCF₃ | F |
| n-C₆H₁₃ | 2-fluoro-1,4-phenylene | OCF₃ | H |
| n-C₆H₁₃ | 2-fluoro-1,4-phenylene | OCF₃ | F |
| CH₂=CH | 2-fluoro-1,4-phenylene | OCF₃ | H |
| CH₂=CH | 2-fluoro-1,4-phenylene | OCF₃ | F |
| CH₃CH=CH | 2-fluoro-1,4-phenylene | OCF₃ | H |
| CH₃CH=CH | 2-fluoro-1,4-phenylene | OCF₃ | F |
| CH₃O | 2-fluoro-1,4-phenylene | OCF₃ | H |

-continued
| R | —(A¹—Z¹)ₘ—A²— | Y | L |
|---|---|---|---|
| CH₃O | 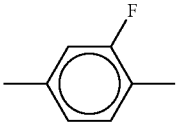 | OCF₃ | F |
| CH₃CH₂OCH₂ | 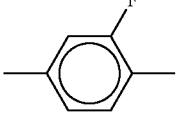 | OCF₃ | H |
| CH₃CH₂OCH₂ | 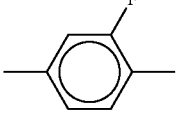 | OCF₃ | F |
| CH₃ | 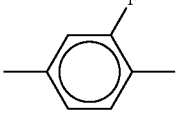 | OCHF₂ | H |
| CH₃ | 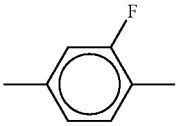 | OCHF₂ | F |
| C₂H₅ | 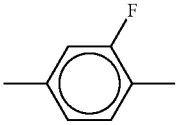 | OCHF₂ | H |
| C₂H₅ | 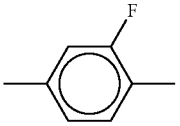 | OCHF₂ | F |
| n-C₃H₇ | 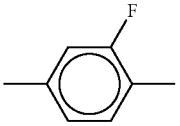 | OCHF₂ | H |
| n-C₃H₇ | 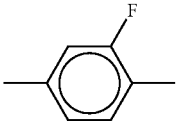 | OCHF₂ | F |
| n-C₄H₉ | 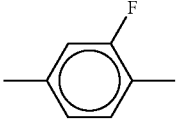 | OCHF₂ | H |
| n-C₄H₉ | 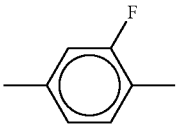 | OCHF₂ | F |

-continued
| R | —(A¹—Z¹)ₘ—A²— | Y | L |
|---|---|---|---|
| n-C₅H₁₁ | 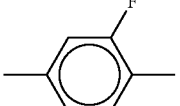 | OCHF₂ | H |
| n-C₅H₁₁ | 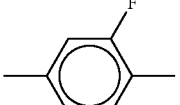 | OCHF₂ | F |
| n-C₆H₁₁ | 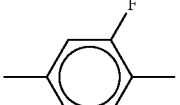 | OCHF₂ | H |
| n-C₆H₁₁ | 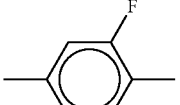 | OCHF₂ | F |
| CH₂=CH | 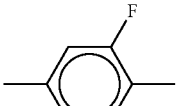 | OCHF₂ | H |
| CH₂=CH | 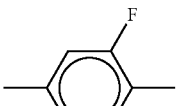 | OCHF₂ | F |
| CH₃CH=CH | 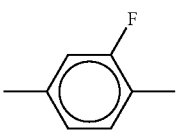 | OCHF₂ | H |
| CH₃CH=CH | 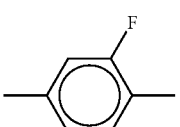 | OCHF₂ | F |
| CH₃O | 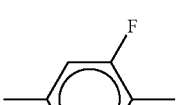 | OCHF₂ | H |
| CH₃O | 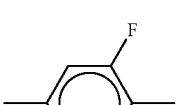 | OCHF₂ | F |
| CH₃CH₂OCH₂ | 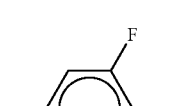 | OCHF₂ | H |

-continued
| R | —(A¹—Z¹)ₘ—A²— | Y | L |
|---|---|---|---|
| CH₃CH₂OCH₂ | 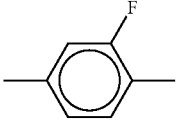 | OCHF₂ | F |
| CH₃ | 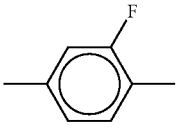 | CN | H |
| CH₃ | 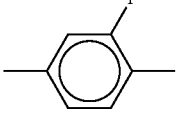 | CN | F |
| C₂H₅ | 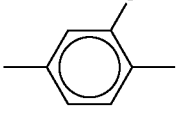 | CN | H |
| C₂H₅ | 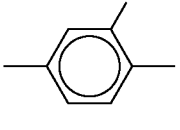 | CN | F |
| n-C₃H₇ | 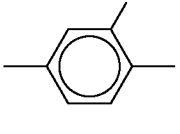 | CN | H |
| n-C₃H₇ | 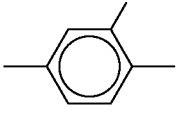 | CN | F |
| n-C₄H₉ | 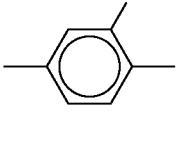 | CN | H |
| n-C₄H₉ | 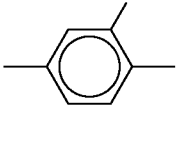 | CN | F |
| n-C₅H₁₁ | 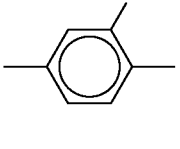 | CN | H |

-continued
| R | —(A¹—Z¹)ₘ—A²— | Y | L |
|---|---|---|---|
| n-C₅H₁₁ | 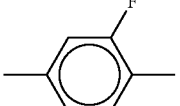 | CN | F |
| n-C₆H₁₁ | 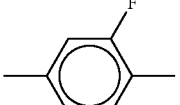 | CN | H |
| n-C₆H₁₁ | 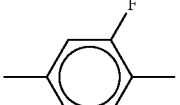 | CN | F |
| CH₂=CH | 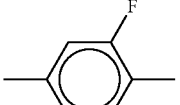 | CN | H |
| CH₂=CH | 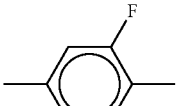 | CN | F |
| CH₃CH=CH | 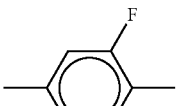 | CN | H |
| CH₃CH=CH | 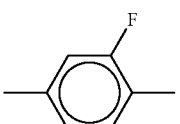 | CN | F |
| CH₃O | 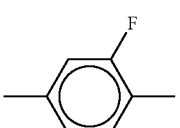 | CN | H |
| CH₃O | 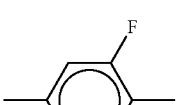 | CN | F |
| CH₃CH₂OCH₂ | 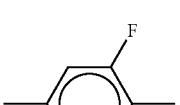 | CN | H |
| CH₃CH₂OCH₂ | 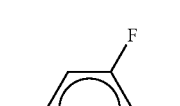 | CN | F |

-continued
| R | —(A¹—Z¹)ₘ—A²— | Y | L |
|---|---|---|---|
| CH₃ | 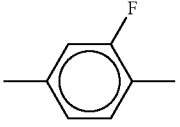 | OCF₂CHFCH₃ | H |
| CH₃ | 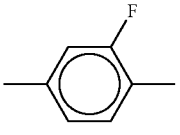 | OCF₂CHFCH₃ | F |
| C₂H₅ | 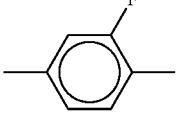 | OCF₂CHFCH₃ | H |
| C₂H₅ | 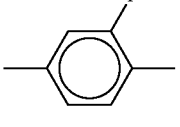 | OCF₂CHFCH₃ | F |
| n-C₃H₇ | 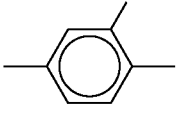 | OCF₂CHFCH₃ | H |
| n-C₃H₇ | 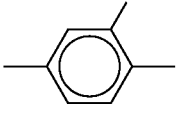 | OCF₂CHFCH₃ | F |
| n-C₄H₉ | 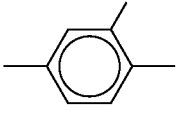 | OCF₂CHFCH₃ | H |
| n-C₄H₉ | 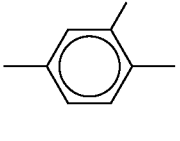 | OCF₂CHFCH₃ | F |
| n-C₅H₁₁ | 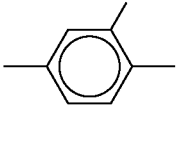 | OCF₂CHFCH₃ | H |
| n-C₅H₁₁ | 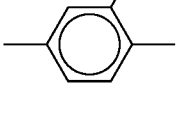 | OCF₂CHFCH₃ | F |

-continued
| R | —(A¹—Z¹)ₘ—A²— | Y | L |
|---|---|---|---|
| n-C₆H₁₁ | 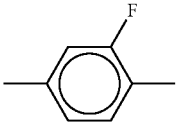 | OCF₂CHFCH₃ | H |
| n-C₆H₁₁ | 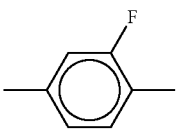 | OCF₂CHFCH₃ | F |
| CH₂=CH | 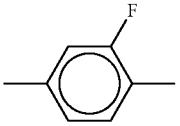 | OCF₂CHFCH₃ | H |
| CH₂=CH | 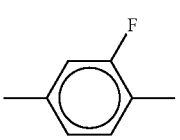 | OCF₂CHFCH₃ | F |
| CH₃CH=CH | 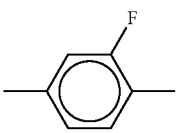 | OCF₂CHFCH₃ | H |
| CH₃CH=CH | 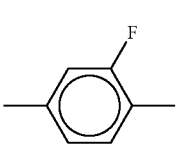 | OCF₂CHFCH₃ | F |
| CH₃O | 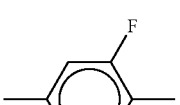 | OCF₂CHFCH₃ | H |
| CH₃O | 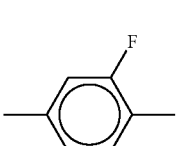 | OCF₂CHFCH₃ | F |
| CH₃CH₂OCH₂ | 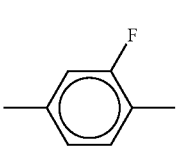 | OCF₂CHFCH₃ | H |
| CH₃CH₂OCH₂ | 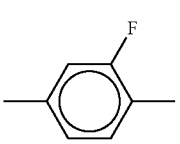 | OCF₂CHFCH₃ | F |

EXAMPLE 3

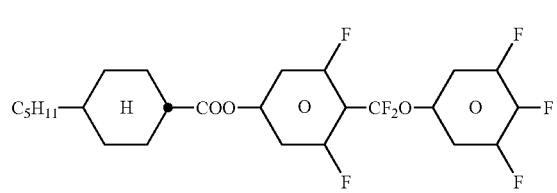

Step 3.1

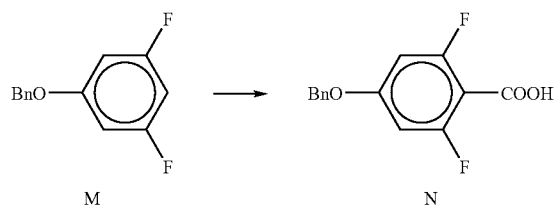

0.11 mol of 2.5 M nBuLi in hexane is added at −70° C. to a solution of 0.1 mol of M in 300 ml of THF. The mixture is stirred at −70° C. for 3 hours, and the solution is then poured onto dry ice. The product is subjected to conventional work-up.

Step 3.2

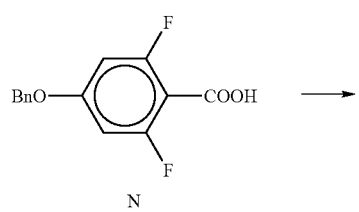

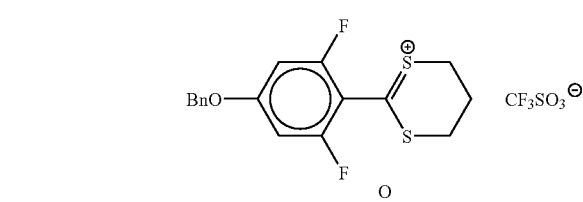

A mixture of 100 mmol of N, 110 mmol of 1,3-propanedithiol, 110 mmol of trifluoromethanesulfonic acid, 150 ml of toluene and 150 ml of isooctane is refluxed on a water separator until the reaction is complete. After cooling, the mixture is diluted with diethyl ether, and the precipitated product is filtered off with suction.

Step 3.3

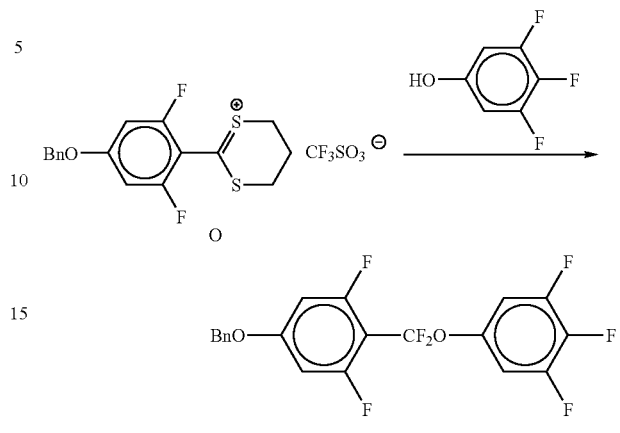

A suspension of 100 mmol of dithianylium triflate O is cooled to −70° C. in 300 ml of $CH_2Cl_2$. A mixture of 150 mmol of the corresponding phenol, 160 mmol of $NEt_3$ and 100 ml of $CH_2Cl_2$ is subsequently added dropwise. After 0.5 hour, firstly 1 mol of $NEt_3$.3 HF and subsequently 500 mmol of dimethyldibromohydantoin are added. The mixture is allowed to warm to 0° C., 1 N NaOH is added, and the mixture is subjected to conventional work-up.

Step 3.4

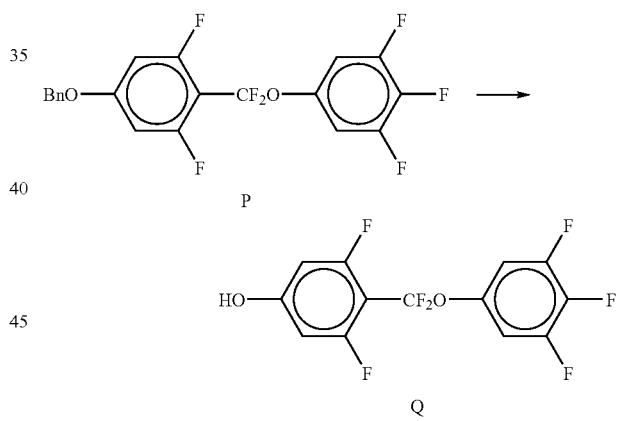

A solution of 100 mmol of P in 500 ml of THF is hydrogenated at atmospheric pressure and room temperature in the presence of 5 g of 5% palladium/active carbon. The catalyst is filtered off, and the filtrate is evaporated to dryness.

Step 3.5

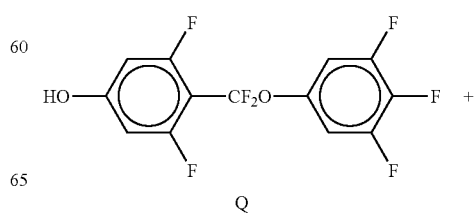

-continued

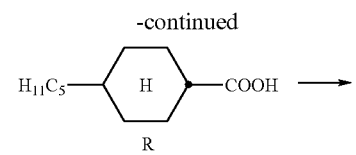
R

↓

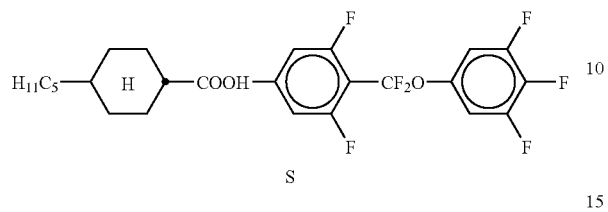
S

A solution consisting of 0.140 mol of DCC in 100 ml of toluene is added dropwise at room temperature to 0.124 mol of Q, 0.124 mol of R and 0.005 mol of DMAP in 200 ml of toluene with stirring under an $N_2$ atmosphere. When the addition of DCC is complete, the bottom sediment is filtered off with suction and washed with toluene. The crystal batch is recrystallised from n-hexane.

The following compounds of the formula

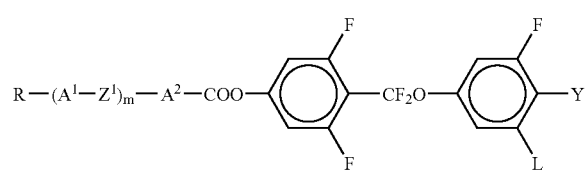

are prepared analogously:

| R | $-(A^1-Z^1)_m-A^2-$ | Y | L |
|---|---|---|---|
| $CH_3$ | cyclohexyl | F | H |
| $CH_3$ | cyclohexyl | F | F |
| $C_2H_5$ | cyclohexyl | F | H |
| $C_2H_5$ | cyclohexyl | F | F |
| $n-C_3H_7$ | cyclohexyl | F | H |
| $n-C_3H_7$ | cyclohexyl | F | F |
| $n-C_4H_9$ | cyclohexyl | F | H |
| $n-C_4H_9$ | cyclohexyl | F | F |
| $n-C_5H_{11}$ | cyclohexyl | F | H |
| $n-C_6H_{13}$ | cyclohexyl | F | H |

-continued
| R | —(A¹—Z¹)ₘ—A²— | Y | L |
|---|---|---|---|
| n-C₆H₁₃ | 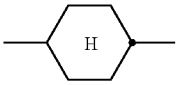 | F | F |
| CH₂=CH | 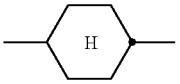 | F | H |
| CH₂=CH |  | F | F |
| CH₃CH=CH | 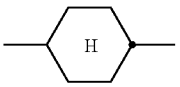 | F | H |
| CH₃CH=CH | 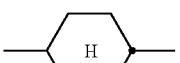 | F | F |
| CH₃O | 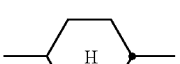 | F | H |
| CH₃O | 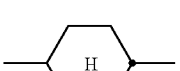 | F | F |
| CH₃CH₂OCH₂ | 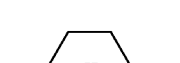 | F | H |
| CH₃CH₂OCH₂ |  | F | F |
| CH₃ |  | OCF₃ | H |
| CH₃ | 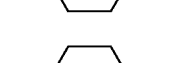 | OCF₃ | F |
| C₂H₅ | 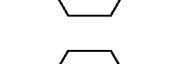 | OCF₃ | H |
| C₂H₅ |  | OCF₃ | F |
| n-C₃H₇ | 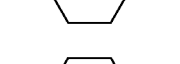 | OCF₃ | H |
| n-C₃H₇ | 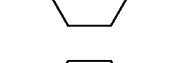 | OCF₃ | F |

-continued

| R | —(A¹—Z¹)ₘ—A²— | Y | L |
|---|---|---|---|
| n-C₄H₉ | cyclohexane (H) | OCF₃ | H |
| n-C₄H₉ | cyclohexane (H) | OCF₃ | F |
| n-C₅H₁₁ | cyclohexane (H) | OCF₃ | H |
| n-C₅H₁₁ | cyclohexane (H) | OCF₃ | F |
| n-C₆H₁₃ | cyclohexane (H) | OCF₃ | H |
| n-C₆H₁₃ | cyclohexane (H) | OCF₃ | F |
| CH₂=CH | cyclohexane (H) | OCF₃ | H |
| CH₂=CH | cyclohexane (H) | OCF₃ | F |
| CH₃CH=CH | cyclohexane (H) | OCF₃ | H |
| CH₃CH=CH | cyclohexane (H) | OCF₃ | F |
| CH₃O | cyclohexane (H) | OCF₃ | H |
| CH₃O | cyclohexane (H) | OCF₃ | F |
| CH₃CH₂OCH₂ | cyclohexane (H) | OCF₃ | H |
| CH₃CH₂OCH₂ | cyclohexane (H) | OCF₃ | F |
| CH₃ | cyclohexane (H) | OCHF₂ | H |

-continued

| R | —(A¹—Z¹)ₘ—A²— | Y | L |
|---|---|---|---|
| CH₃ | cyclohexyl(H) | OCHF₂ | F |
| C₂H₅ | cyclohexyl(H) | OCHF₂ | H |
| C₂H₅ | cyclohexyl(H) | OCHF₂ | F |
| n-C₃H₇ | cyclohexyl(H) | OCHF₂ | H |
| n-C₃H₇ | cyclohexyl(H) | OCHF₂ | F |
| n-C₄H₉ | cyclohexyl(H) | OCHF₂ | H |
| n-C₄H₉ | cyclohexyl(H) | OCHF₂ | F |
| n-C₅H₁₁ | cyclohexyl(H) | OCHF₂ | H |
| n-C₅H₁₁ | cyclohexyl(H) | OCHF₂ | F |
| n-C₆H₁₁ | cyclohexyl(H) | OCHF₂ | H |
| n-C₆H₁₁ | cyclohexyl(H) | OCHF₂ | F |
| CH₂=CH | cyclohexyl(H) | OCHF₂ | H |
| CH₂=CH | cyclohexyl(H) | OCHF₂ | F |
| CH₃CH=CH | cyclohexyl(H) | OCHF₂ | H |
| CH₃CH=CH | cyclohexyl(H) | OCHF₂ | F |

-continued

| R | —(A$^1$—Z$^1$)$_m$—A$^2$— | Y | L |
|---|---|---|---|
| CH$_3$O | cyclohexyl (H) | OCHF$_2$ | H |
| CH$_3$O | cyclohexyl (H) | OCHF$_2$ | F |
| CH$_3$CH$_2$OCH$_2$ | cyclohexyl (H) | OCHF$_2$ | H |
| CH$_3$CH$_2$OCH$_2$ | cyclohexyl (H) | OCHF$_2$ | F |
| CH$_3$ | cyclohexyl (H) | CN | H |
| CH$_3$ | cyclohexyl (H) | CN | F |
| C$_2$H$_5$ | cyclohexyl (H) | CN | H |
| C$_2$H$_5$ | cyclohexyl (H) | CN | F |
| n-C$_3$H$_7$ | cyclohexyl (H) | CN | H |
| n-C$_3$H$_7$ | cyclohexyl (H) | CN | F |
| n-C$_4$H$_9$ | cyclohexyl (H) | CN | H |
| n-C$_4$H$_9$ | cyclohexyl (H) | CN | F |
| n-C$_5$H$_{11}$ | cyclohexyl (H) | CN | H |
| n-C$_5$H$_{11}$ | cyclohexyl (H) | CN | F |
| n-C$_6$H$_{11}$ | cyclohexyl (H) | CN | H |

-continued

| R | —(A¹—Z¹)ₘ—A²— | Y | L |
|---|---|---|---|
| n-C₆H₁₁ | cyclohexane (H) | CN | F |
| CH₂=CH | cyclohexane (H) | CN | H |
| CH₂=CH | cyclohexane (H) | CN | F |
| CH₃CH=CH | cyclohexane (H) | CN | H |
| CH₃CH=CH | cyclohexane (H) | CN | F |
| CH₃O | cyclohexane (H) | CN | H |
| CH₃O | cyclohexane (H) | CN | F |
| CH₃CH₂OCH₂ | cyclohexane (H) | CN | H |
| CH₃CH₂OCH₂ | cyclohexane (H) | CN | F |
| CH₃ | cyclohexane (H) | OCF₂CHFCH₃ | H |
| CH₃ | cyclohexane (H) | OCF₂CHFCH₃ | F |
| C₂H₅ | cyclohexane (H) | OCF₂CHFCH₃ | H |
| C₂H₅ | cyclohexane (H) | OCF₂CHFCH₃ | F |
| n-C₃H₇ | cyclohexane (H) | OCF₂CHFCH₃ | H |
| n-C₃H₇ | cyclohexane (H) | OCF₂CHFCH₃ | F |

-continued

| R | —(A¹—Z¹)ₘ—A²— | Y | L |
|---|---|---|---|
| n-C₄H₉ | [cyclohexane-H] | OCF₂CHFCH₃ | H |
| n-C₄H₉ | [cyclohexane-H] | OCF₂CHFCH₃ | F |
| n-C₅H₁₁ | [cyclohexane-H] | OCF₂CHFCH₃ | H |
| n-C₅H₁₁ | [cyclohexane-H] | OCF₂CHFCH₃ | F |
| n-C₆H₁₁ | [cyclohexane-H] | OCF₂CHFCH₃ | H |
| n-C₆H₁₁ | [cyclohexane-H] | OCF₂CHFCH₃ | F |
| CH₂=CH | [cyclohexane-H] | OCF₂CHFCH₃ | H |
| CH₂=CH | [cyclohexane-H] | OCF₂CHFCH₃ | F |
| CH₃CH=CH | [cyclohexane-H] | OCF₂CHFCH₃ | H |
| CH₃CH=CH | [cyclohexane-H] | OCF₂CHFCH₃ | F |
| CH₃O | [cyclohexane-H] | OCF₂CHFCH₃ | H |
| CH₃O | [cyclohexane-H] | OCF₂CHFCH₃ | F |
| CH₃CH₂OCH₂ | [cyclohexane-H] | OCF₂CHFCH₃ | H |
| CH₃CH₂OCH₂ | [cyclohexane-H] | OCF₂CHFCH₃ | F |
| CH₃ | [cyclohexane-H]–[cyclohexane-H] | F | H |

| R | —(A¹—Z¹)ₘ—A²— | Y | L |
|---|---|---|---|
| CH₃ | 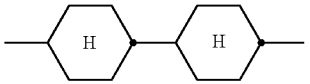 | F | F |
| C₂H₅ | 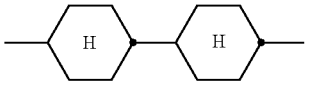 | F | H |
| C₂H₅ | 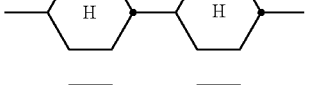 | F | F |
| n-C₃H₇ |  | F | H |
| n-C₃H₇ |  | F | F |
| n-C₄H₉ | 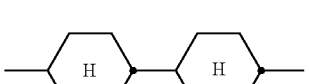 | F | H |
| n-C₄H₉ | 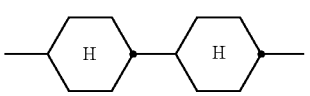 | F | F |
| n-C₅H₁₁ |  | F | H |
| n-C₅H₁₁ | 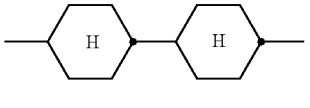 | F | F |
| n-C₆H₁₃ |  | F | H |
| n-C₆H₁₃ | 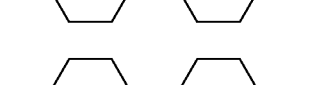 | F | F |
| CH₂=CH |  | F | H |
| CH₂=CH | 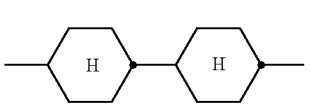 | F | F |
| CH₃CH=CH |  | F | H |
| CH₃CH=CH | | F | F |

-continued

| R | —(A¹—Z¹)ₘ—A²— | Y | L |
|---|---|---|---|
| CH₃O | H—H | F | H |
| CH₃O | H—H | F | F |
| CH₃CH₂OCH₂ | H—H | F | H |
| CH₃CH₂OCH₂ | H—H | H | F |
| CH₃ | H—H | OCF₃ | H |
| CH₃ | H—H | OCF₃ | F |
| C₂H₅ | H—H | OCF₃ | H |
| C₂H₅ | H—H | OCF₃ | F |
| n-C₃H₇ | H—H | OCF₃ | H |
| n-C₃H₇ | H—H | OCF₃ | F |
| n-C₄H₉ | H—H | OCF₃ | H |
| n-C₄H₉ | H—H | OCF₃ | F |
| n-C₅H₁₁ | H—H | OCF₃ | H |
| n-C₅H₁₁ | H—H | OCF₃ | F |
| n-C₆H₁₃ | H—H | OCF₃ | H |

-continued

| R | —(A¹—Z¹)ₘ—A²— | Y | L |
|---|---|---|---|
| n-C₆H₁₃ | H—H | OCF₃ | F |
| CH₂=CH | H—H | OCF₃ | H |
| CH₂=CH | H—H | OCF₃ | F |
| CH₃CH=CH | H—H | OCF₃ | H |
| CH₃CH=CH | H—H | OCF₃ | F |
| CH₃O | H—H | OCF₃ | H |
| CH₃O | H—H | OCF₃ | F |
| CH₃CH₂OCH₂ | H—H | OCF₃ | H |
| CH₃CH₂OCH₂ | H—H | OCF₃ | F |
| CH₃ | H—H | OCHF₂ | H |
| CH₃ | H—H | OCHF₂ | F |
| C₂H₅ | H—H | OCHF₂ | H |
| C₂H₅ | H—H | OCHF₂ | F |
| n-C₃H₇ | H—H | OCHF₂ | H |
| n-C₃H₇ | H—H | OCHF₂ | F |

-continued

| R | —(A¹—Z¹)ₘ—A²— | Y | L |
|---|---|---|---|
| n-C₄H₉ | Cyclohexyl-Cyclohexyl | OCHF₂ | H |
| n-C₄H₉ | Cyclohexyl-Cyclohexyl | OCHF₂ | F |
| n-C₅H₁₁ | Cyclohexyl-Cyclohexyl | OCHF₂ | H |
| n-C₅H₁₁ | Cyclohexyl-Cyclohexyl | OCHF₂ | F |
| n-C₆H₁₁ | Cyclohexyl-Cyclohexyl | OCHF₂ | H |
| n-C₆H₁₁ | Cyclohexyl-Cyclohexyl | OCHF₂ | F |
| CH₂=CH | Cyclohexyl-Cyclohexyl | OCHF₂ | H |
| CH₂=CH | Cyclohexyl-Cyclohexyl | OCHF₂ | F |
| CH₃CH=CH | Cyclohexyl-Cyclohexyl | OCHF₂ | H |
| CH₃CH=CH | Cyclohexyl-Cyclohexyl | OCHF₂ | F |
| CH₃O | Cyclohexyl-Cyclohexyl | OCHF₂ | H |
| CH₃O | Cyclohexyl-Cyclohexyl | OCHF₂ | F |
| CH₃CH₂OCH₂ | Cyclohexyl-Cyclohexyl | OCHF₂ | H |
| CH₃CH₂OCH₂ | Cyclohexyl-Cyclohexyl | OCHF₂ | F |
| CH₃ | Cyclohexyl-Cyclohexyl | CN | H |

-continued
| R | —(A¹—Z¹)ₘ—A²— | Y | L |
|---|---|---|---|
| CH₃ | 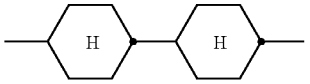 | CN | F |
| C₂H₅ | 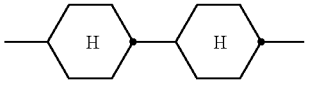 | CN | H |
| C₂H₅ | 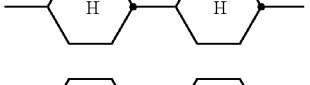 | CN | F |
| n-C₃H₇ | 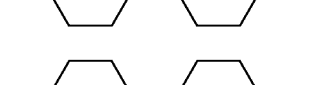 | CN | H |
| n-C₃H₇ | 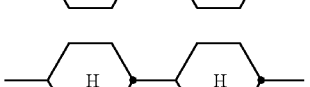 | CN | F |
| n-C₄H₉ | 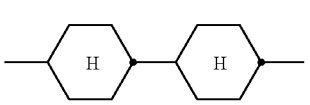 | CN | H |
| n-C₄H₉ | 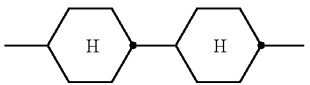 | CN | F |
| n-C₅H₁₁ | 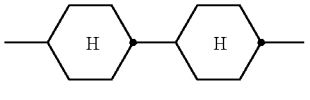 | CN | H |
| n-C₅H₁₁ | 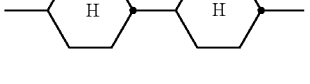 | CN | F |
| n-C₆H₁₁ |  | CN | H |
| n-C₆H₁₁ | 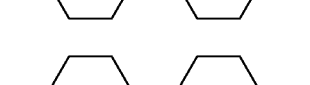 | CN | F |
| CH₂=CH | 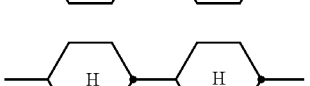 | CN | H |
| CH₂=CH | 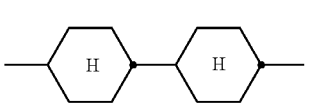 | CN | F |
| CH₃CH=CH |  | CN | H |
| CH₃CH=CH | | CN | F |

-continued

| R | —(A¹—Z¹)ₘ—A²— | Y | L |
|---|---|---|---|
| CH₃O | H—H | CN | H |
| CH₃O | H—H | CN | F |
| CH₃CH₂OCH₂ | H—H | CN | H |
| CH₃CH₂OCH₂ | H—H | CN | F |
| CH₃ | H—H | OCF₂CHFCH₃ | H |
| CH₃ | H—H | OCF₂CHFCH₃ | F |
| C₂H₅ | H—H | OCF₂CHFCH₃ | H |
| C₂H₅ | H—H | OCF₂CHFCH₃ | F |
| n-C₃H₇ | H—H | OCF₂CHFCH₃ | H |
| n-C₃H₇ | H—H | OCF₂CHFCH₃ | F |
| n-C₄H₉ | H—H | OCF₂CHFCH₃ | H |
| n-C₄H₉ | H—H | OCF₂CHFCH₃ | F |
| n-C₅H₁₁ | H—H | OCF₂CHFCH₃ | H |
| n-C₅H₁₁ | H—H | OCF₂CHFCH₃ | F |
| n-C₆H₁₁ | H—H | OCF₂CHFCH₃ | H |

-continued

| R | —(A¹—Z¹)ₘ—A²— | Y | L |
|---|---|---|---|
| n-C₆H₁₁ | Cy-Cy | OCF₂CHFCH₃ | F |
| CH₂=CH | Cy-Cy | OCF₂CHFCH₃ | H |
| CH₂=CH | Cy-Cy | OCF₂CHFCH₃ | F |
| CH₃CH=CH | Cy-Cy | OCF₂CHFCH₃ | H |
| CH₃CH=CH | Cy-Cy | OCF₂CHFCH₃ | F |
| CH₃O | Cy-Cy | OCF₂CHFCH₃ | H |
| CH₃O | Cy-Cy | OCF₂CHFCH₃ | F |
| CH₃CH₂OCH₂ | Cy-Cy | OCF₂CHFCH₃ | H |
| CH₃CH₂OCH₂ | Cy-Cy | OCF₂CHFCH₃ | F |
| CH₃ | Dioxane | F | H |
| CH₃ | Dioxane | F | F |
| C₂H₅ | Dioxane | F | H |
| C₂H₅ | Dioxane | F | F |
| n-C₃H₇ | Dioxane | F | H |
| n-C₃H₇ | Dioxane | F | F |

-continued
| R | —(A¹—Z¹)ₘ—A²— | Y | L |
|---|---|---|---|
| n-C₄H₉ | 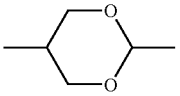 | F | H |
| n-C₄H₉ | 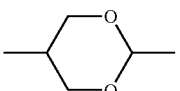 | F | F |
| n-C₅H₁₁ | 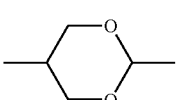 | F | H |
| n-C₅H₁₁ | 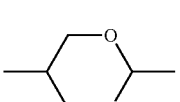 | F | F |
| n-C₆H₁₃ | 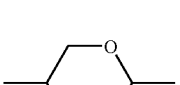 | F | H |
| n-C₆H₁₃ | 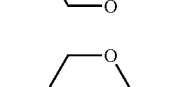 | F | F |
| CH₂=CH | 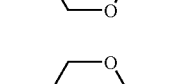 | F | H |
| CH₂=CH | 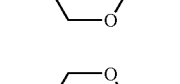 | F | F |
| CH₃CH=CH | 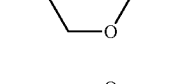 | F | H |
| CH₃CH=CH | 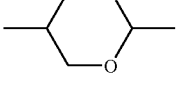 | F | F |
| CH₃O | 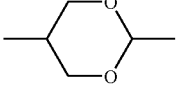 | F | H |
| CH₃O | 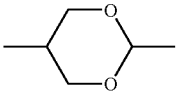 | F | F |
| CH₃CH₂OCH₂ | 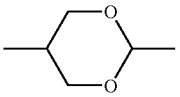 | F | H |

-continued
| R | —(A¹—Z¹)ₘ—A²— | Y | L |
|---|---|---|---|
| CH₃CH₂OCH₂ | 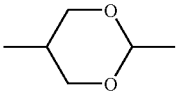 | F | F |
| CH₃ | 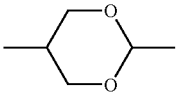 | OCF₃ | H |
| CH₃ | 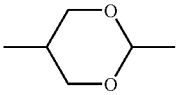 | OCF₃ | F |
| C₂H₅ | 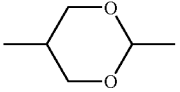 | OCF₃ | H |
| C₂H₅ | 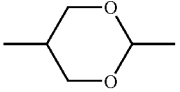 | OCF₃ | F |
| n-C₃H₇ | 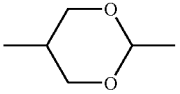 | OCF₃ | H |
| n-C₃H₇ | 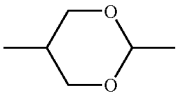 | OCF₃ | F |
| n-C₄H₉ | 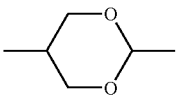 | OCF₃ | H |
| n-C₄H₉ | 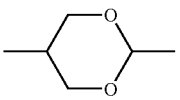 | OCF₃ | F |
| n-C₅H₁₁ | 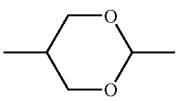 | OCF₃ | H |
| n-C₅H₁₁ | 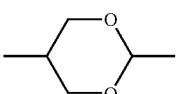 | OCF₃ | F |
| n-C₆H₁₃ | 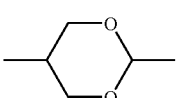 | OCF₃ | H |
| n-C₆H₁₃ | 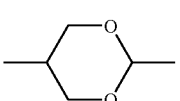 | OCF₃ | F |
| CH₂=CH | 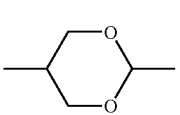 | OCF₃ | H |

-continued
| R | —(A¹—Z¹)ₘ—A²— | Y | L |
|---|---|---|---|
| CH₂=CH | 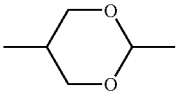 | OCF₃ | F |
| CH₃CH=CH | 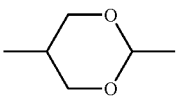 | OCF₃ | H |
| CH₃CH=CH | 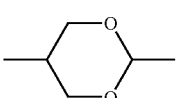 | OCF₃ | F |
| CH₃O | 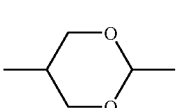 | OCF₃ | H |
| CH₃O | 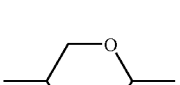 | OCF₃ | F |
| CH₃CH₂OCH₂ | 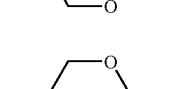 | OCF₃ | H |
| CH₃CH₂OCH₂ | 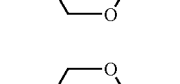 | OCF₃ | F |
| CH₃ | 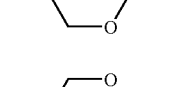 | OCHF₂ | H |
| CH₃ | 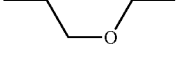 | OCHF₂ | F |
| C₂H₅ | 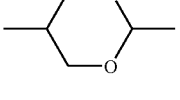 | OCHF₂ | H |
| C₂H₅ | 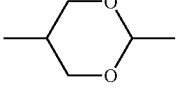 | OCHF₂ | F |
| n-C₃H₇ | 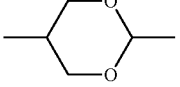 | OCHF₂ | H |
| n-C₃H₇ | 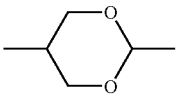 | OCHF₂ | F |

-continued
| R | —(A¹—Z¹)ₘ—A²— | Y | L |
|---|---|---|---|
| n-C₄H₉ | 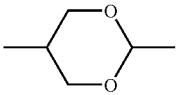 | OCHF₂ | H |
| n-C₄H₉ | 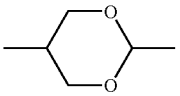 | OCHF₂ | F |
| n-C₅H₁₁ | 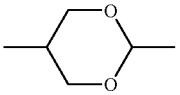 | OCHF₂ | H |
| n-C₅H₁₁ | 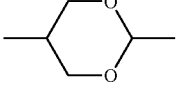 | OCHF₂ | F |
| n-C₆H₁₁ | 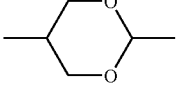 | OCHF₂ | H |
| n-C₆H₁₁ | 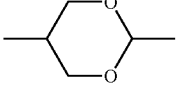 | OCHF₂ | F |
| CH₂=CH | 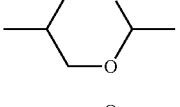 | OCHF₂ | H |
| CH₂=CH | 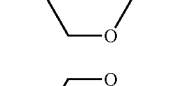 | OCHF₂ | F |
| CH₃CH=CH | 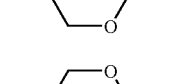 | OCHF₂ | H |
| CH₃CH=CH | 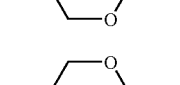 | OCHF₂ | F |
| CH₃O | 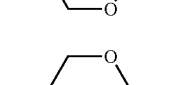 | OCHF₂ | H |
| CH₃O | 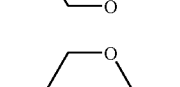 | OCHF₂ | F |
| CH₃CH₂OCH₂ | 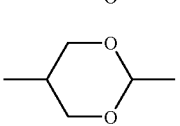 | OCHF₂ | H |
| CH₃CH₂OCH₂ |  | OCHF₂ | F |

-continued

| R | —(A$^1$—Z$^1$)$_m$—A$^2$— | Y | L |
|---|---|---|---|
| CH$_3$ | dioxane | CN | H |
| CH$_3$ | dioxane | CN | F |
| C$_2$H$_5$ | dioxane | CN | H |
| C$_2$H$_5$ | dioxane | CN | F |
| n-C$_3$H$_7$ | dioxane | CN | H |
| n-C$_3$H$_7$ | dioxane | CN | F |
| n-C$_4$H$_9$ | dioxane | CN | H |
| n-C$_4$H$_9$ | dioxane | CN | F |
| n-C$_5$H$_{11}$ | dioxane | CN | H |
| n-C$_5$H$_{11}$ | dioxane | CN | F |
| n-C$_6$H$_{11}$ | dioxane | CN | H |
| n-C$_6$H$_{11}$ | dioxane | CN | F |
| CH$_2$=CH | dioxane | CN | H |

-continued

| R | —(A¹—Z¹)ₘ—A²— | Y | L |
|---|---|---|---|
| CH$_2$=CH | dioxane | CN | F |
| CH$_3$CH=CH | dioxane | CN | H |
| CH$_3$CH=CH | dioxane | CN | F |
| CH$_3$O | dioxane | CN | H |
| CH$_3$O | dioxane | CN | F |
| CH$_3$CH$_2$OCH$_2$ | dioxane | CN | H |
| CH$_3$CH$_2$OCH$_2$ | dioxane | CN | F |
| CH$_3$ | dioxane | OCF$_2$CHFCH$_3$ | H |
| CH$_3$ | dioxane | OCF$_2$CHFCH$_3$ | F |
| C$_2$H$_5$ | dioxane | OCF$_2$CHFCH$_3$ | H |
| C$_2$H$_5$ | dioxane | OCF$_2$CHFCH$_3$ | F |
| n-C$_3$H$_7$ | dioxane | OCF$_2$CHFCH$_3$ | H |
| n-C$_3$H$_7$ | dioxane | OCF$_2$CHFCH$_3$ | F |
| n-C$_4$H$_9$ | dioxane | OCF$_2$CHFCH$_3$ | H |

-continued

| R | —(A¹—Z¹)ₘ—A²— | Y | L |
|---|---|---|---|
| n-C₄H₉ | dioxane | OCF₂CHFCH₃ | F |
| n-C₅H₁₁ | dioxane | OCF₂CHFCH₃ | H |
| n-C₅H₁₁ | dioxane | OCF₂CHFCH₃ | F |
| n-C₆H₁₁ | dioxane | OCF₂CHFCH₃ | H |
| n-C₆H₁₁ | dioxane | OCF₂CHFCH₃ | F |
| CH₂=CH | dioxane | OCF₂CHFCH₃ | H |
| CH₂=CH | dioxane | OCF₂CHFCH₃ | F |
| CH₃CH=CH | dioxane | OCF₂CHFCH₃ | H |
| CH₃CH=CH | dioxane | OCF₂CHFCH₃ | F |
| CH₃O | dioxane | OCF₂CHFCH₃ | H |
| CH₃O | dioxane | OCF₂CHFCH₃ | F |
| CH₃CH₂OCH₂ | dioxane | OCF₂CHFCH₃ | H |
| CH₃CH₂OCH₂ | dioxane | OCF₂CHFCH₃ | F |
| CH₃ | phenyl | F | H |

-continued
| R | —(A¹—Z¹)ₘ—A²— | Y | L |
|---|---|---|---|
| CH₃ | 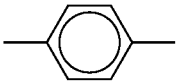 | F | F |
| C₂H₅ |  | F | H |
| C₂H₅ |  | F | F |
| n-C₃H₇ |  | F | H |
| n-C₃H₇ |  | F | F |
| n-C₄H₉ |  | F | H |
| n-C₄H₉ |  | F | F |
| n-C₅H₁₁ |  | F | H |
| n-C₅H₁₁ |  | F | F |
| n-C₆H₁₃ |  | F | H |
| n-C₆H₁₃ |  | F | F |
| CH₂=CH |  | F | H |
| CH₂=CH | 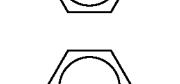 | F | F |
| CH₃CH=CH |  | F | H |
| CH₃CH=CH |  | F | F |

-continued
| R | —(A¹—Z¹)ₘ—A²— | Y | L |
|---|---|---|---|
| CH₃O |  | F | H |
| CH₃O | 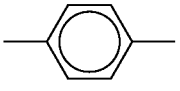 | F | F |
| CH₃CH₂OCH₂ |  | F | H |
| CH₃CH₂OCH₂ | 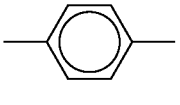 | F | F |
| CH₃ |  | OCF₃ | H |
| CH₃ |  | OCF₃ | F |
| C₂H₅ | 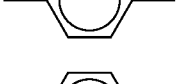 | OCF₃ | H |
| C₂H₅ |  | OCF₃ | F |
| n-C₃H₇ | 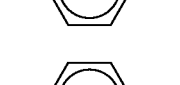 | OCF₃ | H |
| n-C₃H₇ |  | OCF₃ | F |
| n-C₄H₉ |  | OCF₃ | H |
| n-C₄H₉ |  | OCF₃ | F |
| n-C₅H₁₁ |  | OCF₃ | H |
| n-C₅H₁₁ |  | OCF₃ | F |
| n-C₆H₁₃ |  | OCF₃ | H |

-continued
| R | —(A¹—Z¹)ₘ—A²— | Y | L |
|---|---|---|---|
| n-C₆H₁₃ | 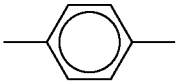 | OCF₃ | F |
| CH₂=CH | 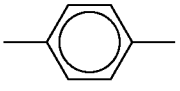 | OCF₃ | H |
| CH₂=CH | 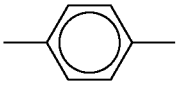 | OCF₃ | F |
| CH₃CH=CH |  | OCF₃ | H |
| CH₃CH=CH |  | OCF₃ | F |
| CH₃O |  | OCF₃ | H |
| CH₃O |  | OCF₃ | F |
| CH₃CH₂OCH₂ |  | OCF₃ | H |
| CH₃CH₂OCH₂ |  | OCF₃ | F |
| CH₃ |  | OCHF₂ | H |
| CH₃ | 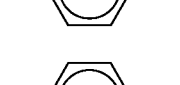 | OCHF₂ | F |
| C₂H₅ |  | OCHF₂ | H |
| C₂H₅ |  | OCHF₂ | F |
| n-C₃H₇ |  | OCHF₂ | H |
| n-C₃H₇ |  | OCHF₂ | F |

-continued
| R | —(A¹—Z¹)ₘ—A²— | Y | L |
|---|---|---|---|
| n-C₄H₉ | 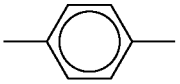 | OCHF₂ | H |
| n-C₄H₉ |  | OCHF₂ | F |
| n-C₅H₁₁ |  | OCHF₂ | H |
| n-C₅H₁₁ |  | OCHF₂ | F |
| n-C₆H₁₁ |  | OCHF₂ | H |
| n-C₆H₁₁ |  | OCHF₂ | F |
| CH₂=CH |  | OCHF₂ | H |
| CH₂=CH |  | OCHF₂ | F |
| CH₃CH=CH | 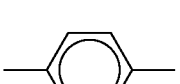 | OCHF₂ | H |
| CH₃CH=CH | 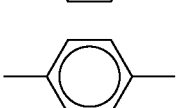 | OCHF₂ | F |
| CH₃O |  | OCHF₂ | H |
| CH₃O |  | OCHF₂ | F |
| CH₃CH₂OCH₂ |  | OCHF₂ | H |
| CH₃CH₂OCH₂ | 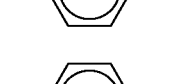 | OCHF₂ | F |
| CH₃ |  | CN | H |

-continued
| R | —(A¹—Z¹)ₘ—A²— | Y | L |
|---|---|---|---|
| CH₃ |  | CN | F |
| C₂H₅ |  | CN | H |
| C₂H₅ |  | CN | F |
| n-C₃H₇ |  | CN | H |
| n-C₃H₇ |  | CN | F |
| n-C₄H₉ |  | CN | H |
| n-C₄H₉ |  | CN | F |
| n-C₅H₁₁ |  | CN | H |
| n-C₅H₁₁ |  | CN | F |
| n-C₆H₁₁ | 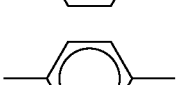 | CN | H |
| n-C₆H₁₁ |  | CN | F |
| CH₂=CH |  | CN | H |
| CH₂=CH |  | CN | F |
| CH₃CH=CH | 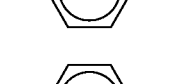 | CN | H |
| CH₃CH=CH |  | CN | F |

-continued
| R | —(A¹—Z¹)ₘ—A²— | Y | L |
|---|---|---|---|
| CH₃O |  | CN | H |
| CH₃O |  | CN | F |
| CH₃CH₂OCH₂ |  | CN | H |
| CH₃CH₂OCH₂ |  | CN | F |
| CH₃ |  | OCF₂CHFCH₃ | H |
| CH₃ | 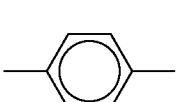 | OCF₂CHFCH₃ | F |
| C₂H₅ |  | OCF₂CHFCH₃ | H |
| C₂H₅ |  | OCF₂CHFCH₃ | F |
| n-C₃H₇ |  | OCF₂CHFCH₃ | H |
| n-C₃H₇ |  | OCF₂CHFCH₃ | F |
| n-C₄H₉ | 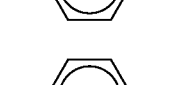 | OCF₂CHFCH₃ | H |
| n-C₄H₉ | 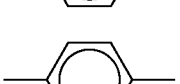 | OCF₂CHFCH₃ | F |
| n-C₅H₁₁ |  | OCF₂CHFCH₃ | H |
| n-C₅H₁₁ |  | OCF₂CHFCH₃ | F |
| n-C₆H₁₁ |  | OCF₂CHFCH₃ | H |

-continued
| R | —(A¹—Z¹)ₘ—A²— | Y | L |
|---|---|---|---|
| n-C₆H₁₁ |  | OCF₂CHFCH₃ | F |
| CH₂=CH |  | OCF₂CHFCH₃ | H |
| CH₂=CH |  | OCF₂CHFCH₃ | F |
| CH₃CH=CH |  | OCF₂CHFCH₃ | H |
| CH₃CH=CH | 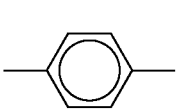 | OCF₂CHFCH₃ | F |
| CH₃O |  | OCF₂CHFCH₃ | H |
| CH₃O | 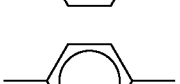 | OCF₂CHFCH₃ | F |
| CH₃CH₂OCH₂ | 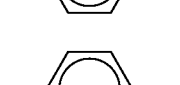 | OCF₂CHFCH₃ | H |
| CH₃CH₂OCH₂ |  | OCF₂CHFCH₃ | F |
| CH₃ | 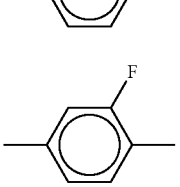 | F | H |
| CH₃ | 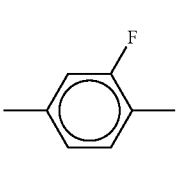 | F | F |
| C₂H₅ | 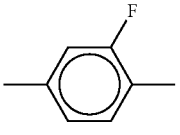 | F | H |
| C₂H₅ | 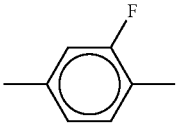 | F | F |

-continued
| R | —(A¹—Z¹)ₘ—A²— | Y | L |
|---|---|---|---|
| n-C₃H₇ | 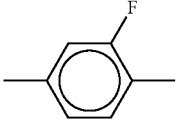 | F | H |
| n-C₄H₉ | 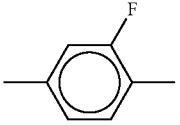 | F | H |
| n-C₄H₉ | 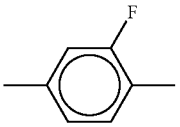 | F | F |
| n-C₅H₁₁ | 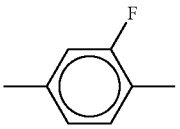 | F | H |
| n-C₅H₁₁ | 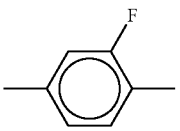 | F | F |
| n-C₆H₁₃ | 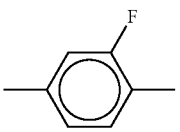 | F | H |
| n-C₆H₁₃ | 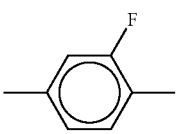 | F | F |
| CH₂=CH | 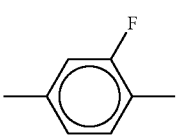 | F | H |
| CH₂=CH | 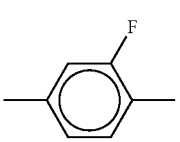 | F | F |
| CH₃CH=CH | 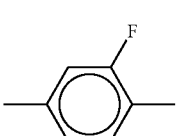 | F | H |
| CH₃CH=CH | 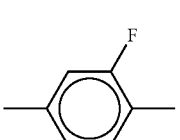 | F | F |

-continued
| R | —(A¹—Z¹)ₘ—A²— | Y | L |
|---|---|---|---|
| CH₃O | 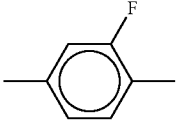 | F | H |
| CH₃O | 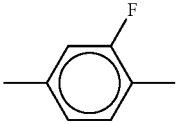 | F | F |
| CH₃CH₂OCH₂ | 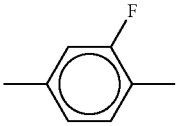 | F | H |
| CH₃CH₂OCH₂ | 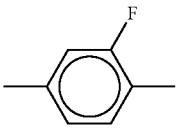 | F | F |
| CH₃ | 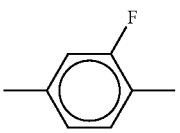 | OCF₃ | H |
| CH₃ | 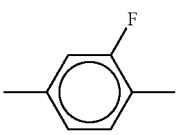 | OCF₃ | F |
| C₂H₅ | 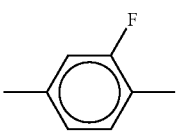 | OCF₃ | H |
| C₂H₅ | 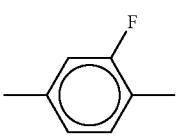 | OCF₃ | F |
| n-C₃H₇ | 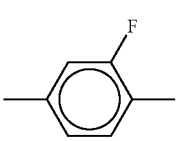 | OCF₃ | H |
| n-C₃H₇ | 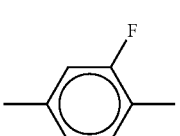 | OCF₃ | F |
| n-C₄H₉ | 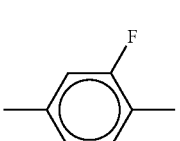 | OCF₃ | H |

-continued

| R | —(A¹—Z¹)ₘ—A²— | Y | L |
|---|---|---|---|
| n-C$_4$H$_9$ | 2-fluoro-1,4-phenylene | OCF$_3$ | F |
| n-C$_5$H$_{11}$ | 2-fluoro-1,4-phenylene | OCF$_3$ | H |
| n-C$_5$H$_{11}$ | 2-fluoro-1,4-phenylene | OCF$_3$ | F |
| n-C$_6$H$_{13}$ | 2-fluoro-1,4-phenylene | OCF$_3$ | H |
| n-C$_6$H$_{13}$ | 2-fluoro-1,4-phenylene | OCF$_3$ | F |
| CH$_2$=CH | 2-fluoro-1,4-phenylene | OCF$_3$ | H |
| CH$_2$=CH | 2-fluoro-1,4-phenylene | OCF$_3$ | F |
| CH$_3$CH=CH | 2-fluoro-1,4-phenylene | OCF$_3$ | H |
| CH$_3$CH=CH | 2-fluoro-1,4-phenylene | OCF$_3$ | F |
| CH$_3$O | 2-fluoro-1,4-phenylene | OCF$_3$ | H |
| CH$_3$O | 2-fluoro-1,4-phenylene | OCF$_3$ | F |

| R | —(A¹—Z¹)ₘ—A²— | Y | L |
|---|---|---|---|
| CH₃CH₂OCH₂ | 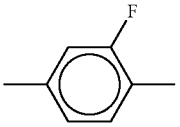 | OCF₃ | H |
| CH₃CH₂OCH₂ | 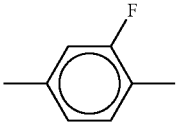 | OCF₃ | F |
| CH₃ | 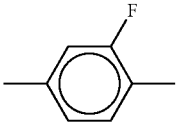 | OCHF₂ | H |
| CH₃ | 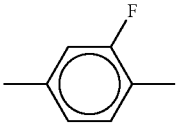 | OCHF₂ | F |
| C₂H₅ | 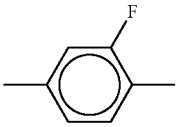 | OCHF₂ | H |
| C₂H₅ | 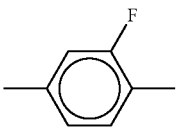 | OCHF₂ | F |
| n-C₃H₇ | 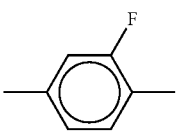 | OCHF₂ | H |
| n-C₃H₇ | 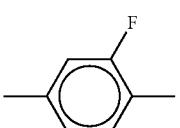 | OCHF₂ | F |
| n-C₄H₉ | 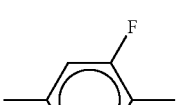 | OCHF₂ | H |
| n-C₄H₉ | 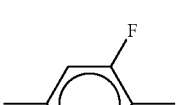 | OCHF₂ | F |
| n-C₅H₁₁ | 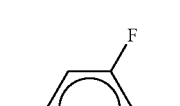 | OCHF₂ | H |

-continued
| R | —(A¹—Z¹)ₘ—A²— | Y | L |
|---|---|---|---|
| n-C₅H₁₁ | 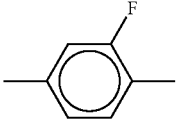 | OCHF₂ | F |
| n-C₆H₁₁ | 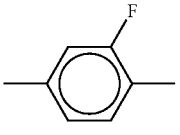 | OCHF₂ | H |
| n-C₆H₁₁ | 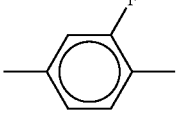 | OCHF₂ | F |
| CH₂=CH | 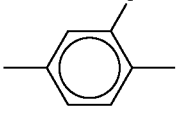 | OCHF₂ | H |
| CH₂=CH | 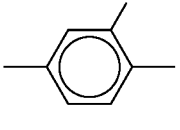 | OCHF₂ | F |
| CH₃CH=CH | 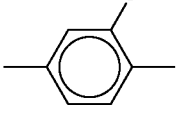 | OCHF₂ | H |
| CH₃CH=CH | 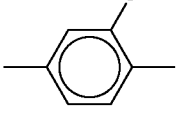 | OCHF₂ | F |
| CH₃O | 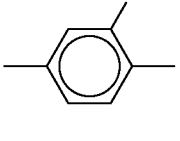 | OCHF₂ | H |
| CH₃O | 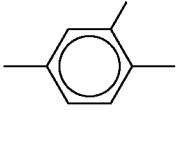 | OCHF₂ | F |
| CH₃CH₂OCH₂ | 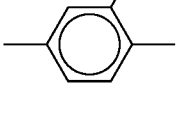 | OCHF₂ | H |

-continued
| R | —(A¹—Z¹)ₘ—A²— | Y | L |
|---|---|---|---|
| CH₃CH₂OCH₂ | 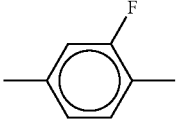 | OCHF₂ | F |
| CH₃ | 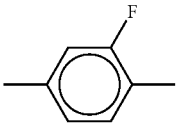 | CN | H |
| CH₃ | 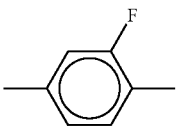 | CN | F |
| C₂H₅ | 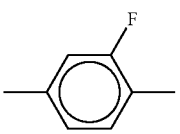 | CN | H |
| C₂H₅ | 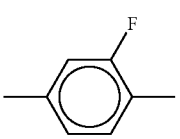 | CN | F |
| n-C₃H₇ | 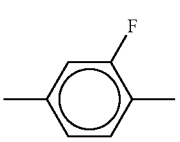 | CN | H |
| n-C₃H₇ | 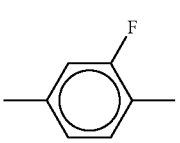 | CN | F |
| n-C₄H₉ | 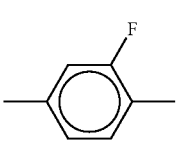 | CN | H |
| n-C₄H₉ | 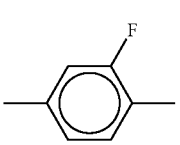 | CN | F |
| n-C₅H₁₁ | 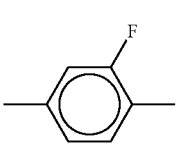 | CN | H |
| n-C₅H₁₁ | 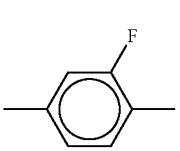 | CN | F |

-continued
| R | —(A¹—Z¹)ₘ—A²— | Y | L |
|---|---|---|---|
| n-C₆H₁₁ | 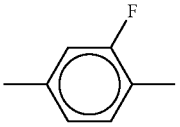 | CN | H |
| n-C₆H₁₁ | 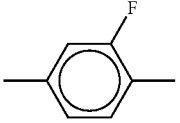 | CN | F |
| CH₂=CH | 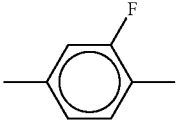 | CN | H |
| CH₂=CH | 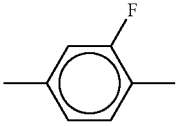 | CN | F |
| CH₃CH=CH | 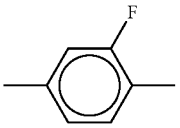 | CN | H |
| CH₃CH=CH | 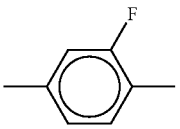 | CN | F |
| CH₃O | 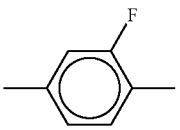 | CN | H |
| CH₃O | 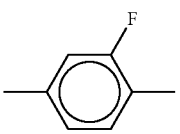 | CN | F |
| CH₃CH₂OCH₂ | 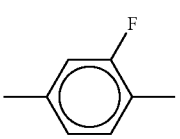 | CN | H |
| CH₃CH₂OCH₂ | 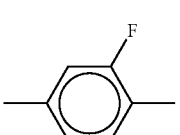 | CN | F |
| CH₃ | 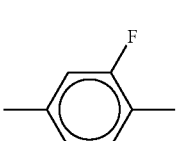 | OCF₂CHFCH₃ | H |

-continued
| R | —(A¹—Z¹)ₘ—A²— | Y | L |
|---|---|---|---|
| CH₃ | 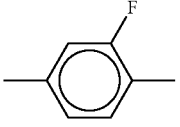 | OCF₂CHFCH₃ | F |
| C₂H₅ | 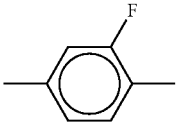 | OCF₂CHFCH₃ | H |
| C₂H₅ | 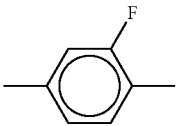 | OCF₂CHFCH₃ | F |
| n-C₃H₇ | 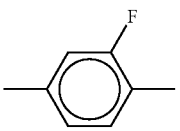 | OCF₂CHFCH₃ | H |
| n-C₃H₇ | 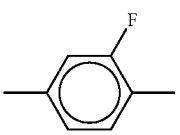 | OCF₂CHFCH₃ | F |
| n-C₄H₉ | 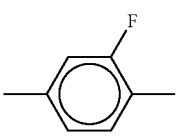 | OCF₂CHFCH₃ | H |
| n-C₄H₉ | 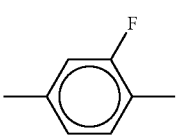 | OCF₂CHFCH₃ | F |
| n-C₅H₁₁ | 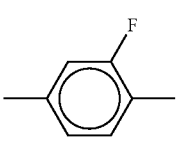 | OCF₂CHFCH₃ | H |
| n-C₅H₁₁ | 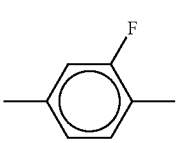 | OCF₂CHFCH₃ | F |
| n-C₆H₁₁ | 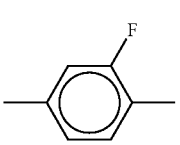 | OCF₂CHFCH₃ | H |
| n-C₆H₁₁ | 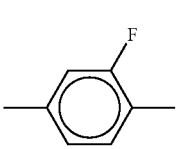 | OCF₂CHFCH₃ | F |

-continued

| R | —(A¹—Z¹)ₘ—A²— | Y | L |
|---|---|---|---|
| CH₂=CH | 2,3-difluorophenylene (F at top, F at bottom) | OCF₂CHFCH₃ | H |
| CH₂=CH | 2,3-difluorophenylene | OCF₂CHFCH₃ | F |
| CH₃CH=CH | 2,3-difluorophenylene | OCF₂CHFCH₃ | H |
| CH₃CH=CH | 2,3-difluorophenylene | OCF₂CHFCH₃ | F |
| CH₃O | 2,3-difluorophenylene | OCF₂CHFCH₃ | H |
| CH₃O | 2,3-difluorophenylene | OCF₂CHFCH₃ | F |
| CH₃CH₂OCH₂ | 2,3-difluorophenylene | OCF₂CHFCH₃ | H |
| CH₃CH₂OCH₂ | 2,3-difluorophenylene | OCF₂CHFCH₃ | F |

MIXTURE EXAMPLES

Example A

| | | | |
|---|---|---|---|
| BCH-32 | 5.00% | S → N [° C.]: | −40.0 |
| CCP-2F.F.F | 11.00% | Clearing point [° C.]: | +67.5 |
| CCP-3F.F.F | 10.00% | Δn [589 nm, 20° C.]: | +0.0958 |
| CCP-3OCF₃ | 8.00% | d · Δn [μm, 20° C.]: | 0.50 |
| CCP-4OCF₃ | 2.00% | Twist [°]: | 90 |
| CGU-2-F | 10.00% | V₁₀ [V]: | 0.96 |
| CGU-3-F | 10.00% | | |
| CGU-5-F | 4.00% | | |
| CCZU-2-F | 5.00% | | |
| CCZU-3-F | 15.00% | | |
| CZGU-2-F | 9.00% | | |
| CZGU-3-F | 11.00% | | |

Example B

| | | | |
|---|---|---|---|
| BCH-32 | 5.00% | S → N [° C.]: | −40.0 |
| CCH-34 | 2.00% | Clearing point [° C.]: | +70.5 |
| CCP-2F.F.F | 10.00% | Δn [589 nm, 20° C.]: | +0.0956 |
| CCP-3F.F.F | 8.00% | d · Δn [μm, 20° C.]: | 0.50 |

-continued

| | | | |
|---|---|---|---|
| CCP-30CF₃ | 8.00% | Twist [°]: | 90 |
| CCP-40CF₃ | 4.00% | V₁₀ [V]: | 0.99 |
| CGU-2-F | 10.00% | | |
| CGU-3-F | 10.00% | | |
| CGU-5-F | 3.00% | | |
| CCZU-2-F | 5.00% | | |
| CCZU-3-F | 15.00% | | |
| CZGU-2-F | 9.00% | | |
| CZGU-3-F | 11.00% | | |

Example C

| | | | |
|---|---|---|---|
| CCH-34 | 4.00% | S → N [° C.]: | −40.0 |
| CCP-2F.F.F | 6.00% | Clearing point [° C.]: | +73.5 |
| CCP-3F.F.F | 9.00% | Δn [589 nm, 20° C.]: | +0.0914 |
| CCP-30CF₃ | 9.00% | d · Δn [μm, 20° C.]: | 0.50 |
| CCP-40CF₃ | 7.00% | Twist [°]: | 90 |
| CGU-2-F | 10.00% | V₁₀ [V]: | 0.97 |
| CGU-3-F | 10.00% | | |
| CCZU-2-F | 5.00% | | |
| CCZU-3-F | 15.00% | | |
| CCZU-5-F | 3.00% | | |
| CZGU-2-F | 11.00% | | |
| CZGU-3-F | 11.00% | | |

Example D

| | | | |
|---|---|---|---|
| BCH-32 | 5.00% | Clearing point [° C.]: | 75.1 |
| BCH-2F.F | 11.00% | Δn [589 nm, 20° C.]: | 0.1083 |
| BCH-3F.F | 10.00% | Δε [1 kHz, 20° C.]: | 11.2 |
| CCP-30CF₃ | 8.00% | | |
| CCP-40CF₃ | 2.00% | | |
| CGU-2-F | 10.00% | | |
| CGU-3-F | 10.00% | | |
| CGU-5-F | 4.00% | | |
| CCZU-2-F | 5.00% | | |
| CCZU-3-F | 15.00% | | |
| CZGU-2-F | 9.00% | | |
| CZGU-3-F | 11.00% | | |

Example E

| | | | |
|---|---|---|---|
| CCH-34 | 4.00% | Clearing point [° C.]: | 74.3 |
| CCP-2F.F.F | 6.00% | Δn [589 nm, 20° C.]: | 0.0812 |
| CCP-3F.F.F | 9.00% | Δε [1 kHz, 20° C.]: | 10.2 |
| CCP-30CF₃ | 11.00% | | |
| CCP-40CF₃ | 9.00% | | |
| PCH-7F | 6.00% | | |
| CGU-3-F | 10.00% | | |
| CCZU-2-F | 5.00% | | |
| CCZU-3-F | 15.00% | | |
| CCZU-5-F | 3.00% | | |
| CZGU-2-F | 11.00% | | |
| CZGU-3-F | 11.00% | | |

Example F

| | | | |
|---|---|---|---|
| PCH-5F | 3.20% | Clearing point [° C.]: | +113.0 |
| CCP-20CF₂.F.F | 17.04% | Δε [1kH₂, 20° C.]: | +10.5 |
| CCP-30CF₂.F.F | 16.00% | | |
| CCP-50CF₂.F.F | 17.04% | | |
| CUP-2F.F | 5.36% | | |
| CUP-3F.F | 5.36% | | |
| CBC-33F | 5.36% | | |
| CBC-53F | 5.36% | | |
| CBC-55F | 5.28% | | |
| CZGU-3-F | 20.00% | | |

Example G

| | |
|---|---|
| CCH-34 | 6.00% |
| CC-3-V1 | 2.00% |
| CCP-2F.F.F | 7.00% |
| CCP-3F.F.F | 3.00% |
| BCH-3F.F.F | 2.00% |
| CCP-20CF₃ | 4.00% |
| CCP-30CF₃ | 8.00% |
| CCP-30CF₃ | 5.00% |
| CGU-2-F | 11.00% |
| CGU-3-F | 10.00% |
| CCZU-2-F | 5.00% |
| CCZU-3-F | 15.00% |
| CCZU-5-F | 2.00% |
| CZGU-2-F | 11.00% |
| CZGU-3-F | 9.00% |

Example H

| | | | |
|---|---|---|---|
| CC-3-V1 | 10.00% | S → N [° C.]: | <−40 |
| CCP-2F.F.F | 7.00% | Clearing point [° C.]: | +70.0 |
| CCP-3F.F.F | 8.00% | Δn [589 nm, 20° C]: | +0.0905 |
| CCP-30CF₃ | 8.00% | γ₁ [mPa · s, 20° C.]: | 147 |
| CGU-2-F | 10.00% | d · Δn [20° C.]: | 0.50 |
| CGU-3-F | 10.00% | Twist [°]: | 90 |
| CCZU-2-F | 5.00% | V₁₀ [V]: | 1.24 |
| CCZU-3-F | 15.00% | | |
| CCZU-5-F | 5.00% | | |
| CZGU-2-F | 11.00% | | |
| CZGU-3-F | 11.00% | | |

Example I

| | | | |
|---|---|---|---|
| CCH-34 | 2.00% | S → N [° C.]: | <−40 |
| CC-3-V1 | 9.00% | Clearing point [° C.]: | +69.5 |
| CCP-2F.F.F | 6.00% | Δn [589 nm, 20° C.]: | +0.0897 |
| CCP-3F.F.F | 9.00% | γ₁ [mPa · s, 20° C.]: | |
| CCP-30CF₃ | 7.00% | d · Δn [20° C.]: | 0.50 |
| CGU-2-F | 10.00% | Twist [°]: | 90 |
| CGU-3-F | 10.00% | V₁₀ [V]: | 1.24 |
| CCZU-2-F | 5.00% | | |
| CCZU-3-F | 15.00% | | |
| CCZU-5-F | 5.00% | | |
| CZGU-2-F | 11.00% | | |
| CZGU-3-F | 11.00% | | |

Example J

| | | | |
|---|---|---|---|
| CC-3-V1 | 8.00% | S → N [° C.]: | <−40 |
| CCP-2F.F.F | 6.00% | Clearing point [° C.]: | +70.0 |
| CCP-3F.F.F | 11.00% | Δn [589 nm, 20° C.]: | +0.0907 |
| CCP-30CF$_3$ | 8.00% | γ$_1$ [mPa · s, 20° C.]: | 153 |
| CGU-2-F | 10.00% | d · Δn [20° C.]: | 0.50 |
| CGU-3-F | 10.00% | Twist [°]: | 90 |
| CCZU-2-F | 5.00% | V$_{10}$ [V]: | 1.21 |
| CCZU-3-F | 15.00% | | |
| CCZU-5-F | 5.00% | | |
| CZGU-2-F | 11.00% | | |
| CZGU-3-F | 11.00% | | |

Example K

| | | | |
|---|---|---|---|
| CZGU-3-F | 20.00% | S → N [° C.]: | <−40 |
| CCH-34 | 5.00% | Clearing point [° C.]: | +70.0 |
| CCP-2F.F.F | 9.00% | Δn [589 nm, 20° C.]: | +0.0895 |
| CCP-3F.F.F | 8.00% | γ$_1$ [mPa · s, 20° C.]: | 155 |
| CCP-30CF$_3$ | 9.00% | d · Δn [20° C.]: | 0.50 |
| CCP-40CF$_3$ | 6.00% | Twist [°]: | 90 |
| CGU-2-F | 11.00% | V$_{10}$ [V]: | 1.22 |
| CGU-3-F | 10.00% | | |
| CCZU-2-F | 5.00% | | |
| CCZU-3-F | 15.00% | | |
| CCZU-5-F | 2.00% | | |
| CZGU-2-F | 11.00% | | |
| CZGU-3-F | 9.00% | | |

The invention claimed is:

1. Liquid-crystalline medium based on a mixture of polar compounds of positive dielectric anisotropy, which comprises one or more compounds of the formula I

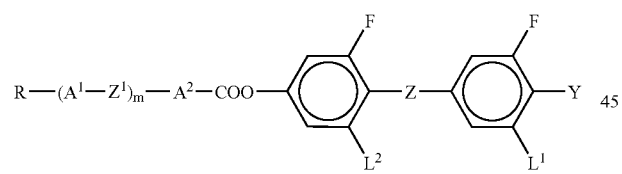

I in which

R is H, an alkyl radical having from 1 to 15 carbon atoms which is unsubstituted, monosubstituted by CN or CF$_3$ or at least monosubstituted by halogen, where, in addition, one or more CH$_2$ groups in these radicals are optionally replaced, in each case independently of one another, by
—O—, —S—,

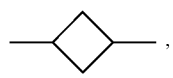

—CO—, —CO—O—, —O—CO—, —CH═CH—, —C≡C— or —O—CO—O— in such a way that O atoms are not linked directly to one another, A$^1$ and A$^2$ are each, independently of one another, (a) a trans-1,4-cyclohexylene radical, in which, in addition, one or more non-adjacent CH$_2$ groups are optionally replaced by —O— and/or —S—, (b) a 1,4-phenylene radical, in which, in addition, one or two CH groups are optionally replaced by N, (c) a 1,4-cyclohexenylene radical, or (d) a radical selected from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a) to (d) are optionally monosubstituted or polysubstituted by CN or fluorine, Z and Z$^1$ are each, independently of one another, —COO—, —O—CO—, —CH$_2$O—, —OCH$_2$—, —C$_2$H$_4$—, —CH═CH—, —CF$_2$O—, —OCF$_2$—, —C≡C—, —CH═CH—C$_2$H$_4$—, —C$_2$F$_4$— or a single bond, L$^1$ and L$^2$ are each, independently of one another, H or F, Y is F, Cl, CN, or an alkyl or alkoxy radical having from 1 to 6 carbon atoms which is substituted by one or more halogen atoms and in which, in addition, one or more CH$_2$ groups are optionally replaced by —O— or —CH═CH— in such a way that O atoms are not linked directly to one another, m is 0 or 1, with the provisos that:

a) when m=0 and A$^2$=

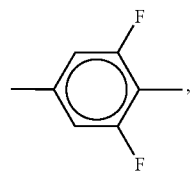

Z is not single bond and b) when m=0, A$^2$=

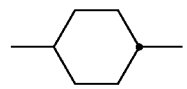

and Z=—COO—, L$^1$ is F.

2. Medium according to claim 1, which additionally comprises one or more compounds selected from the group consisting of compounds of formulae II, III, IV, V, VI, VII, VIII, IX, X and XI:

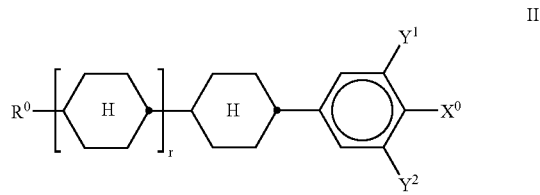

II

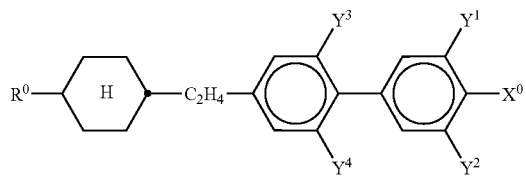   III

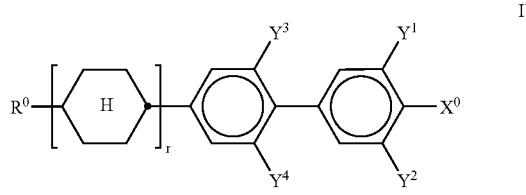   IV

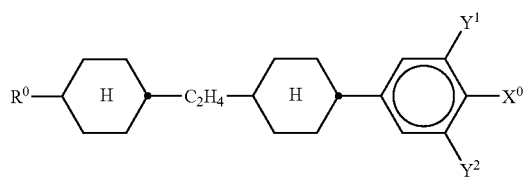   V

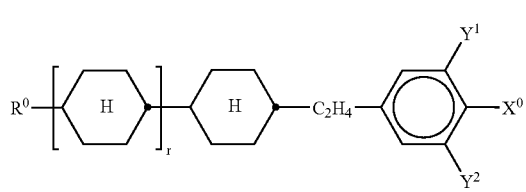   VI

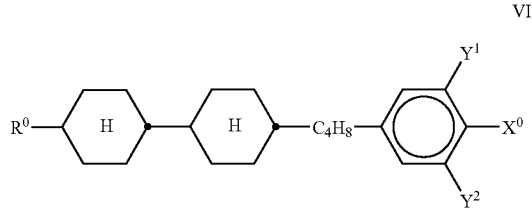   VII

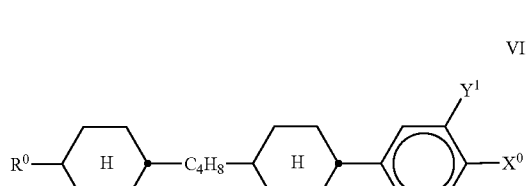   VIII

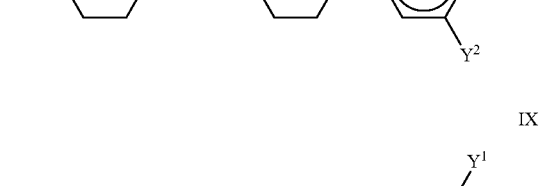   IX

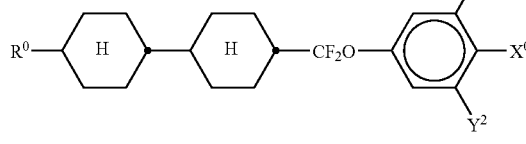   X

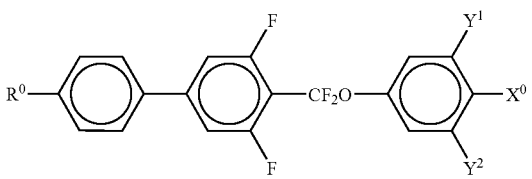   XI in which the individual radicals have the following meanings:

$R^0$ n-alkyl, oxaalkyl, fluoroalkyl or alkenyl, each having 1 to 7 carbon atoms, $X^0$ F, Cl, halogenated alkyl, alkenyl or alkoxy having from 1 to 6 carbon atoms, $Y^1$ to $Y^4$ each, independently of one another, H or F, r 0 or 1.

3. Medium according to claim 2, wherein the proportion of compounds of the formulae I to XI together in the mixture as a whole is at least 50% by weight.

4. Medium according to claim 1 wherein the proportion of compounds of the formula I in the mixture as a whole is from 5 to 50% by weight.

5. Medium according to claim 2 wherein the proportion of compounds of the formulae II to XI in the mixture as a whole is from 20 to 80% by weight.

6. Medium according to claim 1, wherein the compound of the formula I is selected from the group consisting of the compounds Ia to Ih:

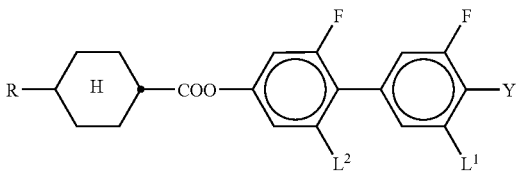   Ia

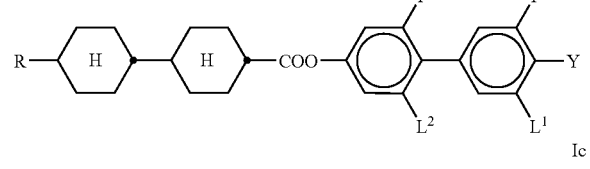   Ib

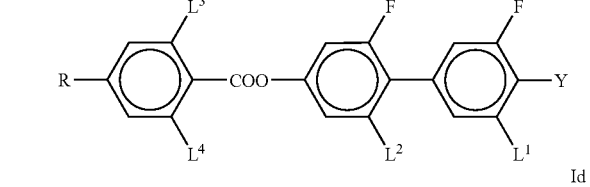   Ic

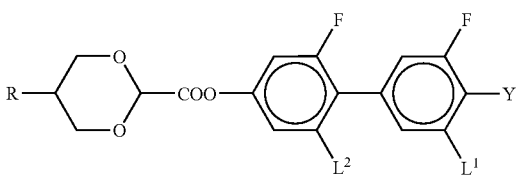   Id

-continued

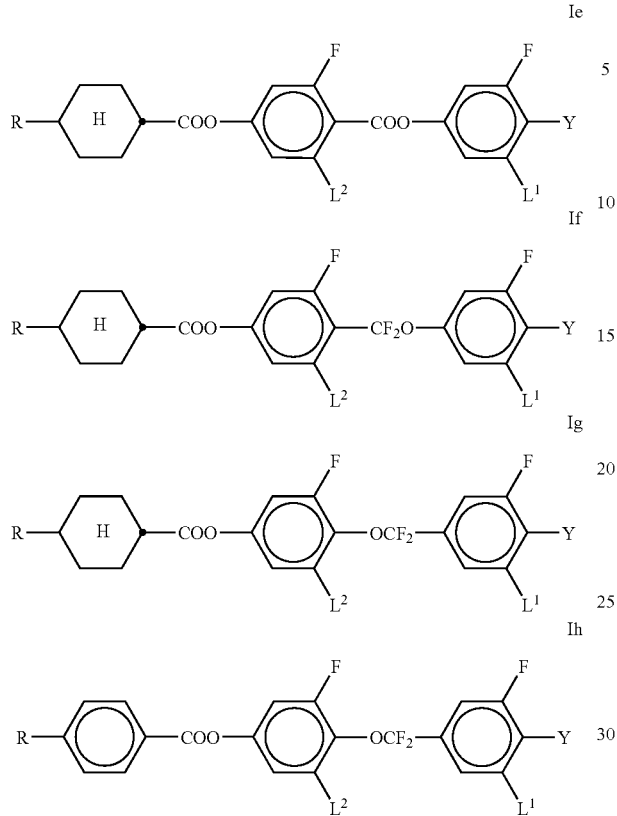

in which R, Y, L$^1$ and L$^2$ are as defined in claim 1, and L$^3$ and L$^4$ are each, independently of one another, H or F.

7. A compound of the formula I

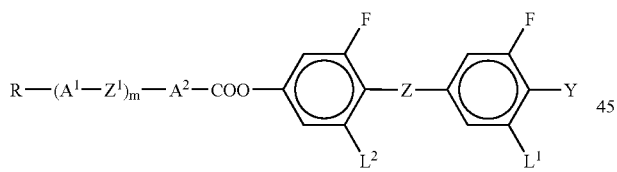

in which
R is H, an alkyl radical having from 1 to 15 carbon atoms which is unsubstituted, monosubstituted by CN or CF$_3$ or at least monosubstituted by halogen, where, in addition, one or more CH$_2$ groups in these radicals are optionally replaced, in each case independently of one another,
by —O—, —C≡C—, —CH=CH—, —S—,

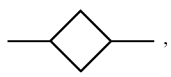

—CO—, —CO—O—, —O—CO— or —O—CO—O— in such a way that O atoms are not linked directly to one another,
A$^1$ and A$^2$ are each, independently of one another,
(a) a trans-1,4-cyclohexylene radical, in which, in addition, one or more non-adjacent CH$_2$ groups are optionally replaced by —O— and/or —S—,
(b) a 1,4-phenylene radical, in which, in addition, one or two CH groups are optionally replaced by N,
(c) a 1,4-cyclohexenylene radical,
(d) a radical selected from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals (a) to (d) are optionally monosubstituted or polysubstituted by CN or fluorine,
Z and Z$^1$ are each, independently of one another, —COO—, —O—CO—, —CH$_2$O—, —OCH$_2$—, —C$_2$H$_4$—, —CH=CH—, —CF$_2$O—, —OCF$_2$—, —C≡C—, —CH=CH—C$_2$H$_4$—, —C$_2$F$_4$— or a single bond,
L$^1$ and L$^2$ are each, independently of one another, H or F,
Y is F, Cl, CN, or an alkyl or alkoxy radical having from 1 to 6 carbon atoms which is substituted by one or more halogen atoms and in which, in addition, one or more CH$_2$ groups are optionally replaced by —O— or —CH=CH— in such a way that O atoms are not linked directly to one another, and
m is 0 or 1,
with the provisos that:
a) when m=0 and A$^2$=

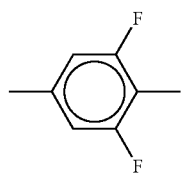

Z is not single bond and
b) when m=0, A$^2$=

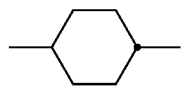

and Z=—COO—, L$^1$ is F.

8. A compound of the formula

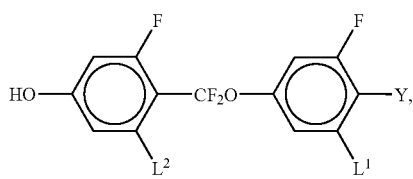

in which,
L$^1$ and L$^2$ are each, independently of one another, H or F, and
Y is F, Cl, CN, or an alkyl or alkoxy radical having from 1 to 6 carbon atoms which is substituted by one or more halogen atoms and in which, in addition, one or more CH$_2$ groups are optionally replaced by —O— or —CH=CH— in such a way that O atoms are not linked directly to one another.

9. Electro-optical liquid-crystal display containing a liquid-crystalline medium according to claim 1.

10. Medium according to claim 1, which additionally comprises one or more compounds of the formula E1:

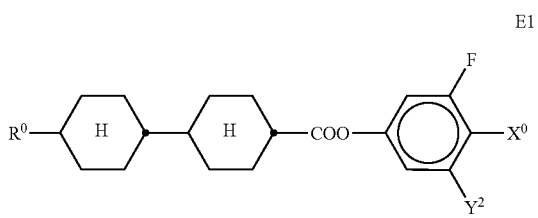

E1 in which
R⁰ n-alkyl, oxaalkyl, fluoroalkyl or alkenyl, each having 1 to 7 carbon atoms,
X⁰ F, Cl, halogenated alkyl, alkenyl or alkoxy having from 1 to 6 carbon atoms, and
Y² is H or F.

11. Medium according to claim 2, which additionally comprises one or more compounds of the formula E1:

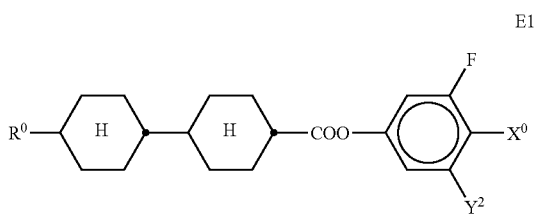

E1 in which
R⁰ n-alkyl, oxaalkyl, fluoroalkyl or alkenyl, each having 1 to 7 carbon atoms,
X⁰ F, Cl, halogenated alkyl, alkenyl or alkoxy having from 1 to 6 carbon atoms, and
Y² is H or F.

12. Medium of claim 10, wherein X⁰ is F or OCF₃ and Y² is H or F.

13. Medium according to claim 1, which additionally comprises one or more compounds of the formula IV:

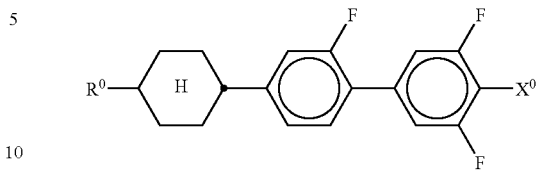

in which
R⁰ n-alkyl, oxaalkyl, fluoroalkyl or alkenyl, each having up 1 to 7 carbon atoms, and
X⁰ F, Cl, halogenated alkyl, alkenyl or alkoxy having from 1 to 6 carbon atoms.

14. Medium according to claim 2, wherein the proportion of compounds of the formula I in the mixture as a whole is from 5 to 50% by weight.

15. Medium according to claim 3, wherein the proportion of compounds of the formulae II to XI in the mixture as a whole is from 20 to 80% by weight.

16. Medium according to claim 1, wherein the medium comprises one or more compounds of the formula I wherein Z is a single bond.

17. A compound of claim 7, wherein Z is a single bond.

18. Medium according to claim 1, wherein the medium comprises one or more compounds of the formula I wherein m is 0.

19. A compound of claim 7, wherein m is 0.

20. Medium according to claim 1, wherein the medium comprises one or more compounds of the formula I wherein A¹ and, if present, A² are a 1,4-cyclohexylene or 1,4-phenylene radical which are optionally mono- or di-fluorinated.

21. A compound of claim 7, wherein A¹ and, if present, A² are a 1,4-cyclohexylene or 1,4-phenylene radical which are optionally mono- or di-fluorinated.

22. Medium according to claim 1, wherein the medium has a transition from smectic phase to nematic phase, S→N, of −40° C. or less.

* * * * *